United States Patent
Tamilarasan et al.

(10) Patent No.: US 12,530,292 B2
(45) Date of Patent: Jan. 20, 2026

(54) CACHING TECHNIQUES USING A MAPPING CACHE AND A DATA CACHE

(71) Applicant: Dell Products L.P., Hopkinton, MA (US)

(72) Inventors: Ashok Tamilarasan, Shrewsbury, MA (US); Vamsi K Vankamamidi, Hopkinton, MA (US); David Bernard, Westford, MA (US)

(73) Assignee: Dell Products L.P., Hopkinton, MA (US)

( * ) Notice: Subject to any disclaimer, the term of this patent is extended or adjusted under 35 U.S.C. 154(b) by 0 days.

(21) Appl. No.: 18/638,291

(22) Filed: Apr. 17, 2024

(65) Prior Publication Data

US 2025/0328469 A1   Oct. 23, 2025

(51) Int. Cl.
*G06F 12/08*   (2016.01)
*G06F 3/06*   (2006.01)
*G06F 12/0802*   (2016.01)

(52) U.S. Cl.
CPC .......... *G06F 12/0802* (2013.01); *G06F 3/061* (2013.01); *G06F 3/0655* (2013.01); *G06F 3/0679* (2013.01)

(58) Field of Classification Search
CPC ...... G06F 3/061; G06F 3/0655; G06F 3/0679; G06F 12/0802
USPC ........................................................ 711/118
See application file for complete search history.

(56) References Cited

U.S. PATENT DOCUMENTS

| | | | | |
|---|---|---|---|---|
| 11,093,286 | B2* | 8/2021 | Potash | G06F 9/5011 |
| 2019/0187912 | A1* | 6/2019 | Gerhart | G06F 3/0611 |
| 2020/0225868 | A1* | 7/2020 | Dalmatov | G06F 12/0873 |
| 2024/0303200 | A1* | 9/2024 | Tamilarasan | G06F 12/0864 |

OTHER PUBLICATIONS

U.S. Appl. No. 18/118,946, filed Mar. 8, 2023, entitled Caching Techniques Using a Mapping Cache and Maintaining Cache Coherency Using Hash Values, Ashok Tamilarasan, et al.
U.S. Appl. No. 18/119,565, filed Mar. 9, 2023, entitled Caching Techniques Using a Mapping Cache and Maintaining Cache Coherency Using Physical To Logical Address Mapping, Ashok Tamilarasan, et al.

* cited by examiner

*Primary Examiner* — Than Nguyen
(74) *Attorney, Agent, or Firm* — BainwoodHuang

(57) ABSTRACT

Caching techniques can include: receiving, from a host, a read I/O operation requesting to read current content of a logical address; determining whether a data cache includes a data cache entry corresponding to the logical address; responsive to determining the data cache includes the data cache entry corresponding to the logical address, performing data cache hit processing to service the read I/O operation using the data cache entry; responsive to determining the data cache does not include the data cache entry corresponding to the logical address, performing data cache miss processing including: determining whether a mapping cache includes a descriptor corresponding to the logical address; and responsive to determining the mapping cache includes the descriptor corresponding to the logical address, performing mapping cache hit processing to service the read I/O operation using the descriptor of the mapping cache.

20 Claims, 23 Drawing Sheets

Page descriptor 852

- Forward pointer 852a
- Backward pointer 852b
- Physical location information of content 852c (e.g., PLB address, offset and length)
- Logical address 852e (e.g., LUN or volume and LBA)
- Hash table pointer 852f
- Cryptographic hash value 852g

CACHING TECHNIQUES USING A MAPPING CACHE AND A DATA CACHE

BACKGROUND

Systems include different resources used by one or more host processors. The resources and the host processors in the system are interconnected by one or more communication connections, such as network connections. These resources include data storage devices such as those included in data storage systems. The data storage systems are typically coupled to one or more host processors and provide storage services to each host processor. Multiple data storage systems from one or more different vendors can be connected to provide common data storage for the one or more host processors.

A host performs a variety of data processing tasks and operations using the data storage system. For example, a host issues I/O operations, such as data read and write operations, that are subsequently received at a data storage system. The host systems store and retrieve data by issuing the I/O operations to the data storage system containing a plurality of host interface units, disk drives (or more generally storage devices), and disk interface units. The host systems access the storage devices through a plurality of channels provided therewith. The host systems provide data and access control information through the channels to a storage device of the data storage system. Data stored on the storage device is provided from the data storage system to the host systems also through the channels. The host systems do not address the storage devices of the data storage system directly, but rather, access what appears to the host systems as a plurality of files, objects, logical units, logical devices or logical volumes. Thus, the I/O operations issued by the host are directed to a particular storage entity, such as a file or logical device. The logical devices generally include physical storage provisioned from portions of one or more physical drives. Allowing multiple host systems to access the single data storage system allows the host systems to share data stored therein.

SUMMARY OF THE PRESENT DISCLOSURE

Various embodiments of the techniques herein can include a computer-implemented method, a system and a non-transitory computer readable medium. The system can include one or more processors, and a memory comprising code that, when executed, performs the method. The non-transitory computer readable medium can include code stored thereon that, when executed, performs the method. The method can comprise: receiving, from a host, a read I/O operation requesting to read current content of a first logical address; determining whether a data cache includes a first data cache entry corresponding to the first logical address; responsive to determining the data cache includes the first data cache entry corresponding to the first logical address, performing data cache hit processing to service the read I/O operation using the first data cache entry; responsive to determining the data cache does not include the first data cache entry corresponding to the first logical address, performing data cache miss processing including: determining whether a mapping cache includes a first descriptor corresponding to the first logical address; and responsive to determining the mapping cache includes the first descriptor corresponding to the first logical address, performing mapping cache hit processing to service the read I/O operation using the first descriptor of the mapping cache.

In at least one embodiment, data cache miss processing can include, responsive to determining the mapping cache does not include the first descriptor corresponding to the first logical address, performing read miss processing to service the read I/O operation using mapping information including a chain of metadata pages that maps the first logical address to a first physical location on non-volatile storage including the first content stored at the first logical address. Read miss processing can include: using the mapping information including the chain of metadata pages to map the first logical address to the physical location including the first content; reading the first content from the first physical location; promoting the first content to the data cache, including adding the first data cache entry to the data cache, wherein the first data cache entry maps the first logical address to the first content of the data cache; promoting the first physical location to the mapping cache, including adding the first descriptor corresponding to the first logical address to the mapping cache, wherein the first descriptor includes information describing the first physical location and wherein the first descriptor denotes a mapping cache entry that maps the first logical address to the first physical location; and returning the first content to the host.

In at least one embodiment, data cache hit processing can include: obtaining, using the first data cache entry, the first content associated with the first logical address from the data cache; and returning the first content, as obtained from the data cache, to the host.

In at least one embodiment mapping cache hit processing can include: obtaining first physical location information from the first descriptor, wherein the first physical location information identifies a first physical location on non-volatile storage including first content stored at the first logical address; reading, using the first physical location information, the first content from the first physical location; performing validation processing to validate the first content using a first hash value included in the first descriptor; and responsive to said validation processing successfully validating the first content, returning the first content to the host in response to said read I/O operation. Validation processing to validate the first content can include: computing, using a hash function, a second hash value for the first content read in said reading; determining whether the first hash value matches the second hash value; responsive to determining that the first hash value and the second hash value match, successfully validating the first content; and responsive to determining that the first hash value and the second hash value do not match, invalidating the first content and failing validation processing. The hash function can be a cryptographic hash function, and wherein the first hash value and the second hash value can be cryptographic hash values computed using the cryptographic hash function.

In at least one embodiment, responsive to validation processing of the mapping cache hit processing invalidating the first content and failing said validation processing of the first content, read miss processing can be performed. Read miss processing can include: using the mapping information including the chain of metadata (MD) pages to map the first logical address to a second physical location including the first content, wherein said second physical location is different from the first physical location; reading the first content from the second physical location which is different from the first physical location; promoting the first content to the data cache, including adding a corresponding data cache entry to the data cache, wherein the corresponding data cache entry maps the first logical address to the first content of the data cache; and returning the first content to the host. Read miss processing can include: evicting the first descriptor from the mapping cache; and subsequent to said reading the first content from the second physical location which is different from the first physical location, storing, in the mapping cache, a second descriptor corresponding to the first logical address, wherein the second descriptor includes second physical location information identifying the second physical location and the first logical address, wherein the second descriptor denotes a mapping cache entry that maps the first logical address to the second physical location. The first content can be relocated from the first physical location to the second physical location as a result of garbage collection processing performed on non-volatile backend storage including the first physical location and the second physical location.

In at least one embodiment, the computer-implemented method can be performed in a data storage system which implements a log structured system where write I/O operations received are recorded in a log and subsequently flushed from the log. Processing can include: receiving a first write I/O operation at the data storage system, wherein the first write I/O writes the first content to the first logical address; and responsive to said receiving the first write I/O operation, performing first processing including: recording a first record in the log for the first write I/O operation; storing in the data cache the first data cache entry corresponding to the first logical address, wherein the first data cache entry maps the first logical address to the first content that is cached in the data cache; flushing the first record denoting the first write I/O operation from the log; and storing the first content to the first physical location. Responsive to flushing the first record, processing can be performed that includes: evicting any existing mapping cache entry of the mapping cache corresponding to the first logical address; and storing in the mapping cache the first descriptor for the first logical address.

In at least one embodiment, the mapping cache can include a hash table of entries or indices, wherein the first logical address can map to a first entry or first index of the hash table associated with the first descriptor. The hash table can use the first logical address as a key which is associated with the first descriptor stored in the mapping cache. Each of the entries or indices of the hash table can be associated with a corresponding linked list of one or more descriptors each including a stored logical address that maps to said each entry or index of the hash table. The mapping cache can include a plurality of descriptors including the first descriptor. Each of the plurality of descriptors can be included in one of the corresponding linked lists associated with one of the hash table indices or entries, and wherein said each descriptor can also be included in an use queue used in connection with managing descriptors of the mapping cache in accordance with a least recently used policy. Processing can include: responsive to determining there is no free descriptor of the mapping cache, evicting another descriptor from the mapping cache; and using the evicted another descriptor as the first descriptor.

In at least one embodiment, determining whether the mapping cache includes the first descriptor corresponding to the first logical address can include: comparing the first logical address to a stored logical address included in the first descriptor; determining, in accordance with said comparing, whether the stored logical address matches the first logical address; and responsive to the stored logical address matching the first logical address, determining that the mapping cache includes the first descriptor corresponding to the first logical address. Data cache miss processing can include, responsive to determining that the mapping cache includes no descriptor corresponding to the first logical address, performing read miss processing. The read miss processing can include: reading the first content of the first logical address from a first physical location of back-end non-volatile storage, wherein said reading uses mapping information including a chain of metadata pages that maps the first logical address to the first physical location on non-volatile storage including the first content stored at the first logical address; promoting the first content associated with the first logical address to the data cache; and promoting the first physical location associated with the first logical address to the mapping cache.

BRIEF DESCRIPTION OF THE DRAWINGS

Features and advantages of the present disclosure will become more apparent from the following detailed description of exemplary embodiments thereof taken in conjunction with the accompanying drawings in which:

FIGS. 7A-7E and FIG. 8 are examples illustrating cached descriptors of the mapping cache and associated structures that can be used in at least one embodiment in accordance with the techniques of the present disclosure.

DETAILED DESCRIPTION OF EMBODIMENT(S)

Figure 1:
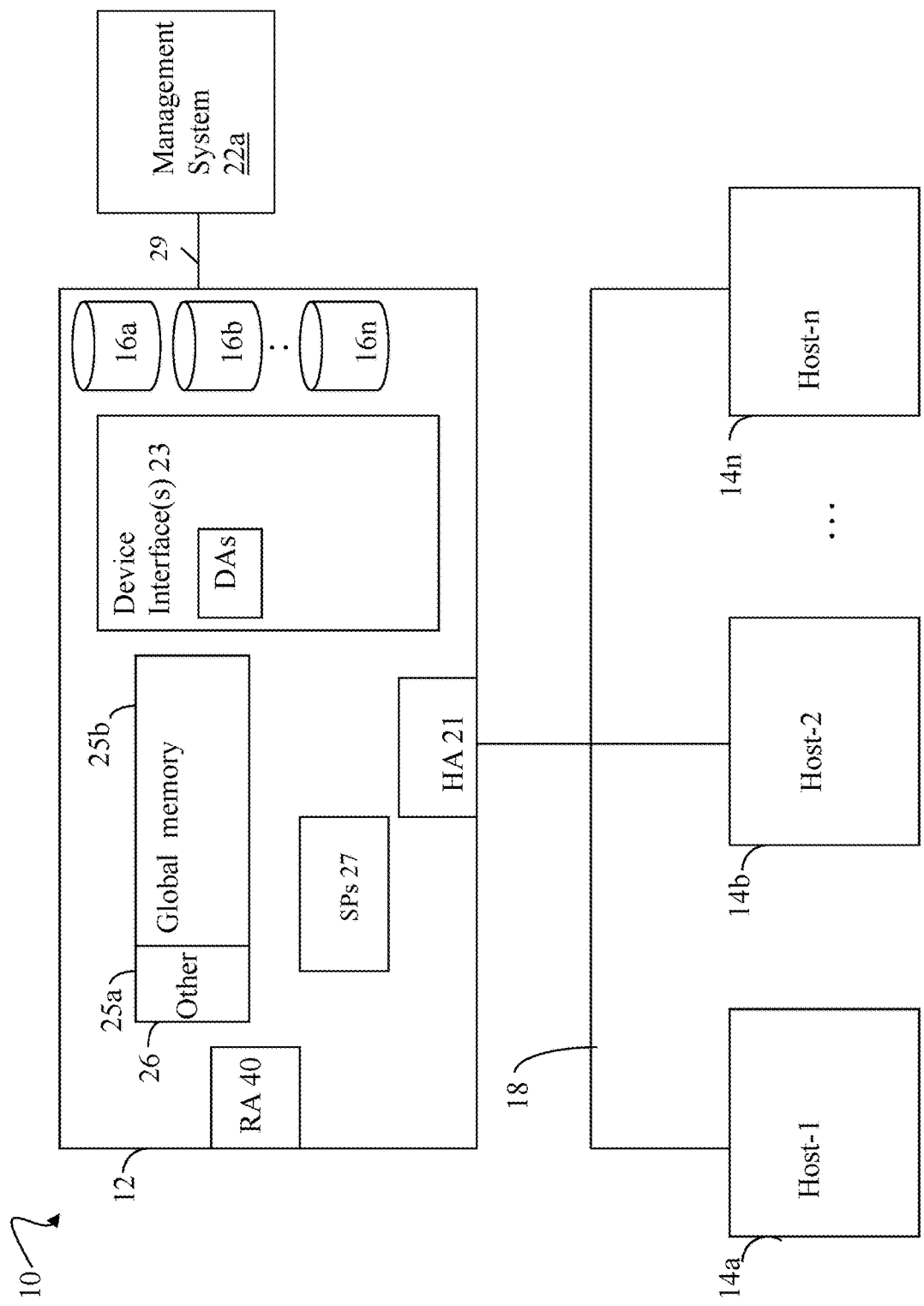
FIG. 1 is an example of components that may be included in a system in accordance with the techniques of the present disclosure.

A data storage system can be a log-based system or log-structured system (LSS) which persistently records write I/O operations, as well as possibly other operations, in a log. Subsequently, the persistently recorded operations can be flushed from the log. Use of the log provides for improved I/O performance and improved I/O latency.

Generally, an LSS can be characterized by allowing newly written content to be stored at free or unused space on a data storage device, and by performing garbage collection that allows holes of storage including unused or invalid data to be compacted and reused. In an LSS, newly written data can be persistently stored at new storage locations. As newly written data provides updated values for existing data stored at a logical address, the storage containing the existing data can be invalidated and freed for reuse. With an LSS, user or client write I/O operations, as well as optionally other operations, can be recorded in a log. Subsequently, log entries denoting the recorded operations can be flushed from the log. Flushing a recorded or logged write I/O of the log, where the write I/O writes new content to a logical address, can include storing the new written content at a next free or available physical storage location on longer term backend (BE) non-volatile storage. Thus, when a logical address with original content stored at a first physical location is updated or overwritten with new content, the new content can be stored at a second physical location which is different from the first physical location, and the storage associated with the first physical location can be freed and reused. Mapping information can be maintained that translates or maps a user or client logical address (sometimes referred to as a logical address or user data (UD) logical address) to a corresponding physical location storing the current content of the logical address. As new content is written or overwritten to a logical address, the corresponding mapping information can be updated to identify the current physical address or location storing the current or most up-to-date content of the logical address. The mapping information can include multiple layers or levels of translation. For example, the mapping information can include a chain of multiple metadata (MD) pages which are accessed and traversed to obtain the desired content for a corresponding logical address. Since the data storage system can include exabytes or even petabytes of stored user data, all the mapping information used to access such stored user data can be maintained on BE non-volatile storage.

Systems, such as data storage systems, can maintain and utilize a data cache to store frequently accessed pages of user data or content. The data cache can be, for example, a form of fast volatile memory such as a volatile form of random access memory (RAM) where cached content or data can be accessed and organized by logical address. In particular, the data cache can be used as a read data cache to store user data which is frequently read. For a read I/O requesting read data, the read data which is stored in the cache results in a cache hit or read cache hit. For a read cache hit, the requested read data can be retrieved from the cache and returned to the requester or originator of the read I/O. If the requested read data is not in the cache, a cache miss or read cache miss results where the requested read data can be retrieved from longer term BE non-volatile storage. A cache miss as compared to a cache hit results in an I/O performance penalty and increased I/O latency in order to service the read I/O and return the requested read data to the requester. Thus, use of the data cache can provide for read data cache hits and optimized performance such as by providing for improved I/O latency and improved utilization of system resources.

Generally, the data cache, as well as the cache in general, can be characterized as a critical and expensive resource which can have a limited size or capacity. Accordingly, due to the typical large size of user data in a system, it is typically not possible to cache all user data in the cache. As a result, a read cache miss of the data cache can occur when servicing a read I/O received at the data storage system. In order to access the read data needed to service the read I/O which triggered the read data cache miss, corresponding mapping information can be read and used to access the physical location on BE non-volatile storage containing the requested read data. Accessing and traversing multiple layers, levels or metadata pages of mapping information can be time consuming and increase I/O latency. As noted above, the mapping information can be stored on BE non-volatile storage which can further incur additional performance penalties to access. Thus, a system can also store mapping information in the cache. However, as with the user data and the limited size of the cache, not all metadata pages of the mapping information for all user data can be stored in the cache. As a result, accessing the multiple layers or levels of mapping information which can be needed for accessing the read data to service a read data cache miss can result in additional cache misses.

Accordingly, described in the present disclosure are techniques that overcome the above-noted drawbacks and provide for improved performance and improved use of cache. In at least one embodiment, a mapping cache can be maintained. In at least one embodiment, the mapping cache can be used to generally bypass using the mapping information of the chain of metadata pages to access requested content of a logical address from BE non-volatile storage.

In at least one embodiment, the mapping cache can be used to directly map UD logical addresses (LAs) to corresponding physical storage locations or addresses (PAs) in BE non-volatile storage where such PAs contain content stored at respective LAs. In this manner in at least one embodiment, the mapping cache can be used to bypass the use of a mapper component or mapping layer that can use the mapping information of the chain of metadata pages to read content from BE non-volatile storage.

When using the mapping cache, any operation that modifies the mapping information of the chain of metadata pages (e.g., used to map an LA to a corresponding PA containing the content of the LA) can invalidate a corresponding entry in the mapping cache. For example, first content C1 can be stored at the logical address LA, where C1 can be stored at a first physical address or location PA1. There can be an entry E1 in the mapping cache that maps LA to PA1. Subsequently, there can be a write that writes new content C2 to the LA. In an LSS, the write to LA results in storing the new updated content C2 at a new second physical address or location PA2 that is different from PA1. Additionally, the mapping information can be updated to now map LA to PA2 rather than PA1. As a result of updating the mapping information due to the writing of C2 to the LA, the mapping cache entry E1 is now invalid or stale.

In one solution, the mapping cache can sit above, or prior to, the data cache in the data path runtime stack. The workflow for read I/O processing for a read I/O that reads content from a logical address can first check the mapping cache for a relevant mapping cache entry to use to read requested read data. If there is a mapping cache hit such that the mapping cache includes a corresponding entry for the logical address, the mapping cache entry can be used to obtain or read the requested read data from BE non-volatile storage. The mapping cache entry maps the logical address to a physical address or location of content stored at the logical address, such that the physical address of the mapping cache entry can be used to read the requested read data. Alternatively, if there is a mapping cache miss, the data cache can be queried to determine whether the requested read data of the logical address is cached in the data cache. If there is a data cache hit, the read I/O can be serviced using the cached read data. If there is a data cache miss, corresponding mapping information for the logical address can be used to read the content of the logical address from a physical address or location on BE non-volatile storage.

In the foregoing solution to service the read I/O where the mapping cache is first accessed prior to the data cache as noted above, there can be additional overhead in maintaining the mapping cache coherency. Any operation that modifies the mapping information for a corresponding logical address also invalidates any existing mapping cache entry for the logical address. Since the mapping cache is accessed first prior to the data cache in the foregoing solution, mapping cache entries that become stale can also be removed or evicted from the mapping cache as part of ingest processing for any operation, such as a write I/O, that modifies the mapping information for a logical address. The ingest processing can be performed as part of the workflow of the requested operation prior to returning an acknowledgement to the host or other client that issued the operation. For example, ingest processing of a write that writes new content to a logical address can include the additional overhead of removing any existing mapping cache entry for the logical address prior to acknowledging the write to the client. Additionally, in multiple node storage systems where each node can maintain a separate node-local mapping cache, such invalidation and removal of mapping cache entries needs to be further coordinated among all the nodes in the systems thereby further increasing the latency of such operations that modify the mapping information.

In at least one embodiment, the techniques of the present disclosure provide for using the data cache and the mapping cache, and also more efficiently maintaining the foregoing data cache and mapping cache. In at least one embodiment, the techniques of the present disclosure provide for using the data cache and the mapping cache without removing or evicting stale mapping cache entries as part of write I/O ingest processing prior to acknowledging the write to the host or other client that issued the write I/O. More generally in at least one embodiment for an operation that modifies the mapping information for a logical address, the techniques of the present disclosure provide for using the data cache and the mapping cache without removing or evicting a stale mapping cache entry for the logical address as part of ingest processing of the operation, and thus without performing the additional overhead processing of removing or evicting the stale entry prior to acknowledging the operation to the host or other client.

In at least one embodiment in accordance with the techniques of the present disclosure, read I/O workflow processing for a read I/O that reads content from a logical address can include first determining whether the requested read data for the logical address is in the data cache. In at least one embodiment, an application programming interface or API can be used to query the data cache to determine whether there is a data cache hit for the logical address of the read I/O. If there is a data cache hit, the read can be serviced using content from the data cache. If there is a data cache miss, processing can then check the mapping cache to determine whether there is a mapping cache hit for the logical address. In at least one embodiment, if there is a mapping cache hit for the logical address, the mapping cache includes an entry mapping the logical address to the physical address or location of BE non-volatile storage containing the requested read data of the logical address. If there is a mapping cache hit, the physical address or location of the mapping cache entry corresponding to the logical address can be used to directly read the requested read data from the physical address or location. If there is both a data cache miss and also a mapping cache hit for the logical address of the read I/O, read miss processing can be performed that includes using the mapping information of the chain of metadata pages to read the requested content of the logical address from the physical address or location on BE non-volatile storage.

In at least one embodiment the mapping cache can be implemented using a hash table with the key being a logical address which is mapped to a corresponding page descriptor (sometimes simply referred to herein as descriptor). Thus in at least one embodiment, the mapping cache can include page descriptors associated with corresponding logical addresses. The corresponding page descriptor can include physical location information, such as an address, pointer or reference to the physical location containing the current or up-to-date content stored at the logical address. In at least one embodiment, the size of descriptors stored in the mapping cache can generally be much smaller than the actual content or user data (as may be stored using a traditional data cache). In at least one embodiment, the mapping cache can be used and implemented in addition to a data cache which is organized using logical addresses as keys and which provides for returning cached content stored at a particular logical address. Generally, for a specified number of logical addresses, the amount of cache consumed to store corresponding descriptors for the logical addresses in the mapping cache is expected to be much less than the amount of cache consumed to store the actual content or user data stored at the logical addresses. Thus it can be expected that a much larger number of descriptors can be stored in an amount of cache as compared to the number of logical addresses whose content can be stored in the same amount of cache.

In at least one embodiment, read I/O processing which reads data from a target logical address can include determining a data cache miss with respect to the target logical address. Responsive to the data cache miss with respect to the target logical address of the read I/O, processing can include querying the hash table of the mapping cache to determine whether there is a hit or miss of the mapping cache with respect to the target logical address. A lookup or query of the hash table can be performed using the target logical address as the key. A hash function F can be used which maps the target logical address LA to an entry or index j of the hash table HT (e.g., F(LA)=HT(j)). If the mapped entry or index HT(j) does include a corresponding page descriptor for the target logical address, a hit occurs with respect to the mapping cache and thus hash table thereof. Alternatively, if the mapped entry or index HT(j) does not include a corresponding page descriptor for the target logical address, a miss occurs with respect to the mapping cache and thus hash table thereof. Responsive to the hit with respect to the hash table of the mapping cache, the corresponding page descriptor as stored in, or associated with, HT(j) of the mapping cache can be used to access the requested read data stored at the target logical address. In at least one embodiment, the page descriptor can include: i) the target logical address; and ii) physical location information such as a pointer, address or reference to the physical storage location containing the requested read data stored at the target logical address. Thus, processing the read I/O responsive to the hit with respect to the hash table (e.g., HT(j)) of the mapping cache can include directly reading the requested read data using the pointer, address or reference to the physical storage location of the page descriptor returned by the query or lookup in the hash table. In at least one embodiment, the hash table can include "N" entries or hash lines, where each such entry or hash line can be further associated with a bucket of one or more page descriptors mapped to the single entry or hash line of the hash table. Thus each entry, hash line or bucket can correspond to a single index of the hash table. A given logical address LA can be mapped, using the hash function F, to a corresponding hash table (HT) entry, index or bucket "j". It may be possible for multiple different LAs (e.g., UD LAs) to map to the same HT(j). In at least one embodiment each HT(j) denoting a hash line, bucket, index or entry, can include all page descriptors of associated logical addresses which map to j using the hash function F, where such page descriptors are stored in the mapping cache and associated with HT(j). In at least one embodiment, each entry, index or bucket HT(j) can include a linked list of pages descriptors having associated logical addresses which map to entry, index or bucket HT(j). In at least one embodiment, each bucket HT(j) can be a singly linked list of page descriptors having associated logical addresses which hash or map (using the hash function) to HT(j).

In at least one embodiment as noted above, a miss with respect to the mapping cache, and thus the hash table thereof, can occur if there is no corresponding page descriptor stored in the hash table for the target logical address, where the target logical address is mapped by the hash function F to the index, entry or bucket j of the hash table (e.g., HT(j) does not include a page descriptor with a stored logical address matching the target logical address). Responsive to the miss with respect to the hash table of the mapping cache, processing can include: using the chain of mapping information to access the requested read data; promoting or caching the read data for the target logical address in the data cache; and promoting to the mapping cache a mapping from the target logical address to an address or pointer of its corresponding content by adding a mapping cache entry in the mapping cache corresponding to the target logical address. In at least one embodiment, adding the mapping cache entry in the mapping cache for the target logical address can include: obtaining a free or new page descriptor which is updated to include relevant corresponding information for the target logical address; and associating the page descriptor with the corresponding entry, index or bucket HT(j) for the target logical address. Updating the page descriptor for the target logical address for the read I/O can include updating the page descriptor to include the physical location information, such as including an address, pointer or reference to the physical storage location including the content or user data stored at the target logical address.

In at least one embodiment, the techniques of the present disclosure can use a hash value such as a cryptographic hash value HV1 obtained using a cryptographic hash algorithm or function CHF applied to user data or content stored at a logical address. The cryptographic hash value can be stored and maintained in the page descriptor associated with the logical address. The cryptographic hash value can be used to validate and determine whether using the page descriptor results in obtaining the current or up-to-date content for the logical address, where such content can be returned to the host or requester which issued the read I/O. As discussed in more detail below, the cryptographic hash value stored in the page descriptor can be used in validation processing to detect cases where the descriptor is stale, out of date, or invalid such as a result of garbage collection which has moved or relocated the user data or content of the logical address corresponding to the descriptor, and where the physical location denoted by the stale descriptor has been garbage collected and reused to include other data not associated with the logical address of the descriptor. In at least one embodiment, when adding a page descriptor to the hash table of the mapping cache for a logical address, a cryptographic hash or hash value HV1 of the content or user data stored at the logical address can be calculated using the CHF, where HV1 can then be stored in the page descriptor along with other information discussed herein. In this manner, the cryptographic hash HV1 of the descriptor can represent the expected user data or content associated with the descriptor and its corresponding logical address (also stored in the descriptor) at the time the page descriptor is added to the hash table. Subsequently when using the descriptor (such as with hit processing with respect to the mapping cache) to retrieve user data or content which is associated with the descriptor and which is stored at a logical address, the reference, pointer or address of the descriptor (e.g., physical location information) can be used to read existing stored content from non-volatile BE storage. Validation processing can then be performed to validate the existing content read. Validation processing can include computing a second cryptographic hash HV2 for the existing content read from the non-volatile BE storage using the same hashing algorithm, such as the same cryptographic hashing function or algorithm CHF, used to compute HV1. HV1 can be compared to HV2. If HV1 matches or equals HV2, validation processing succeeds, determines that the descriptor including HV1 is valid, determines that the existing content read is valid, and determines that the existing content read can be returned such as in response to the read I/O reading from the logical address. Put another way, if HV1 matches HV2, it can be determined that first content (which was stored at the physical location described by descriptor when the descriptor was first added to the hash table) matches the existing content read at a point in time subsequent to when the page descriptor was added to the hash table. If HV1 does not match or does not equal HV2, validation processing fails and determines that the existing content read is invalid and the descriptor including HV1 is also invalid. An embodiment can generally use a CHF or other sufficiently strong hashing algorithm in connection with validation processing such that the probability of the CHF or other algorithm generating the same hash value for two different data values is non-existent or sufficiently small.

In at least one embodiment, as a result of validation processing failing, read miss processing can be performed using the chain of metadata pages of mapping information to read the desired content for from the requested corresponding logical address from its current physical location on BE non-volatile storage. In at least one embodiment, read miss processing can also then include: i) promoting the current physical location of the content of the logical address to the mapping cache, where such promoting includes populating the mapping cache with an entry mapping the logical address to the current physical location of the content (e.g., where the mapping cache is indexed by the logical address that is mapped to the current physical location containing the content); and ii) promoting the content of the logical address to the data cache including populating the data cache with an entry mapping the logical address to the content stored at the logical address (e.g., where the data cache is indexed by the logical address that is mapped to the cached content).

In at least one embodiment, a user data or client logical address, which can be the target logical address of a client I/O operation such as a read or write operation, can be uniquely identified using a volume or logical device ID (identifier) in combination with an LBA (logical block address) or offset.

In at least one embodiment, a new descriptor can be added or promoted to the mapping cache and thus added to the hash table of the mapping cache. In at least one embodiment for a read I/O requesting content stored at a logical address, read miss processing can be performed responsive to determining a miss with respect to the data cache (e.g., the data cache is determined not to include content stored at the logical address of the read I/O operation) and also a miss with respect to the mapping cache (e.g., the hash table of the mapping cache is determined not to include a descriptor corresponding to the logical address of the read I/O operation), where the data cache can be queried for potentially servicing the read I/O prior to querying the mapping cache. In at least one embodiment, read miss processing can include reading the requested content from BE non-volatile storage, and then populating both the mapping cache and data cache with respective entries for the logical address of the read I/O operation. In at least one embodiment, read miss processing can include using a chain of mapping information to read the content requested by the read I/O operation from a physical location on non-volatile BE storage to service the read. A new descriptor can then be added to the hash table of the mapping cache, where the new descriptor is associated with a corresponding logical address mapped to the physical storage location of the content requested by the read I/O operation. Additionally, an entry can be added to the data cache that maps the logical address to the content stored in the data cache.

In at least one embodiment, a flush operation can be performed that flushes a recorded or logged write I/O from the log where the write I/O writes new data to a target logical address. In at least one embodiment, the flush operation workflow can include writing the new data written by the flushed write I/O to a physical location on non-volatile BE storage. In at least one embodiment, the flush operation workflow can update the hash table of the mapping cache to map the write I/O's target logical address to the physical location of the new data written by the flushed write I/O operation. Thus the foregoing updating of the hash table of the mapping cache results in invalidating any existing entry of the mapping cache for the write I/O's target logical address. In at least one embodiment, if there is an existing mapping cache entry for the target logical address, the existing mapping cache entry can be updated to map to the physical location of the new data written. Otherwise if there is no existing mapping cache entry for the target logical address, then flushing results in adding a new mapping cache entry that maps the target logical address to the physical location of the new data written by the flushed write I/O. In at least one embodiment with the flushing processing or workflow, if there is an existing mapping cache entry for the target logical address, the existing mapping cache entry can be evicted or removed and then replaced with the new mapping cache entry.

In at least one embodiment, flushing of the log can be performed as a background process with an associated flushing workflow that can be characterized as generally not I/O latency sensitive. In comparison, ingest processing of an operation, such as for write I/Os, performed prior to returning an acknowledgement to a host can be characterized as more I/O latency sensitive such as relative to flushing as a background process. As a result, updating the mapping cache in the flushing workflow in accordance with the techniques of the present disclosure can generally have a negligible impact on I/O latency. In accordance with the techniques of the present disclosure in at least one embodiment, omitting the additional overhead of removing mapping cache entries in ingest processing for operations that modify mapping information of logical addresses can result in improved performance and reduced I/O latency.

In at least one embodiment, unsuccessful validation processing associated with a mapping cache hit can trigger adding a new descriptor to the mapping cache and its hash table. For example, a read I/O requesting to read content from logical address LA1 can initially result in a mapping cache hit, where the hash table includes a descriptor D1 corresponding to LA1, and where hit processing is performed. The physical location information of D1 can identify a physical storage location P1 which is supposed to contain the valid content stored at LA1. D1 can include a cryptographic hash HV1 of the valid content C1 stored at LA1 where HV1 was previously computed and stored in D1 when D1 was previously added to the hash table. Thus, at the time D1 is added to the hash table, C1 is stored at P1. As part of mapping cache hit processing, the physical location information of D1 can be used to read the current content K currently stored at P1. Garbage collection processing may have moved or relocated the valid content C1 of LA1 (where C1 has the corresponding cryptographic hash value HV1) from P1 to another physical location. As a result since P1 was previously added to the mapping cache and hash table, P1 may have been reclaimed and reused to store the other content K. After retrieving K from P1 as part of hit processing, validation processing can be performed using HV1 to determine whether P1 still includes C1, or whether P1 includes other data or content such as K. If such validation processing fails, processing can further include determining that D1 is stale or invalid, and performing miss processing which includes using the chain of mapping information to obtain the current content stored at LA1 from the non-volatile BE storage. As with read miss processing noted above in at least one embodiment, the mapping cache and for data cache can be updated to include corresponding entries for the logical address LA1.

The foregoing and other aspects of the techniques of the present disclosure are described in more detail in the following paragraphs.

Referring to the FIG. 1, shown is an example of an embodiment of a SAN 10 that is used in connection with performing the techniques described herein. The SAN 10 includes a data storage system 12 connected to the host systems (also sometimes referred to as hosts) 14*a*-14*n* through the communication medium 18. In this embodiment of the SAN 10, the n hosts 14*a*-14*n* access the data storage system 12, for example, in performing input/output (I/O) operations or data requests. The communication medium 18 can be any one or more of a variety of networks or other type of communication connections as known to those skilled in the art. The communication medium 18 can be a network connection, bus, and/or other type of data link, such as a hardwire or other connections known in the art. For example, the communication medium 18 can be the Internet, an intranet, a network, or other wireless or other hardwired connection(s) by which the host systems 14*a*-14*n* access and communicate with the data storage system 12, and also communicate with other components included in the SAN 10.

Each of the host systems 14*a*-14*n* and the data storage system 12 included in the SAN 10 are connected to the communication medium 18 by any one of a variety of connections as provided and supported in accordance with the type of communication medium 18. The processors included in the host systems 14*a*-14*n* and data storage system 12 can be any one of a variety of proprietary or commercially available single or multi-processor system, such as an Intel-based processor, or other type of commercially available processor able to support traffic in accordance with each particular embodiment and application.

It should be noted that the particular examples of the hardware and software included in the data storage system 12 are described herein in more detail, and can vary with each particular embodiment. Each of the hosts 14*a*-14*n* and the data storage system 12 can all be located at the same physical site, or, alternatively, be located in different physical locations. The communication medium 18 used for communication between the host systems 14a-14n and the data storage system 12 of the SAN 10 can use a variety of different communication protocols such as block-based protocols (e.g., SCSI, FC, iSCSI), file system-based protocols (e.g., NFS or network file server), and the like. Some or all of the connections by which the hosts 14a-14n and the data storage system 12 are connected to the communication medium 18 can pass through other communication devices, such as switching equipment, a phone line, a repeater, a multiplexer or even a satellite.

Each of the host systems 14a-14n can perform data operations. In the embodiment of the FIG. 1, any one of the host computers 14a-14n issues a data request to the data storage system 12 to perform a data operation. For example, an application executing on one of the host computers 14a-14n performs a read or write operation resulting in one or more data requests to the data storage system 12.

It should be noted that although the element 12 is illustrated as a single data storage system, such as a single data storage array, the element 12 also represents, for example, multiple data storage arrays alone, or in combination with, other data storage devices, systems, appliances, and/or components having suitable connectivity to the SAN 10 in an embodiment using the techniques herein. It should also be noted that an embodiment can include data storage arrays or other components from one or more vendors. In subsequent examples illustrating the techniques herein, reference is made to a single data storage array by a vendor. However, as will be appreciated by those skilled in the art, the techniques herein are applicable for use with other data storage arrays by other vendors and with other components than as described herein for purposes of example.

In at least one embodiment, the data storage system 12 is a data storage appliance or a data storage array including a plurality of data storage devices (PDs) 16a-16n. The data storage devices 16a-16n include one or more types of data storage devices such as, for example, one or more rotating disk drives and/or one or more solid state drives (SSDs). An SSD is a data storage device that uses solid-state memory to store persistent data. SSDs refer to solid state electronics devices as distinguished from electromechanical devices, such as hard drives, having moving parts. Flash devices or flash memory-based SSDs are one type of SSD that contains no moving mechanical parts. In at least one embodiment, the flash devices can be constructed using nonvolatile semiconductor NAND flash memory. The flash devices include, for example, one or more SLC (single level cell) devices and/or MLC (multi level cell) devices.

In at least one embodiment, the data storage system or array includes different types of controllers, adapters or directors, such as an HA 21 (host adapter), RA 40 (remote adapter), and/or device interface(s) 23. Each of the adapters (sometimes also known as controllers, directors or interface components) can be implemented using hardware including a processor with a local memory with code stored thereon for execution in connection with performing different operations. The HAs are used to manage communications and data operations between one or more host systems and the global memory (GM). In an embodiment, the HA is a Fibre Channel Adapter (FA) or other adapter which facilitates host communication. The HA 21 can be characterized as a front end component of the data storage system which receives a request from one of the hosts 14a-n. In at least one embodiment, the data storage array or system includes one or more RAs used, for example, to facilitate communications between data storage arrays. The data storage array also includes one or more device interfaces 23 for facilitating data transfers to/from the data storage devices 16a-16n. The data storage device interfaces 23 include device interface modules, for example, one or more disk adapters (DAs) (e.g., disk controllers) for interfacing with the flash drives or other physical storage devices (e.g., PDS 16a-n). The DAs can also be characterized as back end components of the data storage system which interface with the physical data storage devices.

One or more internal logical communication paths exist between the device interfaces 23, the RAs 40, the HAs 21, and the memory 26. An embodiment, for example, uses one or more internal busses and/or communication modules. In at least one embodiment, the global memory portion 25b is used to facilitate data transfers and other communications between the device interfaces, the HAs and/or the RAs in a data storage array. In one embodiment, the device interfaces 23 performs data operations using a system cache included in the global memory 25b, for example, when communicating with other device interfaces and other components of the data storage array. The other portion 25a is that portion of the memory used in connection with other designations that can vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, can also be included in an embodiment.

The host systems 14a-14n provide data and access control information through channels to the storage systems 12, and the storage systems 12 also provide data to the host systems 14a-n also through the channels. The host systems 14a-n do not address the drives or devices 16a-16n of the storage systems directly, but rather access to data is provided to one or more host systems from what the host systems view as a plurality of logical devices, logical volumes (LVs) also referred to herein as logical units (e.g., LUNs). A logical unit (LUN) can be characterized as a disk array or data storage system reference to an amount of storage space that has been formatted and allocated for use to one or more hosts. A logical unit has a logical unit number that is an I/O address for the logical unit. As used herein, a LUN or LUNs refers to the different logical units of storage referenced by such logical unit numbers. The LUNs have storage provisioned from portions of one or more physical disk drives or more generally physical storage devices. For example, one or more LUNs can reside on a single physical disk drive, data of a single LUN can reside on multiple different physical devices, and the like. Data in a single data storage system, such as a single data storage array, can be accessible to multiple hosts allowing the hosts to share the data residing therein. The HAs are used in connection with communications between a data storage array and a host system. The RAs are used in facilitating communications between two data storage arrays. The DAs include one or more types of device interfaced used in connection with facilitating data transfers to/from the associated disk drive(s) and LUN(s) residing thereon. For example, such device interfaces can include a device interface used in connection with facilitating data transfers to/from the associated flash devices and LUN(s) residing thereon. It should be noted that an embodiment can use the same or a different device interface for one or more different types of devices than as described herein.

In an embodiment in accordance with the techniques herein, the data storage system as described can be characterized as having one or more logical mapping layers in which a logical device of the data storage system is exposed to the host whereby the logical device is mapped by such mapping layers of the data storage system to one or more physical devices. Additionally, the host can also have one or more additional mapping layers so that, for example, a host side logical device or volume is mapped to one or more data storage system logical devices as presented to the host.

It should be noted that although examples of the techniques herein are made with respect to a physical data storage system and its physical components (e.g., physical hardware for each HA, DA, HA port and the like), the techniques herein can be performed in a physical data storage system including one or more emulated or virtualized components (e.g., emulated or virtualized ports, emulated or virtualized DAs or HAs), and also a virtualized or emulated data storage system including virtualized or emulated components.

Also shown in the FIG. 1 is a management system 22a used to manage and monitor the data storage system 12. In one embodiment, the management system 22a is a computer system which includes data storage system management software or application that executes in a web browser. A data storage system manager can, for example, view information about a current data storage configuration such as LUNs, storage pools, and the like, on a user interface (UI) in a display device of the management system 22a. Alternatively, and more generally, the management software can execute on any suitable processor in any suitable system. For example, the data storage system management software can execute on a processor of the data storage system 12.

Information regarding the data storage system configuration is stored in any suitable data container, such as a database. The data storage system configuration information stored in the database generally describes the various physical and logical entities in the current data storage system configuration. The data storage system configuration information describes, for example, the LUNs configured in the system, properties and status information of the configured LUNs (e.g., LUN storage capacity, unused or available storage capacity of a LUN, consumed or used capacity of a LUN), configured RAID groups, properties and status information of the configured RAID groups (e.g., the RAID level of a RAID group, the particular PDs that are members of the configured RAID group), the PDs in the system, properties and status information about the PDs in the system, data storage system performance information such as regarding various storage objects and other entities in the system, and the like.

Consistent with other discussion herein, management commands issued over the control or management path include commands that query or read selected portions of the data storage system configuration, such as information regarding the properties or attributes of one or more LUNs. The management commands also include commands that write, update, or modify the data storage system configuration, such as, for example, to create or provision a new LUN (e.g., which result in modifying one or more database tables such as to add information for the new LUN), and the like.

It should be noted that each of the different controllers or adapters, such as each HA, DA, RA, and the like, can be implemented as a hardware component including, for example, one or more processors, one or more forms of memory, and the like. Code can be stored in one or more of the memories of the component for performing processing.

The device interface, such as a DA, performs I/O operations on a physical device or drive 16a-16n. In the following description, data residing on a LUN is accessed by the device interface following a data request in connection with I/O operations. For example, a host issues an I/O operation that is received by the HA 21. The I/O operation identifies a target location from which data is read from, or written to, depending on whether the I/O operation is, respectively, a read or a write operation request. In at least one embodiment using block storage services, the target location of the received I/O operation is expressed in terms of a LUN and logical address or offset location (e.g., LBA or logical block address) on the LUN. Processing is performed on the data storage system to further map the target location of the received I/O operation, expressed in terms of a LUN and logical address or offset location on the LUN, to its corresponding physical storage device (PD) and location on the PD. The DA which services the particular PD performs processing to either read data from, or write data to, the corresponding physical device location for the I/O operation.

It should be noted that an embodiment of a data storage system can include components having different names from that described herein but which perform functions similar to components as described herein. Additionally, components within a single data storage system, and also between data storage systems, can communicate using any suitable technique described herein for exemplary purposes. For example, the element 12 of the FIG. 1 in one embodiment is a data storage system, such as a data storage array, that includes multiple storage processors (SPs). Each of the SPs 27 is a CPU including one or more "cores" or processors and each have their own memory used for communication between the different front end and back end components rather than utilize a global memory accessible to all storage processors. In such embodiments, the memory 26 represents memory of each such storage processor.

Generally, the techniques herein can be used in connection with any suitable storage system, appliance, device, and the like, in which data is stored. For example, an embodiment can implement the techniques herein using a midrange data storage system as well as a higher end or enterprise data storage system.

The data path or I/O path can be characterized as the path or flow of I/O data through a system. For example, the data or I/O path can be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receive a response (possibly including requested data) in connection such I/O commands.

The control path, also sometimes referred to as the management path, can be characterized as the path or flow of data management or control commands through a system. For example, the control or management path is the logical flow through hardware and software components or layers in connection with issuing data storage management command to and/or from a data storage system, and also receiving responses (possibly including requested data) to such control or management commands. For example, with reference to the FIG. 1, the control commands are issued from data storage management software executing on the management system 22a to the data storage system 12. Such commands, for example, establish or modify data services, provision storage, perform user account management, and the like.

Consistent with other discussion herein, management commands result in processing that can include reading and/or modifying information in the database storing data storage system configuration information.

The data path and control path define two sets of different logical flow paths. In at least some of the data storage system configurations, at least part of the hardware and network connections used for each of the data path and control path differ. For example, although both control path and data path generally use a network for communications, some of the hardware and software used can differ. For example, with reference to the FIG. 1, a data storage system has a separate physical connection 29 from a management system 22*a* to the data storage system 12 being managed whereby control commands are issued over such a physical connection 29. However, user I/O commands are never issued over such a physical connection 29 provided solely for purposes of connecting the management system to the data storage system. In any case, the data path and control path each define two separate logical flow paths.

Figure 2A:
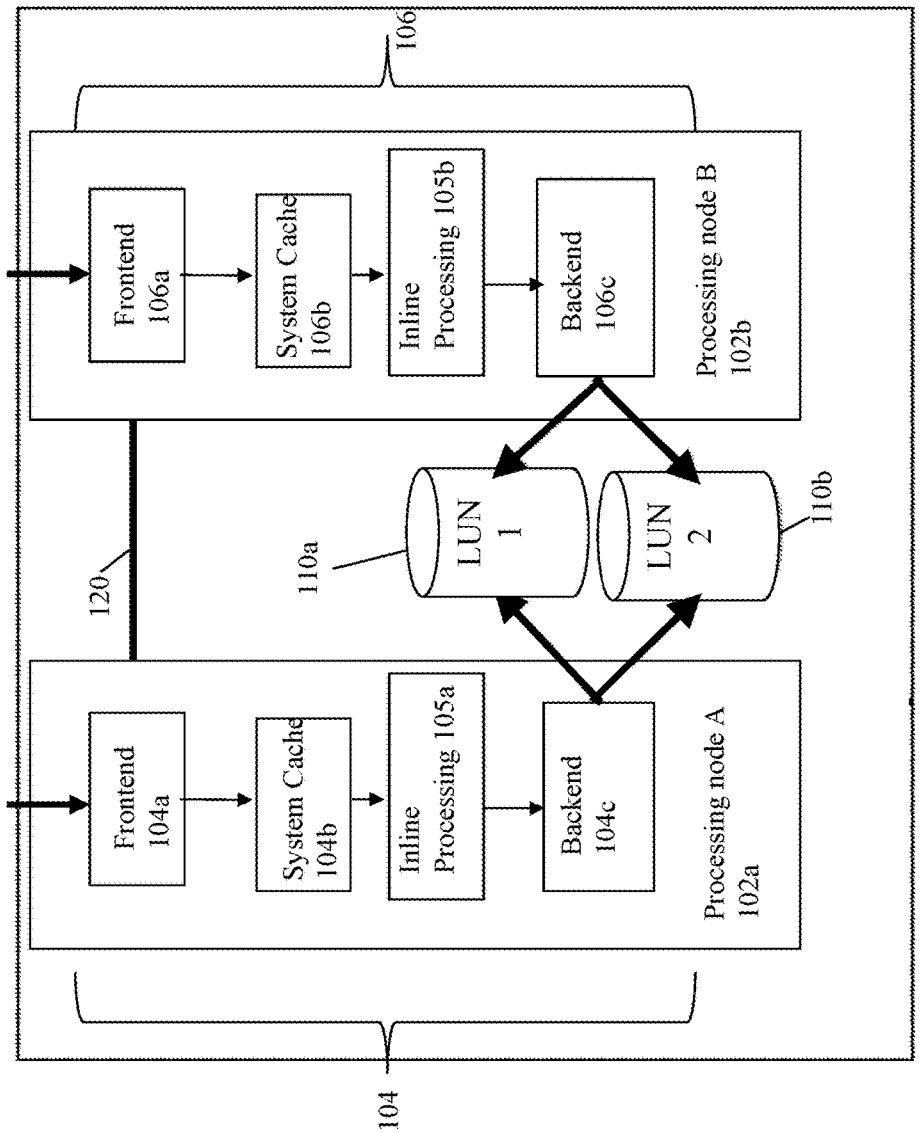
FIG. 2A is an example illustrating the I/O path or data path in connection with processing data in at least one embodiment in accordance with the techniques of the present disclosure.

With reference to the FIG. 2A, shown is an example 100 illustrating components that can be included in the data path in at least one existing data storage system in accordance with the techniques of the present disclosure. The example 100 includes two processing nodes A 102*a* and B 102*b* and the associated software stacks 104, 106 of the data path, where I/O requests can be received by either processing node 102*a* or 102*b*. In the example 200, the data path 104 of processing node A 102*a* includes: the frontend (FE) component 104*a* (e.g., an FA or front end adapter) that translates the protocol-specific request into a storage system-specific request; a system cache layer 104*b* where data is temporarily stored; an inline processing layer 105*a*; and a backend (BE) component 104*c* that facilitates movement of the data between the system cache and non-volatile physical storage (e.g., back end physical non-volatile storage devices or PDs accessed by BE components such as DAs as described herein). During movement of data in and out of the system cache layer 104*b* (e.g., such as in connection with read data from, and writing data to, physical storage 110*a*, 110*b*), inline processing can be performed by layer 105*a*. Such inline processing operations of 105*a* can be optionally performed and can include any one of more data processing operations in connection with data that is flushed from system cache layer 104*b* to the back-end non-volatile physical storage 110*a*, 110*b*, as well as when retrieving data from the back-end non-volatile physical storage 110*a*, 110*b* to be stored in the system cache layer 104*b*. In at least one embodiment, the inline processing can include, for example, performing one or more data reduction operations such as data deduplication or data compression. The inline processing can include performing any suitable or desirable data processing operations as part of the I/O or data path.

In a manner similar to that as described for data path 104, the data path 106 for processing node B 102*b* has its own FE component 106*a*, system cache layer 106*b*, inline processing layer 105*b*, and BE component 106*c* that are respectively similar to the components 104*a*, 104*b*, 105*a* and 104*c*. The elements 110*a*, 110*b* denote the non-volatile BE physical storage provisioned from PDs for the LUNs, whereby an I/O can be directed to a location or logical address of a LUN and where data can be read from, or written to, the logical address. The LUNs 110*a*, 110*b* are examples of storage objects representing logical storage entities included in an existing data storage system configuration. Since, in this example, writes, or more generally I/Os, directed to the LUNs 110*a*, 110*b* can be received for processing by either of the nodes 102*a* and 102*b*, the example 100 illustrates what can also be referred to as an active-active configuration.

In connection with a write operation received from a host and processed by the processing node A 102*a*, the write data can be written to the system cache 104*b*, marked as write pending (WP) denoting it needs to be written to the physical storage 110*a*, 110*b* and, at a later point in time, the write data can be destaged or flushed from the system cache to the physical storage 110*a*, 110*b* by the BE component 104*c*. The write request can be considered complete once the write data has been stored in the system cache whereby an acknowledgement regarding the completion can be returned to the host (e.g., by component the 104*a*). At various points in time, the WP data stored in the system cache is flushed or written out to the physical storage 110*a*, 110*b*.

In connection with the inline processing layer 105*a*, prior to storing the original data on the physical storage 110*a*, 110*b*, one or more data reduction operations can be performed. For example, the inline processing can include performing data compression processing, data deduplication processing, and the like, that can convert the original data (as stored in the system cache prior to inline processing) to a resulting representation or form which is then written to the physical storage 110*a*, 110*b*.

In connection with a read operation to read a block of data, a determination is made as to whether the requested read data block is stored in its original form (in system cache 104*b* or on physical storage 110*a*, 110*b*), or whether the requested read data block is stored in a different modified form or representation. If the requested read data block (which is stored in its original form) is in the system cache, the read data block is retrieved from the system cache 104*b* and returned to the host. Otherwise, if the requested read data block is not in the system cache 104*b* but is stored on the physical storage 110*a*, 110*b* in its original form, the requested data block is read by the BE component 104*c* from the backend storage 110*a*, 110*b*, stored in the system cache and then returned to the host.

If the requested read data block is not stored in its original form, the original form of the read data block is recreated and stored in the system cache in its original form so that it can be returned to the host. Thus, requested read data stored on physical storage 110*a*, 110*b* can be stored in a modified form where processing is performed by 105*a* to restore or convert the modified form of the data to its original data form prior to returning the requested read data to the host.

Also illustrated in FIG. 2A is an internal network interconnect 120 between the nodes 102*a*, 102*b*. In at least one embodiment, the interconnect 120 can be used for internode communication between the nodes 102*a*, 102*b*.

In connection with at least one embodiment in accordance with the techniques of the present disclosure, each processor or CPU can include its own private dedicated CPU cache (also sometimes referred to as processor cache) that is not shared with other processors. In at least one embodiment, the CPU cache, as in general with cache memory, can be a form of fast memory (relatively faster than main memory which can be a form of RAM). In at least one embodiment, the CPU or processor cache is on the same die or chip as the processor and typically, like cache memory in general, is far more expensive to produce than normal RAM used as main memory. The processor cache can be substantially faster than the system RAM used as main memory. The processor cache can contain information that the processor will be immediately and repeatedly accessing. The faster memory of the CPU cache can for example, run at a refresh rate that's closer to the CPU's clock speed, which minimizes wasted cycles. In at least one embodiment, there can be two or more levels (e.g., L1, L2 and L3) of cache. The CPU or processor cache can include at least an L1 level cache that is the local or private CPU cache dedicated for use only by that particular processor. The two or more levels of cache in a system can also include at least one other level of cache (LLC or lower level cache) that is shared among the different CPUs. The L1 level cache serving as the dedicated CPU cache of a processor can be the closest of all cache levels (e.g., L1-L3) to the processor which stores copies of the data from frequently used main memory locations. Thus, the system cache as described herein can include the CPU cache (e.g., the L1 level cache or dedicated private CPU/processor cache) as well as other cache levels (e.g., the LLC) as described herein. Portions of the LLC can be used, for example, to initially cache write data which is then flushed to the backend physical storage such as BE PDs providing non-volatile storage. For example, in at least one embodiment, a RAM based memory can be one of the caching layers used as to cache the write data that is then flushed to the backend physical storage. When the processor performs processing, such as in connection with the inline processing 105a, 105b as noted above, data can be loaded from the main memory and/or other lower cache levels into its CPU cache.

In at least one embodiment, the data storage system can be configured to include one or more pairs of nodes, where each pair of nodes can be generally as described and represented as the nodes 102a-b in the FIG. 2A. For example, a data storage system can be configured to include at least one pair of nodes and at most a maximum number of node pairs, such as for example, a maximum of 4 node pairs. The maximum number of node pairs can vary with embodiment. In at least one embodiment, a base enclosure can include the minimum single pair of nodes and up to a specified maximum number of PDs. In some embodiments, a single base enclosure can be scaled up to have additional BE non-volatile storage using one or more expansion enclosures, where each expansion enclosure can include a number of additional PDs. Further, in some embodiments, multiple base enclosures can be grouped together in a load-balancing cluster to provide up to the maximum number of node pairs. Consistent with other discussion herein, each node can include one or more processors and memory. In at least one embodiment, each node can include two multi-core processors with each processor of the node having a core count of between 8 and 28 cores. In at least one embodiment, the PDs can all be non-volatile SSDs, such as flash-based storage devices and storage class memory (SCM) devices. It should be noted that the two nodes configured as a pair can also sometimes be referred to as peer nodes. For example, the node A 102a is the peer node of the node B 102b, and the node B 102b is the peer node of the node A 102a.

In at least one embodiment, the data storage system can be configured to provide both block and file storage services with a system software stack that includes an operating system running directly on the processors of the nodes of the system.

In at least one embodiment, the data storage system can be configured to provide block-only storage services (e.g., no file storage services). A hypervisor can be installed on each of the nodes to provide a virtualized environment of virtual machines (VMs). The system software stack can execute in the virtualized environment deployed on the hypervisor. The system software stack (sometimes referred to as the software stack or stack) can include an operating system running in the context of a VM of the virtualized environment. Additional software components can be included in the system software stack and can also execute in the context of a VM of the virtualized environment.

In at least one embodiment, each pair of nodes can be configured in an active-active configuration as described elsewhere herein, such as in connection with FIG. 2A, where each node of the pair has access to the same PDs providing BE storage for high availability. With the active-active configuration of each pair of nodes, both nodes of the pair process I/O operations or commands and also transfer data to and from the BE PDs attached to the pair. In at least one embodiment, BE PDs attached to one pair of nodes are not shared with other pairs of nodes. A host can access data stored on a BE PD through the node pair associated with or attached to the PD.

In at least one embodiment, each pair of nodes provides a dual node architecture where both nodes of the pair can be generally identical in terms of hardware and software for redundancy and high availability. Consistent with other discussion herein, each node of a pair can perform processing of the different components (e.g., FA, DA, and the like) in the data path or I/O path as well as the control or management path. Thus, in such an embodiment, different components, such as the FA, DA and the like of FIG. 1, can denote logical or functional components implemented by code executing on the one or more processors of each node. Each node of the pair can include its own resources such as its own local (i.e., used only by the node) resources such as local processor(s), local memory, and the like.

Consistent with other discussion herein, a cache can be used for caching write I/O data and other cached information. In one system, the cache used for caching logged writes can be implemented using multiple caching devices or PDs, such as non-volatile (NV) SSDs such as NVRAM devices that are external with respect to both of the nodes or storage controllers. The caching devices or PDs used to implement the cache can be configured in a RAID group of any suitable RAID level for data protection. In at least one embodiment, the caching PDs form a shared non-volatile cache accessible to both nodes of the dual node architecture. It should be noted that in a system where the caching devices or PDs are external with respect to the two nodes, the caching devices or PDs are in addition to other non-volatile PDs accessible to both nodes. The additional PDs provide the BE non-volatile storage for the nodes where the cached data stored on the caching devices or PDs is eventually flushed to the BE PDs as discussed elsewhere herein. In at least one embodiment, a portion of each node's local volatile memory can also be used for caching information, such as blocks or pages of user data and metadata. For example, such node-local cached pages of user data and metadata can be used in connection with servicing reads for such user data and metadata.

In the following paragraphs, the one or more caching devices or PDs may be referred to as a data journal or log used in the data storage system. In such a system, the caching devices or PDs can be non-volatile log devices or PDs upon which the log is persistently stored. It should be noted that as discussed elsewhere herein, both nodes can also each have local volatile memory used as a node local cache for storing data, structures and other information. In at least one embodiment, the local volatile memory local to one of the nodes is used exclusively by that one node.

In a data storage system, minimizing the latency of I/O requests is a critical performance metric. In at least one data storage system using the dual node architecture such as described in connection with FIG. 2A, for write operations, latency can be affected by the amount of time taken to store the write data in the log where the write data is visible to both nodes or controllers of the system.

Consistent with other discussion herein, the log file that persistently record user operations, such as write I/Os, can be used to optimize write operation latency. Generally, a write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse.

It should be noted that the flushing of the log can be performed in response to an occurrence of any one or more defined conditions. For example, the log can be flushed in response to determining that the amount of reclaimed log space available for use and allocation is less than a specified threshold amount or size.

In at least one embodiment, a metadata (MD) structure of mapping information can be used in accordance with the techniques herein.

The mapping information can be used, for example, to map a logical address, such as a LUN and an LBA or offset, to its corresponding storage location, such as a physical storage location on BE non-volatile PDs of the system. Consistent with discussion elsewhere herein, write requests or operations stored in the log can be flushed to the BE PDs (non-volatile) providing storage locations for the written data. For example, a logged write operation that writes first data to a logical address can be flushed whereby the logged first data is written out to a physical storage location on a BE PD. The mapping information can be used to map the logical address to the physical storage location containing the content or data stored at the logical address. In at least one embodiment, the mapping information includes a MD structure that is hierarchical structure of multiple layers of MD pages or blocks.

Figure 3:
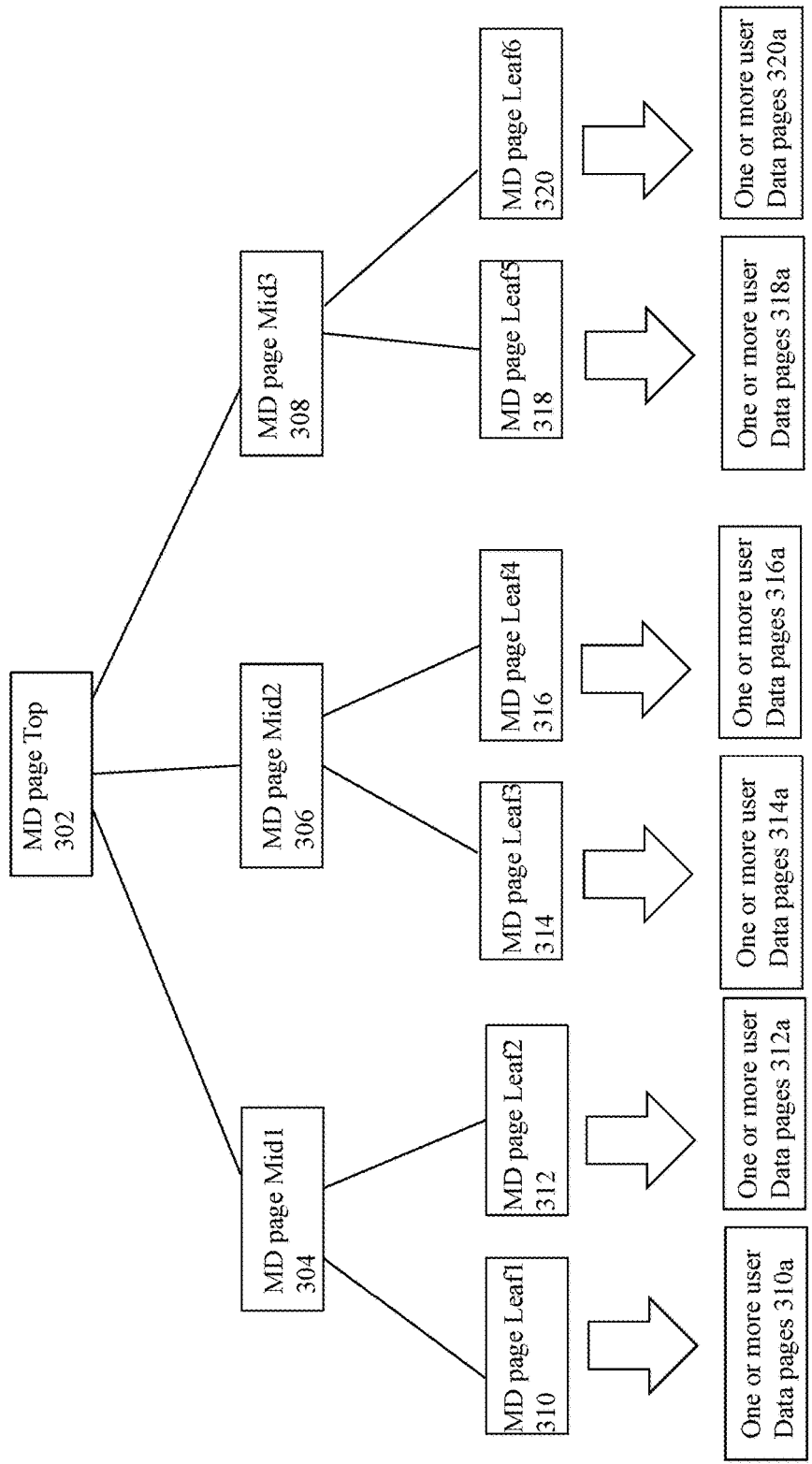
FIGS. 3, 4, 5, and 6A are examples of mapping information in the form of a metadata structure that can be used in connection with mapping logical addresses to physical addresses or storage locations in at least one embodiment in accordance with the techniques of the present disclosure.

In at least one embodiment, the mapping information or MD structure for a LUN, such as a LUN A, can be in the form of a tree having a plurality of levels of MD pages. More generally, the mapping structure can be in the form of any ordered list or hierarchical structure. In at least one embodiment, the mapping structure for the LUN A can include LUN MD in the form of a tree having 3 levels including a single top or root node (TOP node), a single mid-level (MID node) and a bottom level of leaf nodes (LEAF nodes), where each of the MD page leaf nodes can point to, or reference (directly or indirectly) one or more pages of stored data, such as user data stored on the LUN A. Each node in the tree corresponds to a MD page including MD for the LUN A. More generally, the tree or other hierarchical structure of various MD pages of the mapping structure for the LUN A can include any suitable number of levels, such as more than 3 levels where there are multiple mid-levels. In at least one embodiment the tree of MD pages for the LUN can be a B+ tree, also sometimes referred to as an "N-ary" tree, where "N" indicates that each node in the tree structure can have up to a maximum of N child nodes. For example, in at least one embodiment, the tree of MD pages for the LUN can specify N=512 whereby each node in the tree structure can have up to a maximum of N child nodes. For simplicity of illustration, the tree structure of MD pages, corresponding to the mapping structure in at least one embodiment, is represented in FIG. 3 as including only 3 levels where each node in the tree can have at most 3 child nodes. Generally, the techniques herein can be used with any layered or hierarchical structure of MD pages.

Before describing in more detail the mapping information of MD pages that can be used in an at least one embodiment to map a logical address to a corresponding physical storage location or address, further details are described in connection with using a log for logging user or client operations, such as write I/Os.

Consistent with other discussion herein, the log can be used to optimize write operation latency. Generally, the write operation writing data is received by the data storage system from a host or other client. The data storage system then performs processing to persistently record the write operation in the log. Once the write operation is persistently recorded in the log, the data storage system can send an acknowledgement to the client regarding successful completion of the write operation. At some point in time subsequent to logging the write operation the log, the write operation is flushed or destaged from the log to the BE PDs. In connection with flushing the recorded write operation from the log, the data written by the write operation is stored on non-volatile physical storage of a BE PD. The space of the log used to record the write operation that has been flushed can now be reclaimed for reuse. The write operation can be recorded in the log in any suitable manner and can include, for example, recording a target logical address to which the write operation is directed and recording the data written to the target logical address by the write operation.

In the log, each logged operation can be recorded in the next logically sequential record of the log. For example, a logged write I/O and write data (e.g., write I/O payload) can be recorded in a next logically sequential record of the log. The log can be circular in nature in that once a write operation is recorded in the last record of the log, recording of the next write proceeds with recording in the first record of the log.

The typical I/O pattern for the log as a result of recording write I/Os and possibly other information in successive consecutive log records includes logically sequential and logically contiguous writes (e.g., logically with respect to the logical offset or ordering within the log). Data can also be read from the log as needed (e.g., depending on the particular use or application of the log) so typical I/O patterns can also include reads. The log can have a physical storage layout corresponding to the sequential and contiguous order in which the data is written to the log. Thus, the log data can be written to sequential and consecutive physical storage locations in a manner corresponding to the logical sequential and contiguous order of the data in the log. Additional detail regarding use and implementation of the log in at least one embodiment in accordance with the techniques of the present disclosure is provided below.

Figure 2B:
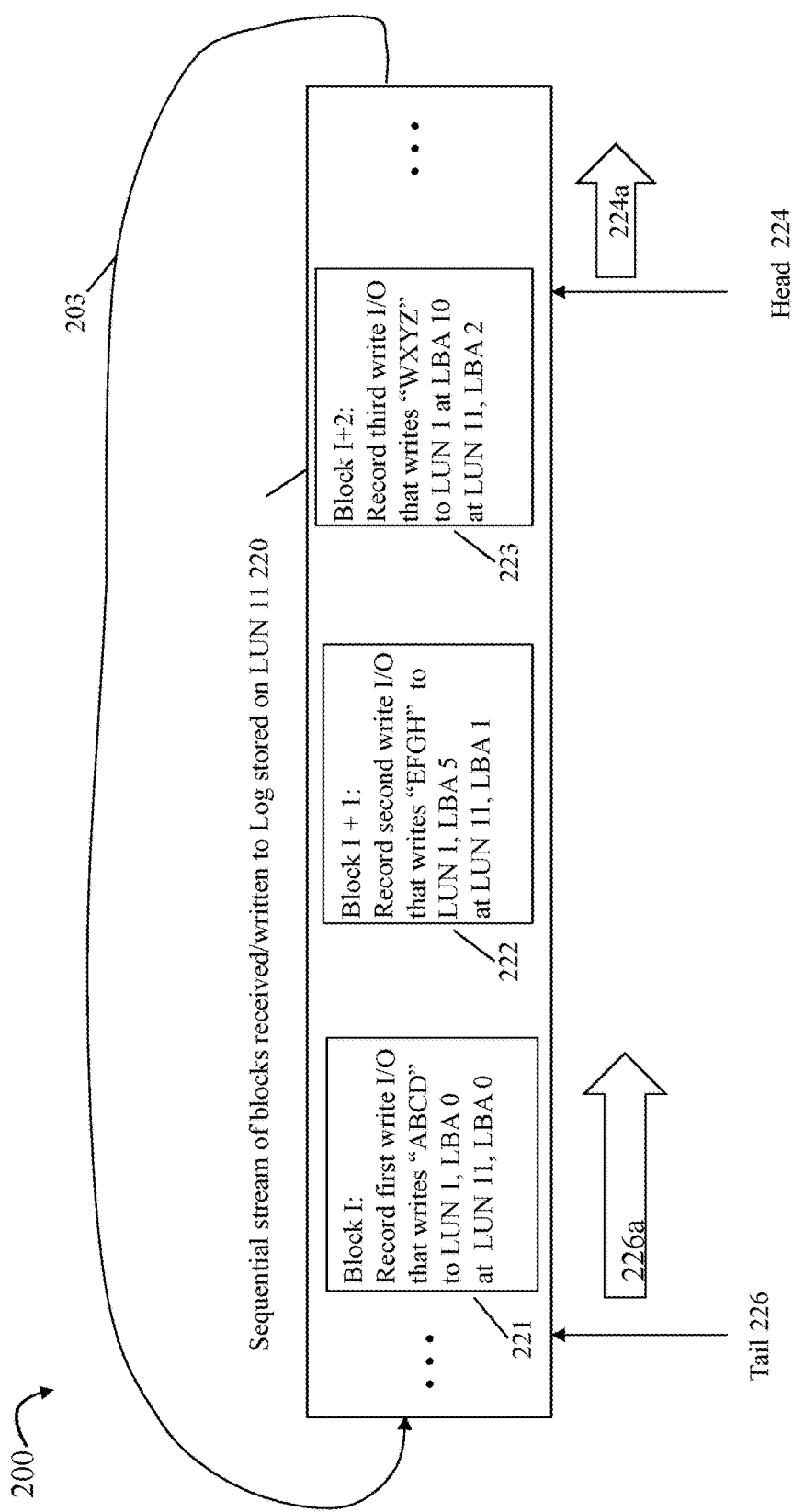
FIGS. 2B, 2C, 2D and 2E are examples illustrating use of a log or journal recording client operations in at least one embodiment in accordance with the techniques of the present disclosure.

Referring to FIG. 2B, shown is an example 200 illustrating a sequential stream 220 of operations or requests received that are written to a log in an embodiment in accordance with the techniques of the present disclosure. In this example, the log can be stored on the LUN 11 where logged operations or requests, such as write I/Os that write user data to a file, target LUN or other storage object, are recorded as records in the log. The element 220 includes information or records of the log for 3 write I/Os or updates which are recorded in the records or blocks I 221, I+1 222 and I+2 223 of the log (e.g., where I denotes an integer offset of a record or logical location in the log). The blocks I 221, I+1 222, and I+2 223 can be written sequentially in the foregoing order for processing in the data storage system. The block 221 can correspond to the record or block I of the log stored at LUN 11, LBA 0 that logs a first write I/O operation. The first write I/O operation can write "ABCD" to the target logical address LUN 1, LBA 0. The block 222 can correspond to the record or block I+1 of the log stored at LUN 11, LBA 1 that logs a second write I/O operation. The second write I/O operation can write "EFGH" to the target logical address LUN 1, LBA 5. The block 223 can correspond to the record or block I+2 of the log stored at LUN 11, LBA 2 that logs a third write I/O operation. The third write I/O operation can write "WXYZ" to the target logical address LUN 1, LBA 10. Thus, each of the foregoing 3 write I/O operations logged in 221, 222 and 223 write to 3 different logical target addresses or locations each denoted by a target LUN and logical offset on the target LUN. As illustrated in the FIG. 2B, the information recorded in each of the foregoing records or blocks 221, 222 and 223 of the log can include the target logical address to which data is written and the write data written to the target logical address.

The head pointer 224 can denote the next free record or block of the log used to record or log the next write I/O operation. The head pointer can be advanced 224a to the next record in the log as each next write I/O operation is recorded. When the head pointer 224 reaches the end of the log by writing to the last sequential block or record of the log, the head pointer can advance 203 to the first sequential block or record of the log in a circular manner and continue processing. The tail pointer 226 can denote the next record or block of a recorded write I/O operation in the log to be destaged and flushed from the log. Recorded or logged write I/Os of the log are processed and flushed whereby the recorded write I/O operation that writes to a target logical address or location (e.g., target LUN and offset) is read from the log and then executed or applied to a non-volatile BE PD location mapped to the target logical address (e.g., where the BE PD location stores the data content of the target logical address). Thus, as records are flushed from the log, the tail pointer 226 can logically advance 226a sequentially (e.g., advance to the right toward the head pointer and toward the end of the log) to a new tail position. Once a record or block of the log is flushed, the record or block is freed for reuse in recording another write I/O operation. When the tail pointer reaches the end of the log by flushing the last sequential block or record of the log, the tail pointer advances 203 to the first sequential block or record of the log in a circular manner and continue processing. Thus, the circular logical manner in which the records or blocks of the log are processed form a ring buffer in which the write I/Os are recorded.

When a write I/O operation writing user data to a target logical address is persistently recorded and stored in the non-volatile log, the write I/O operation is considered complete and can be acknowledged as complete to the host or other client originating the write I/O operation to reduce the write I/O latency and response time. The write I/O operation and write data are destaged at a later point in time during a flushing process that flushes a recorded write of the log to the BE non-volatile PDs, updates and writes any corresponding metadata for the flushed write I/O operation, and frees the record or block of the log (e.g., where the record or block logged the write I/O operation just flushed). The metadata updated as part of the flushing process for the target logical address of the write I/O operation can include mapping information as described elsewhere herein. The mapping information of the metadata for the target logical address can identify the physical address or location on provisioned physical storage on a non-volatile BE PD storing the data of the target logical address. The target logical address can be, for example, a logical address on a logical device, such as a LUN and offset or LBA on the LUN.

Figure 2C:
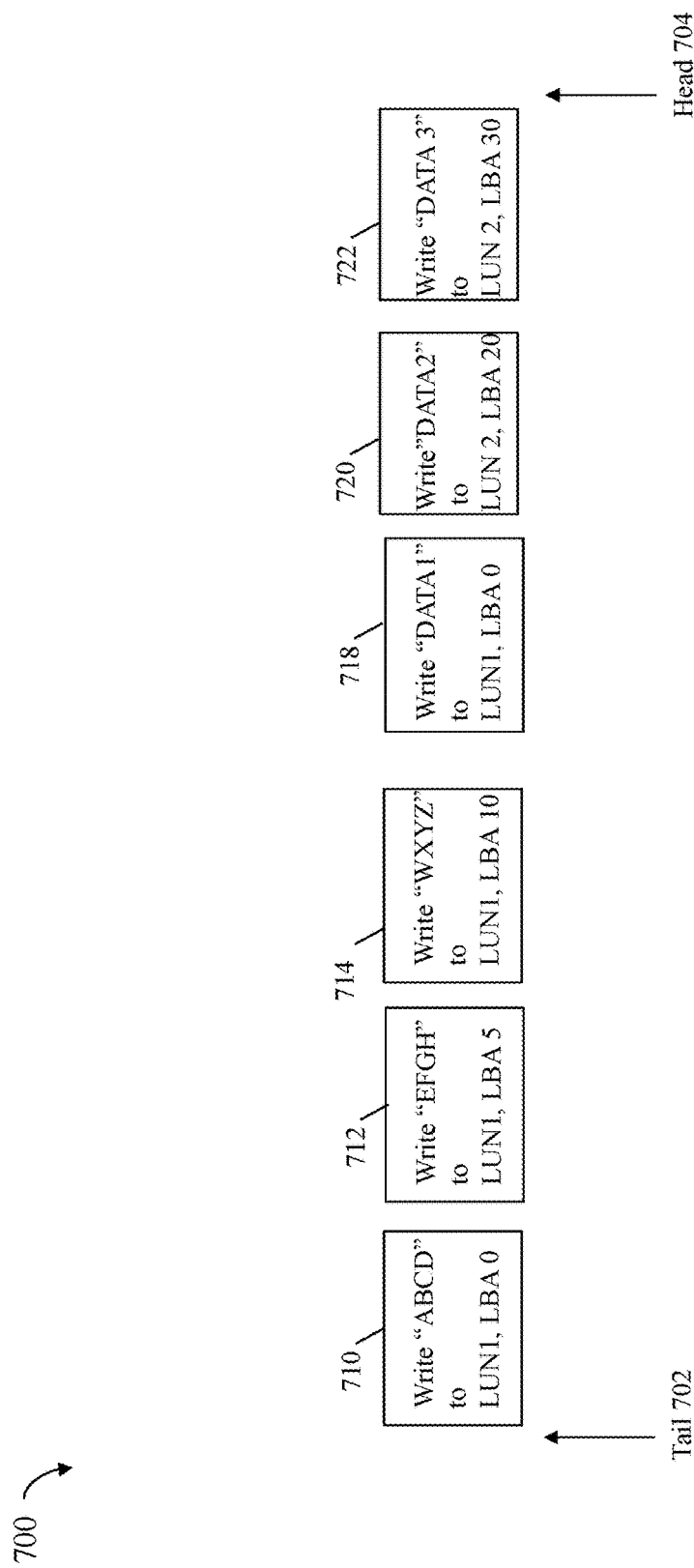

Referring to FIG. 2C, shown is an example of information that can be included in a log, such as a log of user or client write operations, in an embodiment in accordance with the techniques of the present disclosure.

The example 700 includes the head pointer 704 and the tail pointer 702. The elements 710, 712, 714, 718, 720 and 722 denote 6 records of the log for 6 write I/O operations recorded in the log. The element 710 is a log record for a write operation that writes "ABCD" to the LUN 1, LBA 0. The element 712 is a log record for a write operation that writes "EFGH" to the LUN 1, LBA 5. The element 714 is a log record for a write operation that writes "WXYZ" to the LUN 1, LBA 10. The element 718 is a log record for a write operation that writes "DATA1" to the LUN 1, LBA 0. The element 720 is a log record for a write operation that writes "DATA2" to the LUN 2, LBA 20. The element 722 is a log record for a write operation that writes "DATA3" to the LUN 2, LBA 30. As illustrated in FIG. 2C, the log records 710, 712, 714, 718, 720 and 722 can also record the write data (e.g., write I/O operation payload) written by the write operations. It should be noted that the log records 710, 712 and 714 of FIG. 2C correspond respectively to the log records 221, 222 and 223 of FIG. 2B.

The log can be flushed sequentially or in any suitable manner to maintain desired data consistency. In order to maintain data consistency when flushing the log, constraints can be placed on an order in which the records of the log are flushed or logically applied to the stored data while still allowing any desired optimizations. In some embodiments, portions of the log can be flushed in parallel in accordance with any necessary constraints needed in order to maintain data consistency. Such constraints can consider any possible data dependencies between logged writes (e.g., two logged writes that write to the same logical address) and other logged operations in order to ensure write order consistency.

Figure 2D:
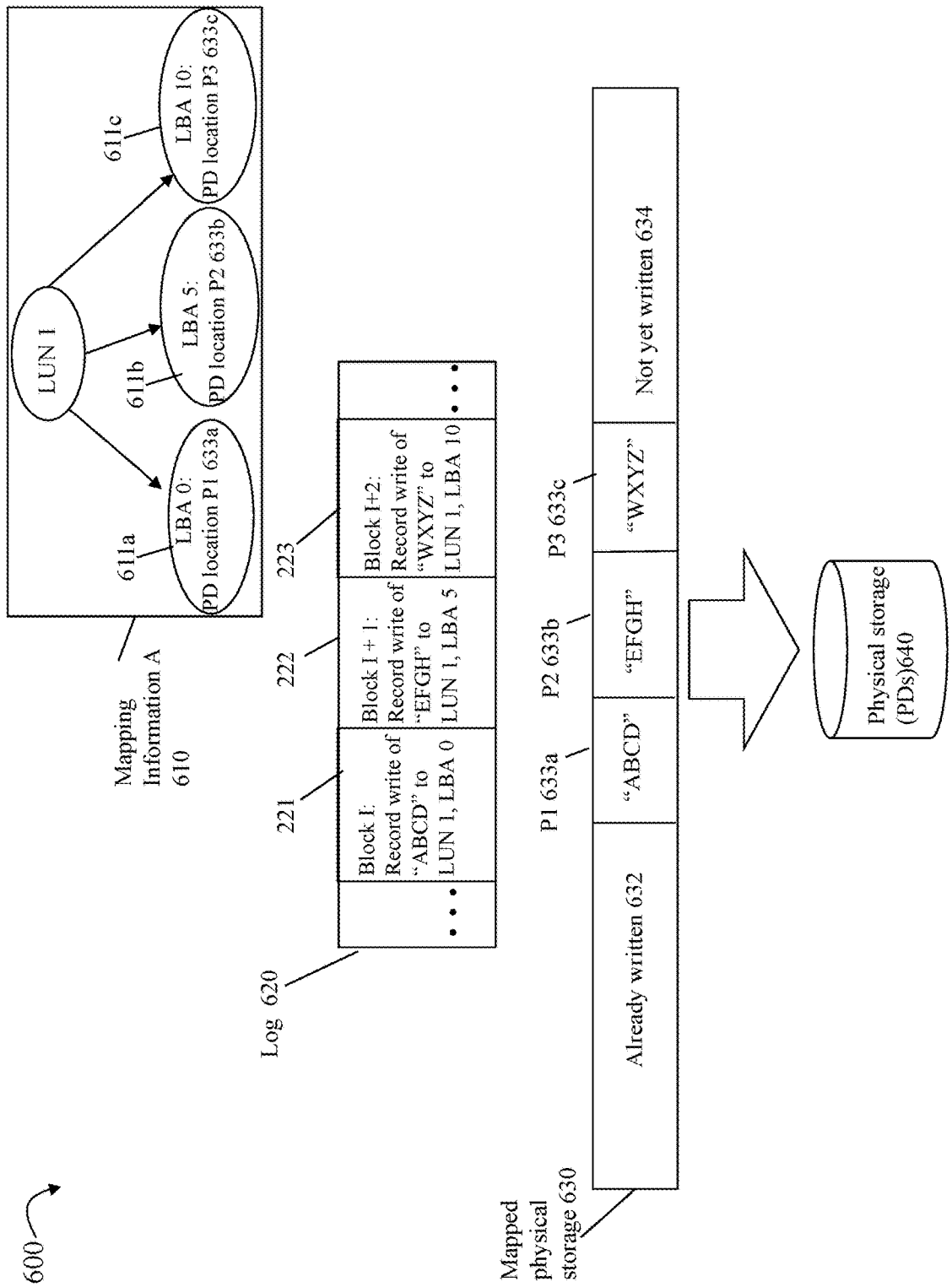

Referring to FIG. 2D, shown is an example 600 illustrating the flushing of logged writes and the physical data layout of user data on BE PDs in at least one embodiment in accordance with the techniques of the present disclosure. FIG. 2D includes the log 620, the mapping information A 610, and the physical storage (i.e., BE PDs) 640. The element 630 represents the physical layout of the user data as stored on the physical storage 640. The element 610 can represent the logical to physical storage mapping information A 610 created for 3 write I/O operations recorded in the log records or blocks 221, 222 and 223.

The mapping information A 610 includes the elements 611*a-c* denoting the mapping information, respectively, for the 3 target logical address of the 3 recorded write I/O operations in the log records 221, 222, and 223. The element 611*a* of the mapping information denotes the mapping information for the target logical address LUN1, LBA 0 of the block 221 of the log 620. In particular, the block 221 and mapping information 611*a* indicate that the user data "ABCD" written to LUN 1, LBA 0 is stored at the physical location (PD location) P1 633*a* on the physical storage 640. The element 611*b* of the mapping information denotes the mapping information for the target logical address LUN1, LBA 5 of the block 222 of the log 620. In particular, the block 222 and mapping information 611b indicate that the user data "EFGH" written to LUN 1, LBA 5 is stored at the physical location (PD location) P2 633b on the physical storage 640. The element 611c of the mapping information denotes the mapping information for the target logical address LUN 1, LBA 10 of the block 223 of the log 620. In particular, the block 223 and mapping information 611 indicate that the user data "WXYZ" written to LUN 1, LBA 10 is stored at the physical location (PD location) P3 633c on the physical storage 640.

The mapped physical storage 630 illustrates the sequential contiguous manner in which user data can be stored and written to the physical storage 640 as the log records or blocks are flushed. In this example, the records of the log 620 can be flushed and processing sequentially (e.g., such as described in connection with FIG. 2B) and the user data of the logged writes can be sequentially written to the mapped physical storage 630 as the records of the log are sequentially processed. As the user data pages of the logged writes to the target logical addresses are written out to sequential physical locations on the mapped physical storage 630, corresponding mapping information for the target logical addresses can be updated. The user data of the logged writes can be written to mapped physical storage sequentially as follows: 632, 633a, 633b, 633c and 634. The element 632 denotes the physical locations of the user data written and stored on the BE PDs for the log records processed prior to the block or record 221. The element 633a denotes the PD location P1 of the user data "ABCD" stored at LUN 1, LBA 1. The element 633b denotes the PD location P2 of the user data "EFGH" stored at LUN 1, LBA 5. The element 633c denotes the PD location P3 of the user data "WXYZ" stored at LUN 1, LBA 10. The element 634 denotes the physical locations of the user data written and stored on the BE PDs for the log records processed after the block or record 223.

In one aspect, the data layout (e.g., format or structure) of the log-based data of the log 620 as stored on non-volatile storage can also be physically sequential and contiguous where the non-volatile storage used for the log can be viewed logically as one large log with a layout which is sequential in the order it is written to the log.

The data layout of the flushed log data as stored on the BE PDs can also be physically sequential and contiguous. As log records of the log 620 are flushed, the user data written by each flushed log record can be stored at the next sequential physical location on the BE PDs. Thus, flushing the log can result in writing user data pages or blocks to sequential consecutive physical locations on the BE PDs. In some embodiments, multiple logged writes can be flushed in parallel as a larger chunk to the next sequential chunk or portion of the mapped physical storage 630. In at least one embodiment, modifications to metadata including mapping information used by the data storage system can also be recorded in the log 620 and flushed to the mapped physical storage 630, and thus the BE PDs 640, in a manner similar to that as described herein for the written user data which can include data written by host-based writes.

Consistent with other discussion herein, the mapped physical storage 630 can correspond to the BE PDs providing BE non-volatile storage used for persistently storing user data as well as metadata, such as the mapping information. With a log structured system as discussed herein, as recorded writes in the log are processed, the data written by the writes can be written to new sequential physical storage locations on the BE PDs. Thus, with a log structured system, the data and associated metadata can be written sequentially to the log 620 and also can be written sequentially to the mapped physical storage 630. Thus, one characteristic of log structured systems (LSSs) is that updates do not overwrite the existing copy, such as of user data written by a write operation. Rather, the updated or new data written at a target logical address can be stored at a next sequential location in the log and also in a next sequential physical storage location on the BE PDs. In an LSS of the data storage system in at least one embodiment, the physical storage 630 denoting the physical storage of the BE PDs can also be implemented and managed as a logical circular log in a manner similar to that as described above in connection with the log of FIGS. 2B, 2C and 2D containing the data prior to being flushed to the physical storage 630 of the BE PDs.

In data storage systems implementing an LSS such as described here, garbage collection can be performed by the data storage system at various times in an embodiment. Garbage collection processing can be performed by the data storage system on the BE PDs to aggregate allocated stored data blocks with valid data to eliminate free unused physical storage locations (e.g., which can store invalid or stale content of overwritten logical addresses) that can be interspersed between the data blocks containing valid data. Such aggregation can include physically copying or moving data blocks of valid user data stored at various physical locations on BE non-volatile storage into a single larger physical storage location. From the perspective of the data storage system, valid data can include the current or most recent copy of client-based write data such as host-based write data (e.g., written by write I/Os received from one or more hosts), as well as the current or most recent copy of flushed metadata, such as the mapping information used by the data storage system to locate a current copy of content associated with a logical address such as, for example, of a read or write I/O operation. After the valid data blocks are relocated from their source locations on multiple source blocks to target locations of a target block, the source blocks can denote larger contiguous chunks of storage which are free and available for reuse. Having such a larger contiguous chunk of free storage facilitates efficiently fulfilling subsequent allocation requests for free BE PD capacity from different components for different uses. Such subsequent allocation requests can include, for example, requests for storing data that is flushed from the log as well as other requests for larger amounts of storage.

A specified size or chunk of physical storage of the BE PDs can be referred to as a physical large block or PLB. In at least one embodiment, garbage collection can be performed on physical storage units that are PLBs. In at least one embodiment, each PLB can be 2 MBs in size. Within a single PLB, the valid data and the holes (e.g., containing invalid data or designated as an unused portion) can be interspersed since, for example, write granularity size units can be 4K chunks or blocks.

In a data storage system implementing an LSS, garbage collection (sometimes denoted herein as GC) can be performed by the data storage system in a continuous manner to manage its BE PDs and reclaim physical storage of holes including unused storage or storage with invalid data. The GC results in performing additional overhead operations such as additional read and write operations in connection with reading valid data from the multiple source PLBs and aggregating and writing the valid data of the multiple source PLBs to a single target PLB. In this manner, the source PLBs can be freed and made available for reuse. In a data storage system or DS which implements an LSS, such as described above for storing writes or updates to user data, the DS itself can perform GC as needed to obtain free contiguous chunks of storage such as non-volatile storage on the BE PDs. The GC performed by the DS can be done as a maintenance or background task as user logical addresses are overwritten or updated with multiple writes to the same logical address. In this case, the DS can perform GC to reclaim and reuse the storage which contains old or invalid content that is replaced or updated with new content in the LSS. Consistent with other discussion herein, both valid content and invalid content can be stored within a first large contiguous chunk of storage whereby the DS can perform GC to move the valid content to a second chunk in order to free all storage within the first chunk. Such GC as performed by the DS results in write amplification denoting the extra or additional writes performed in connection with copying or moving valid content in order to obtain the contiguous free chunk of storage.

In at least one embodiment, each PLB can be further partitioned into smaller units of storage such as multiple data pages. For example in at least one embodiment, each PLB can be 2 MB in size where the PLB can be further partitioned into 4K byte pages.

Consistent with other discussion herein, the mapped physical storage 630 can correspond to the BE PDs providing BE non-volatile storage used for persistently storing user data as well as metadata, such as the mapping information. With a log-structured system as discussed herein, as recorded writes in the log are processed, the data written by the writes can be written to new physical storage locations on the BE PDs.

Figure 2E:
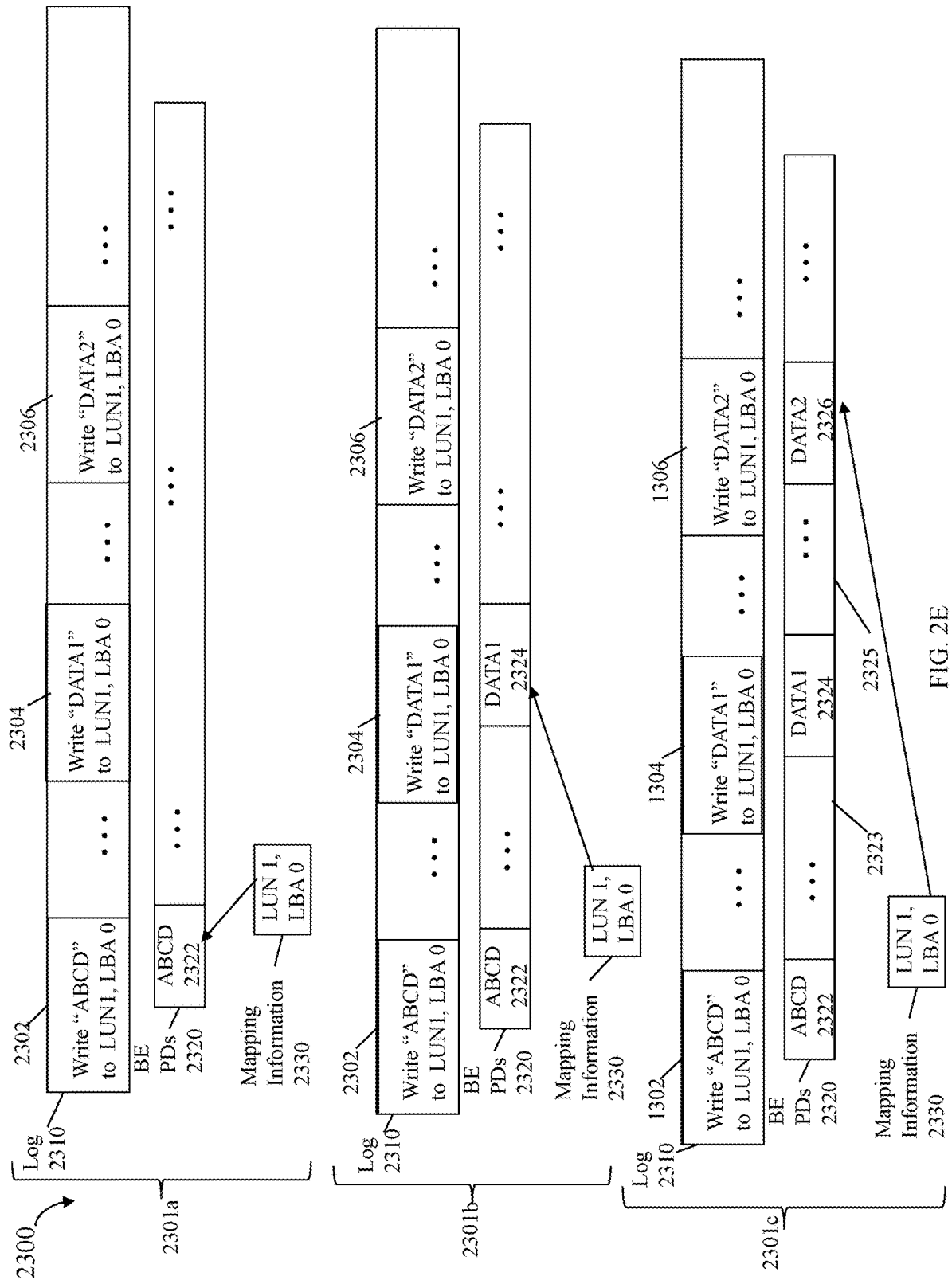

For example with reference to FIG. 2E, the element 2301a can denote the state of the log file 2310, BE PDs 2320 and mapping information 2330 at a first point in time T1 after processing the record 2302 for a first write of "ABCD" to the logical address LUN A, LBA 0. The data written "ABCD" by the recorded write of 2302 can be stored at the BE PD location 2322. Thus, flushing the log record 2302 results in storing the write data "ABCD" to the BE PD location 2322 and additionally updating the mapping information 2330 to reference the BE PD location 2322. The mapping information 2330 denotes the metadata used to map the logical address LUN 1, LBA 0 to the current physical location on the BE PDs containing the user data or content stored at the logical address LUN 1, LBA 0. After the log record 2302 is flushed from the log 2310, the record 2302 is available and can be subsequently reclaimed for reuse for logging other operations in the log 2310.

At a second point in time T2 subsequent to T1, the log record 2304 can be processed and flushed to the BE PDs 2320. The element 2301b denotes the state of the log file 1310, BE PDs 1320 and mapping information 1330 at the second point in time T2 after processing the record 1304 for a second write of "DATA1" to the logical address LUN A, LBA 0. The data written "DATA1" by the recorded write of 1304 can be stored at the BE PD location 1324. Thus, flushing the log record 1304 results in storing the write data "DATA1" to the BE PD location 1324 and additionally updating the mapping information 1330 to reference the BE PD location 1324 denoting the physical location containing the data stored at the LUN 1, LBA 0 at the time T2. Additionally, the PD location 1322 can be invalidated since it no longer contains valid current data for the logical address LUN 1, LBA 0, whereby the PD location 1322 can be available for reuse. After the log record 1304 is flushed from the log 1310, the record 1304 is available and can be subsequently reclaimed for reuse for logging other operations in the log 1310.

At a third point in time T3 subsequent to T2, the log record 2306 can be processed and flushed to the BE PDs 2320. The element 2301c denotes the state of the log file 2310, BE PDs 2320 and mapping information 2330 at the third point in time T3 after processing the record 2306 for a third write of "DATA2" to the logical address LUN A, LBA 0. The data written "DATA2" by the recorded write of 2306 can be stored at the BE PD location 2326. Thus, flushing the log record 2306 results in storing the write data "DATA2" to the BE PD location 2326 and additionally updating the mapping information 2330 to reference the BE PD location 2326 denoting the physical location containing the data stored at the LUN 1, LBA 0 at the time T3. Additionally, the PD location 2324 can be invalidated since it no longer contains valid current data for the logical address LUN 1, LBA 0, whereby the PD location 2324 can be available for reuse. After the log record 2306 is flushed from the log 2310, the record 2306 is available and can be subsequently reclaimed for reuse for logging other operations in the log 2310.

As illustrated by the elements 2301a-c, over time, the physical storage locations 2322, 2324 of the BE PDs 2320 become free and available for reuse. The other physical storage locations 2323, 2325 and 2326 can still contain valid data. Thus, the free, available reusable physical storage locations 2322, 2324 can form holes or segments interspersed among the other portions 2323, 2325, 2326 containing valid data. More generally, the size of the holes 2322, 2324 can be of varying sizes and can include multiple user data blocks or pages. Additionally, portions of physical storage of the BE PDs can also be similarly allocated and then freed for reuse for other purposes. Thus, the holes of free, reusable physical storage as well other portions of physical storage including valid data can result not only from flushing the log file but also from other purposes that can vary with embodiment.

As noted above, in a data storage system implementing an LSS, GC can be performed by the data storage system at various times in an embodiment. For example, GC can relocate and aggregate valid data from multiple source blocks, such as 2323, 2325 and 2326 at the time T3, to a single destination or target block. After such relocation and aggregation by GC, the storage locations 2322, 2323, 2324, 2325 and 2326 denote a larger contiguous chunk of storage that is free and available for reuse. Having such a larger contiguous chunk of free storage facilitates efficiently fulfilling subsequent allocation requests for free BE PD capacity from different components for different uses. Such subsequent allocation requests can include, for example, requests for storing data that is flushed from the log as well as other requests for larger amounts of storage.

Referring to FIG. 3, shown is an example 300 of a tree of MD pages that can be used in an embodiment in accordance with the techniques herein. The example 300 includes a tree of MD pages denoting the mapping structure as discussed above with 3 levels—a top or root level, level 1, including a single MD TOP page; a single mid or middle level, level 2, of MD MID pages; and a bottom level, level 3, of leaf nodes of MD LEAF pages. In the example 300, the top or root level, level 1, includes MD page 302; the mid or middle level, level 2, includes MD pages 304, 306 and 308; and the bottom level, level 3, includes MD pages 310, 312, 314, 316, 318 and 320, which can also be referred to as leaf nodes. As also illustrated in the example 300, each of the leaf MD pages in level 3 of the tree points to, or references (e.g., directly or otherwise indirectly using one more additional levels of indirection of pointers not illustrated) one or more user data pages or blocks including data stored at various LBAs of a LUN such as the LUN A. For example, MD pages 310, 312, 314, 316, 318 and 320 point or reference, respectively, one or more UD pages 310*a*, 312*a*, 314*a*, 316*a*, 318*a* and 320*a*.

The links or connections between a parent node (at level M) and its one or more child nodes (at level M+1) in the tree 300 generally represent mappings between the parent node and the one or more child nodes. In at least one embodiment, the parent node can include a reference used to access (directly or indirectly) each of its one or more child nodes. For example, the root node MD page top 302 can include addresses or pointers used to access each of its child nodes 304, 306 and 308. The mid-level node MD page mid1 304 can include addresses or pointers used to access each of its child leaf nodes 310, 312. The mid-level node MD page mid 306 can include addresses or pointers used to access each of its child leaf nodes 314, 316. The mid-level node MD page mid 308 can include addresses or pointers used to access each of its child leaf nodes 318, 320.

In at least one embodiment, each of the addresses or pointers included in a MD page that references a location in another MD page or references a location in a UD page can be a physical storage location on the back-end PDs. Thus, the traversal between connected nodes of the structure 300 can correspond to traversing physical address or storage locations included in pages or nodes that are parent nodes.

In connection with accessing a particular UD page in at least one embodiment, all MD pages in a path from the root or top level of the tree to the UD page can be traversed in a consecutive serialized order in which such pages appear in the path traversal down the path from the top or root level to the UD page accessed using a particular one of the MD page leaf nodes. For example, assume UD page or block X is included in the set of UD pages 312*a*. In order to access UD page X of 312*a*, the following denotes the consecutive serialized order in which the MD pages forming a sequence are accessed: MD page top 302, MD page mid1 304, and MD page leaf2 312. Generally, in at least one embodiment, each of the MD pages can include pointers or addresses to locations of one or more child pages or nodes. Thus, the foregoing traversal of MD pages denotes the sequence of MD pages that are processed in consecutive serialized order in order to access the particular UD page, such as UD page X. In order to access the UD page X as stored on PDs where UD page X includes first data needed to service a read I/O operation in connection with a cache miss of the first data, each of the MD pages in the foregoing sequence (e.g., MD page top 302, MD page mid1 304, and MD page leaf2 312) needs to be accessed in consecutive serialized order. In at least one embodiment, the sequence of MD pages, and more generally, the path from the MD page top to the UD page X, forms a linked list of nodes of pages. In at least one embodiment, each parent node or MD page of the structure 300 can generally include multiple pointers or references to locations of its child nodes or pages. For example, MD page top 302 includes pointers to locations of its child nodes, MD pages 304, 306 and 308. MD page mid2 306 includes pointers to locations of its child nodes, MD pages 314 and 316.

The data pages 310*a*, 312*a*, 314*a*, 316*a*, 318*a* and 320*a* include UD stored on particular logical addresses of a LUN's address space, such as the LUN A's logical address space. In at least one embodiment each MD leaf can hold MD for a specified number of LBAs of a LUN. For example, in one embodiment each MD leaf can hold MD for 512 LBAs. For example, with reference to FIG. 3, the data pages 310*a*, 312*a*, 314*a*, 316*a*, 318*a* and 320 each include user data stored on particular logical addresses of the LUN A's logical address space. It may be, for example, that element 310*a* includes user data stored at a first set of LBAs 0-511; and that element 312*a* includes user data stored at a second set of LBAs 512-1023. Generally, the particular LBAs of the LUN mapped to each MD page can vary with embodiment. For example, in at least one embodiment, consecutive sequential subranges of the LUN's logical address space can be mapped to the MD page leaves. Additionally, when the tree is traversed in a depth first manner, the MD page leaves can correspond to consecutive sequential subranges. For example, the element 310*a* denotes data pages for LBAs 0-511; the element 312*a* denotes data pages for the LBAs 512-1023; the element 314*a* denotes data pages for LBAs 1024-1535; the element 316*a* denotes data pages for LBAs 1536-2047, and so on.

As generally known in the art, a depth-first traversal is an algorithm for traversing or tree or graph data structures. The algorithm starts at the root node (selecting some arbitrary node as the root node in the case of a graph) and explores as far as possible along each path extending from the root to a leaf node before backtracking up the path to find a yet another unexplored path. In at least one embodiment, traversal of the tree 300 of MD pages in a depth-first manner explores all paths, in sequential order, from the left-most path to the right most path as arranged in the tree.

In at least one embodiment, when the structure 300 is traversed in a depth first manner (i.e., from the left-most path to the right most path as arranged in the tree), the MD page leaf nodes that occur in the depth first traversal correspond to consecutive sequential LBA subranges of a LUN. In at least one embodiment, when the overall tree including MD page top node 302 and all its descendant nodes are traversed in this depth first manner, the MD page leaf nodes that occur in the depth first traversal correspond to consecutive sequential LBA subranges of a LUN.

In at least one embodiment as described herein, each of the MD pages and data blocks in the example 300 can be of a predetermined size and each of the MD pages can hold a known number of entries containing pointer or address values. In such a case and in combination with the correspondence of sequential consecutive LBA ranges of each MD leaf page, an embodiment can perform a calculation to determine the MD page at a particular level that is accessed in the tree MD mapping structure 300 to determine the data block for a particular LUN and LBA. Similarly, it is a straightforward mathematical calculation to determine the index, offset of entry in a particular page or node to be accessed in connection with obtaining data blocks stored at the particular LUN and LBAs of the LUN. Each MD page in 300 can be known to include MD relevant for accessing data on a particular LUN and one or more LBAs of that LUN. For example, consistent with discussion above, the element 310*a* denotes the data blocks for LBAs 0-511 of a LUN. In order to access the data block for an LBA of the LUN in the LBA subrange 0-511, MD pages 302, 304 and 310 can be traversed in sequential order. In particular, the first entry or offset of the MD page top 302 can contain the address of the MD page mid 1 304; the first entry or offset of the MD page mid 1 304 can contain the address of the MD page leaf 1 310; and the first entry or offset of the MD page leaf 1 310 can contain the address of one of the data blocks of 310*a*.

In a similar manner, a mapping can be made regarding what MD pages of the structure 300 and entries thereof are used in connection with obtaining data blocks containing data for any particular LUN and LBA. In at least one embodiment, the particular MD pages used to access a data block including data for a particular LUN and LBA can be known based on such mappings and correspondence of LBA subranges to particular MD leaf pages.

Figure 4:
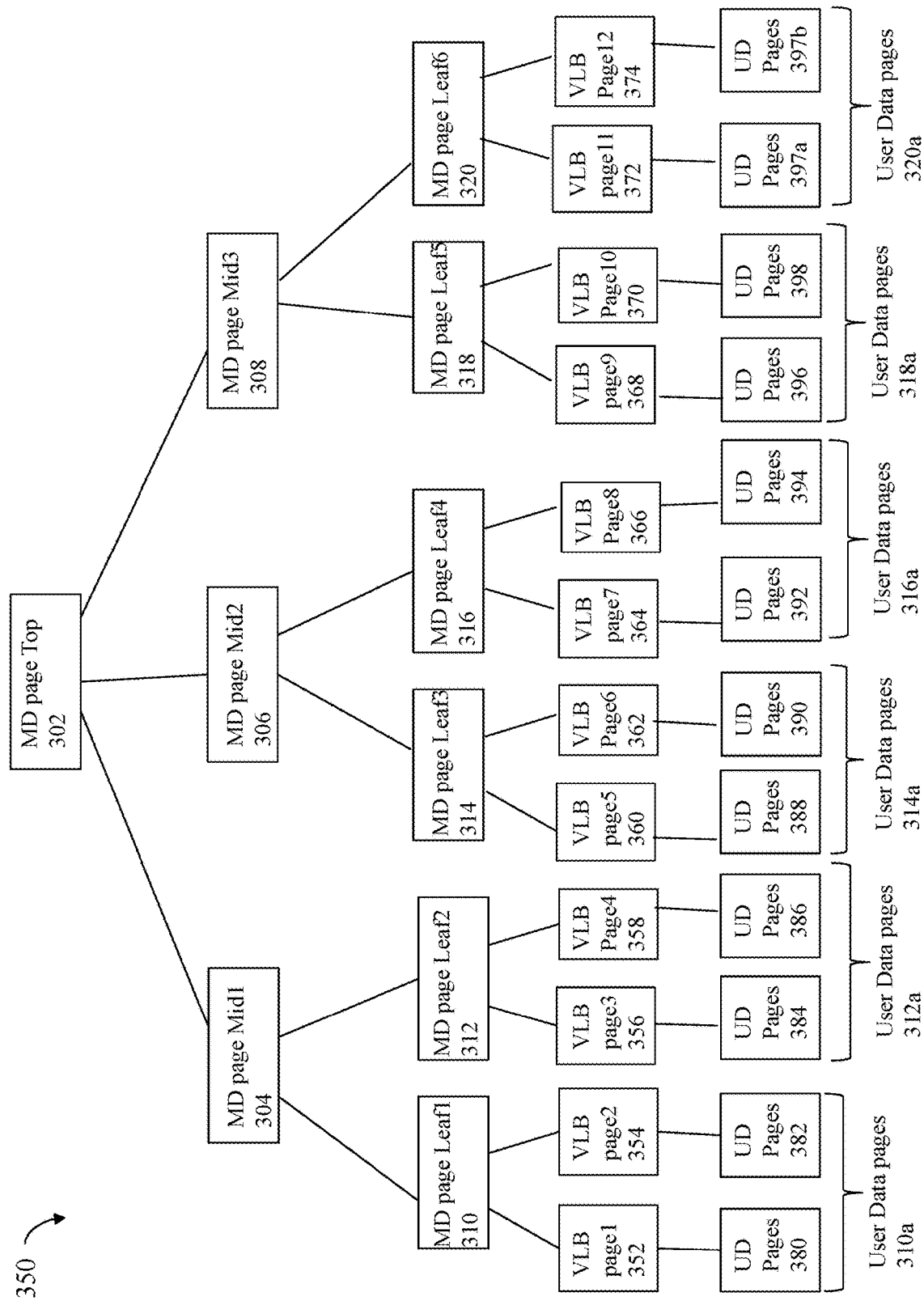

Referring to FIG. 4, shown is a more detailed version of a hierarchical structure used as the mapping structure 108 that can be used in an embodiment in accordance with the techniques of the present disclosure. The structure 350 is similar to the structure 300 as described and illustrated in FIG. 3 with the added difference that more detail is provided regarding the intervening layer of a VLB (virtualization layer block) MD pages between the MD page leaves and the UD pages. Thus, in such an embodiment, the structure 350 includes 4 levels of MD pages as opposed to the possible 3 levels as allowed in the more generalized structure 300 represented in FIG. 3. In this case, each sequence of MD pages traversed in a path from the MD page top or root to access a particular UD page includes 4 MD pages-MD page top 302, one of the MD page Mid nodes (e.g., one of 304, 306 or 308), one of the MD page leaf nodes (e.g., one of 310, 312, 314, 316, 318 and 320), and one of the VLB pages (e.g., one of 352, 354, 356, 358, 360, 362, 364, 366, 368, 370, 372 and 374).

In at least one embodiment, the use of VLBs as a layer in the hierarchy between the MD leaf nodes and the UD pages can be used to facilitate different data storage services, such as relocating UD between different physical storage location, data deduplication, and the like. An entry of the VLB associated with a particular physical storage location can be remapped without requiring remapping of a MD leaf to the UD page.

The UD pages 380 and 382 denote two portions of UD pages corresponding to UD pages 310a of FIG. 3 including data for LBAs 0-511. The UD pages 384 and 386 denote two portions of UD pages corresponding to UD pages 312a of FIG. 3 including data for LBAs 512-1023. The UD pages 388 and 390 denote two portions of UD pages corresponding to UD pages 314a of FIG. 3 including data for LBAs 1024-1535. The UD pages 392 and 394 denote two portions of UD pages corresponding to UD pages 316a of FIG. 3 including data for LBAs 1536-2047. The UD pages 396 and 398 denote two portions of UD pages corresponding to UD pages 318a of FIG. 3 including data for LBAs 2048-2559. The UD pages 397a and 397b denote two portions of UD pages corresponding to UD pages 320a of FIG. 3 including data for LBAs 2560-3072.

In furtherance of the example above regarding UD page X and now with reference to FIG. 4, assume more specifically that UD page X is located in the set of UD pages denoted by 384. In this case, the MD page sequence including the MD pages traversed in order to access UD page X 384 includes MD page 302, MD page 304, MD page 312, and VLB page3 356.

Figure 5:
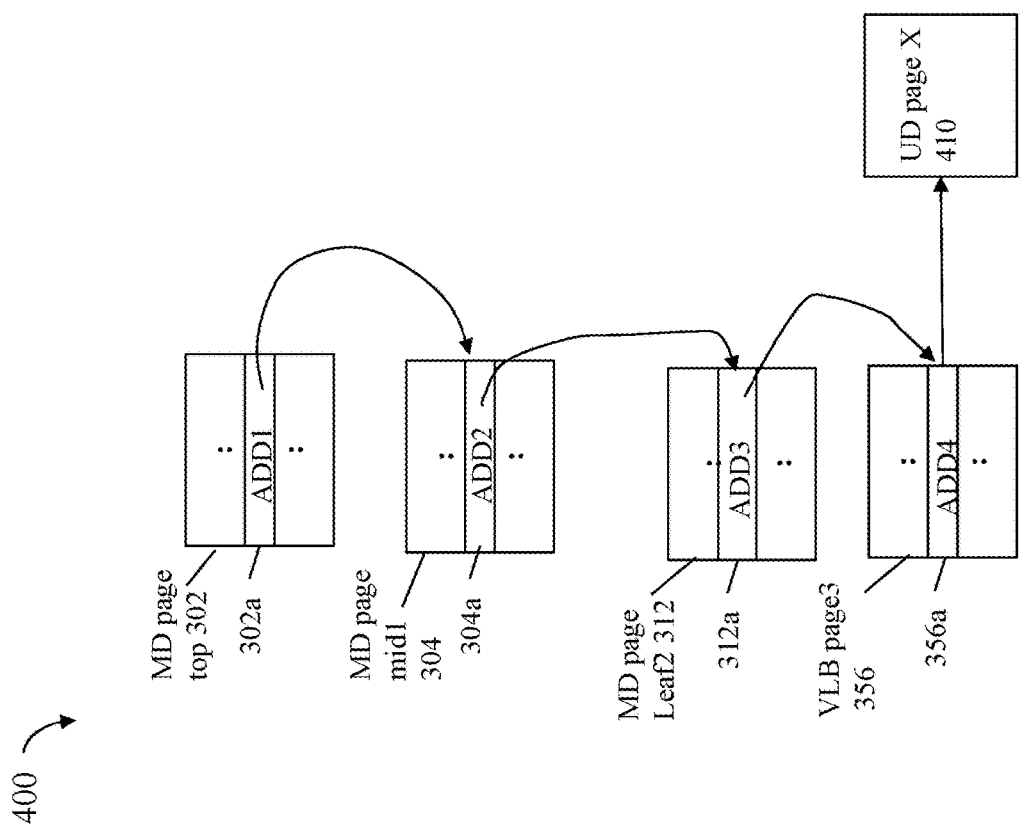

Referring to FIG. 5, shown is a more detailed representation 400 of the MD pages of the sequence traversed to access the UD page X 384 included in the set of UD pages 312a. As noted above, the MD page sequence includes MD page 302, MD page 304, MD page 312, and VLB page3 356. In the example 400, MD page top 302 includes an entry or address 302a that points to or references the location 304a in the MD page mid1 304. In at least one embodiment, the starting entry 302a in the first MD page 302 of the sequence can be determined based on the logical address including the desired UD stored in a page or block of storage (e.g., physical non-volatile storage location on the BE PDs of the system). For example, assume processing is performed to read the UD for LUN A, LBA 514 located in UD page X. In at least one embodiment, the logical address LUN A, LBA 514 can be used to determine the particular structure instance and thus the particular MD page top 302 to access. The LBA 514 of the logical address of the UD can also be used to determine an index or offset into the MD page 302 to determine the relevant entry, location or address 302a having a pointer, address or reference to an entry in the next MD page in the sequence to access the desired page including the UD for LUN A, LBA 514. An embodiment can generally use any suitable technique to map a corresponding logical address, such as an LBA of a particular LUN, to an entry in the top level MD page 302.

The MD page top 302 can be accessed and read from a PD to obtain the address or pointer ADD1 from location 302a. If the MD page 302 is already in cache, the cached copy can be used to obtain the address or pointer ADD1 from the location 302a. The address or pointer ADD1 of location 302a can then be used to identify the entry 304a of the particular mid level MD page, such as MD page mid1 304, that is accessed next in the sequence.

Continuing with the example 400, the MD page mid1 304 can be accessed where the location 304a is read to obtain the address or pointer ADD2 from location 304a. The address or pointer ADD2 can then be used to identify the entry 312a of a particular leaf level MD page, such as MD page leaf2 312, that is next accessed in the sequence. If the MD page mid1 304 is not in cache, the on-disk copy of the MD page 304 on a PD can be accessed to read the address or pointer ADD2 from the location 304a. The address or pointer ADD2 identifies location 312a of the MD page leaf 2 312. If the MD page 312 is not already in cache, the on-disk copy of the MD page 312 on a PD can be read to obtain the content of location 312a. The location 312a of the MD page leaf2 312 can be accessed and read to obtain the address or pointer ADD3 from location 312a. The address or pointer ADD3 can then be used to identify a particular entry of a VLB page, such as the entry 356a of the VLB page3 356, that is next accessed in the sequence. Thus, ADD3 can denote the location or address of the entry 356a in the VLB page 3 356.

If the VLB page 356 is not already in cache, the on-disk copy of the VLB page 356 on a PD can be read to obtain the content of location 356a. The location 356a of the VLB page 3 356 can be accessed and read to obtain the address or pointer ADD4 from the location 356a. The address or pointer ADD4 can then be used to identify the particular UD page X 410 where the UD page X can next be read. If the UD page X is not in cache, the on-disk copy of the UD page X can be read in from a PD.

The example 400 of FIG. 5 includes the path or traversal of MD pages in the structure 350 from the MD page root or top 302 to the UD page X of 384 including the desired UD for the logical address LUN A, LBA 514. The path or traversal of MD pages 302, 304, 312, 356 and 384 denotes the sequence of MD pages read and accessed in order to obtain the UD page X of 384.

Figure 6A:
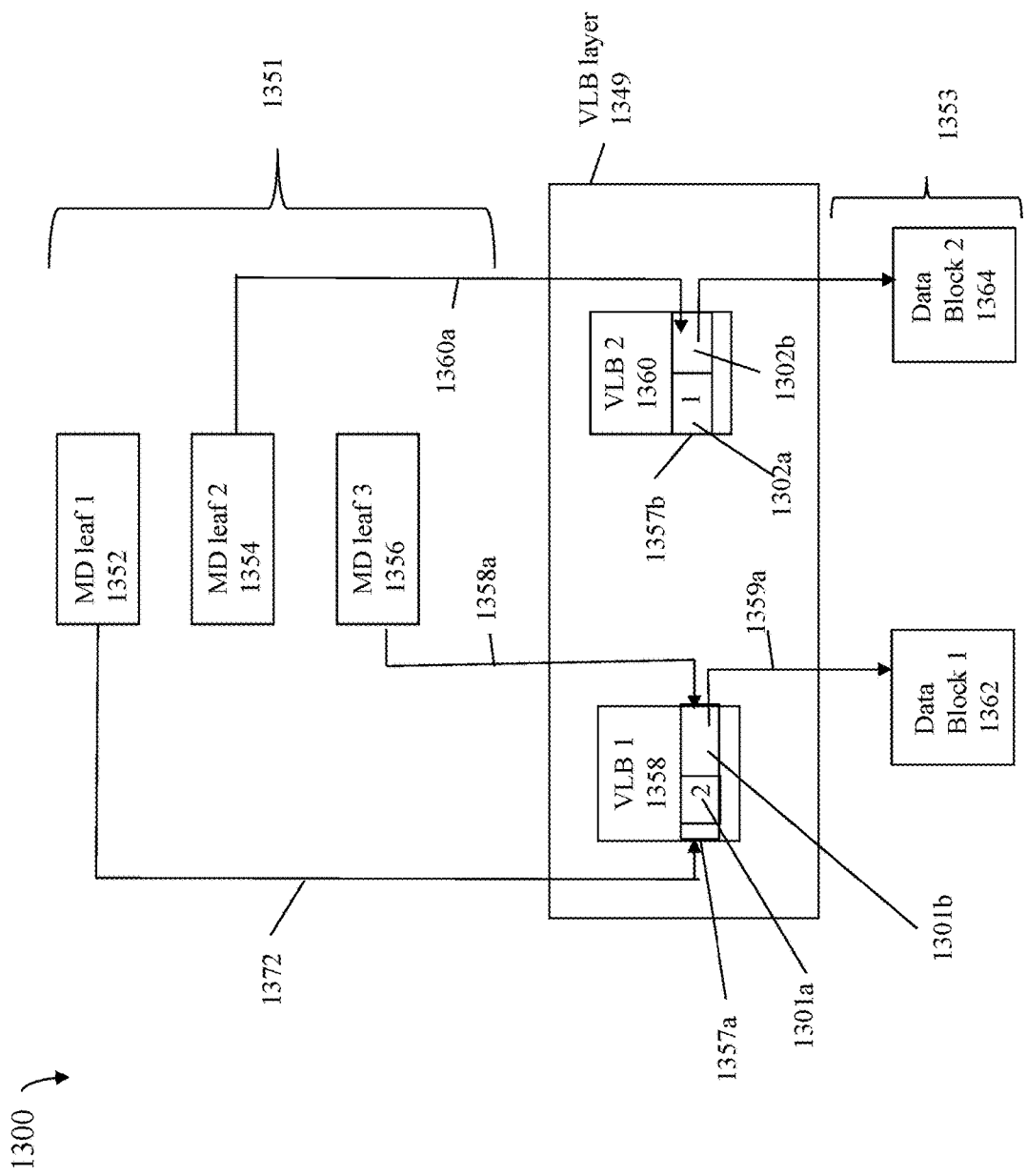

Referring to FIG. 6A, shown is an example illustrating in more detail a particular embodiment in which a VLB layer of multiple VLBs is the intervening layer between the MD leaf nodes of the mapping structure 108 and the data blocks. The elements 1352, 1354 and 1356 can denote 3 MD leaf nodes included in a MD leaf layer of a MD mapping structure such as described herein (e.g., in FIGS. 3, 4 and 5). The elements 1358 and 1360 denote 2 VLBs included in the intervening VLB layer 1349 between MD leaf nodes 1351 and data blocks 1353. The elements 1362 and 1364 denote 2 data blocks each storing content such as user data stored at logical addresses. In the example 1300, the MD leaf nodes 1352 and 1356 both indirectly reference the same data block 1362 through the same entry 1357a of the VLB 1358. The two MD leaf nodes 1352 and 1356 both referencing the same data block 1362 indirectly through use of the same VLB entry 1357a can be a mapping resulting from data deduplication processing. In the example 1300, MD leaf node 1354 points to the entry 1357b of the VLB 1360 whereby the entry 1357b of the VLB2 1360 then further references or points to the data block 1364. The data blocks 1362, 1364 can denote user data blocks as described herein.

The element 1358a denotes a pointer to, or address of, the entry 1357a in the VLB 1358 used in connection with obtaining the data block 1362 stored on a particular LUN and LBA of the LUN. The pointer 1358a can be used as the virtual or indirect pointer in connection with obtaining the data block 1362. In at least one embodiment, the VLB 1358 can be a VLB page or node as described herein. Thus, in such an embodiment, the virtual or indirect pointer 1358a can be a pointer to the entry 1357a of the VLB structure 1358, where the entry 1357a can further include fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1372 denotes a pointer to, or address of, the entry 1357a in the VLB 1358 used in connection with obtaining the data block 1362 stored on a particular LUN and LBA of the LUN. The pointer 1372 can be used as the virtual or indirect pointer in connection with obtaining the data block 1362. In at least one embodiment, the VLB 1358 can be a VLB page or node as described herein. Thus, in such an embodiment, the virtual or indirect pointer 1372 can be a pointer to the entry 1357a of the VLB structure 1358, where the entry 1357a can further include the fields 1301a and 1301b. The field 1301b can be a pointer to, or address of, the user data block 1362. The field 1301a can be a reference count or counter indicating the number of instances of, or references to, the particular data block 1362 (e.g., data block pointed to by 1301b).

The element 1360a denotes a pointer to, or address of, the entry 1357b in the VLB 1360 used in connection with obtaining the data block 1364 stored on a particular LUN and LBA of the LUN. The pointer 1360a can be used as the virtual or indirect pointer in connection with obtaining the data block 1364. Thus, in such an embodiment, the virtual or indirect pointer 1360a can be a pointer to the entry 1357b of the VLB structure 1360, where the entry 1357b can further include the fields 1302a and 1302b. The field 1302b can be a pointer to, or address of, the user data block 1364. The field 1302a can be a reference count or counter indicating the number of instances of, or references to, the particular data block 1362 (e.g., data block pointed to by 1302b).

The reference count 1301a can be initialized to 1 when a first or initial instance of the associated data block 1362 is stored. In this example, the reference 1301a is 2 indicating that there are 2 instances of the data block 1362 and thus 2 references to the data block 1362. In this case, the are 2 instances of the data block 1362 in stored user data. The instances denoted by the reference count 1301a include all deduplicated instances corresponding to entries of the MDL leaves 1352, 1356 that respectively point 1372, 1358a to the VLB entry 1357a associated with the single copy of the data block 1362.

The reference count 1302a can be initialized to 1 when a first or initial instance of the associated data block 1364 is stored. In this example, the reference 1302a is 1 indicating that there is 1 instance of the data block 1364 and thus 1 reference to the data block 1364. The instances denoted by the reference count 1302a generally include any/all deduplicated instances associated with the single copy of the data block 1364. However, in this example, there is only a single reference to, and single instance of, the data block 1364 in stored user data. In particular, the MD leaf 1354 references or points (1360a) to the VLB entry 1357b associated with the single copy of the data block 1364.

In at least one embodiment, each VLB can be a VLB page or node as described herein including multiple entries, such as 512 entries, where each such VLB entry can include one or more fields of information such as the address or pointer to one of the data blocks such as 1362 or 1364.

For a read I/O operation received at a node of a dual node system or appliance such as in an active-active configuration, servicing the read operation can include reading one or more data blocks or storage locations as well as reading information from one or more MD pages such as, for example, of the MD or mapping structure as described in connection with FIGS. 3-6A.

For a write I/O operation received at a node of a dual node system or appliance such as in an active-active configuration, servicing the write operation can include reading information from one or more MD pages. Servicing the write operation can include updating one or more data blocks or storage locations as well as updating one or more MD pages such as, for example, of the MD or mapping structure as described in connection with FIGS. 3-6A.

In at least one embodiment, the MD or mapping information used in connection with stored user data can be stored on non-volatile storage, such as on the BE PDs of the appliance or data storage system. At least some of the MD pages of mapping information for all such user data can be stored in a volatile memory cache of each of the nodes of the appliance or system. Depending on the write operation, one or more logical addresses can be updated with new data or content by a write operation. Additionally, one or more MD pages used to map the one or more logical addresses to one or more physical storage locations storing the new data can also be updated, for example, to reference the one or more physical storage location including the new data or content.

With a log-structured system in at least one embodiment, as recorded writes of the log are processed and flushed or destaged to the BE PDs, the content written by the recorded writes of the log can be stored at new subsequent physical storage locations on the BE PDs. Additionally, the MD or mapping information corresponding to the logged writes being flushed can also be accordingly updated to reference the new subsequent physical storage locations on the BE PDs containing the content. In a dual node appliance or system with an active-active configuration as described herein, both nodes of the system can concurrently receive and service write I/Os, as well as other received requests and commands using shared resources such as, for example, the MD or mapping structure described in connection with the FIGS. 3-6A.

In at least one embodiment, updates or modifications to the MD pages of the MD or mapping structure described in connection with the FIGS. 3-6A can also similarly be recorded in entries or records of a persistently stored metadata log and then flushed or destaged from the metadata log to persistent BE storage of the BE PDs. In at least one embodiment, the MD pages of the MD or mapping structure such as described in connection with the FIGS. 3-6A can be persistently stored in a MD page store on the BE PDs of the system. In some contexts herein, the copy of a MD page as stored in the MD page store on the BE PDs can also be referred to herein as the on-disk copy of the MD page.

As noted above in at least one embodiment to increase performance, the updates to user data can be stored (e.g., persisted temporarily) in a log or journal logging client or host writes, and the updates to the MD or mapping information can be stored (e.g., persisted temporarily) in a metadata log. One characteristic of a log structured system, such as in connection with the metadata log and log of client updates or writes, is that updates or modifications (which are recorded in an associated log and then flushed to long term storage of the BE PDs) may not physically overwrite or update the same BE PD physical location storing the old data or existing content (e.g., no physical in place update). Rather, the newly written or updated data is typically written to a different physical location on the BE PDs. Thus, the BE PDs can retain the valid old data in the original physical location for some time before being reclaimed for reuse by garbage collection processing.

Consistent with other discussion herein, an entry from the log of user or client updates (sometimes referred to as the UD (user data) log) can be an update to a logical address (e.g., LUN and LBA) which writes content to a UD page. Flushing the entry can include destaging the updated UD page to a backend storage location on non-volatile storage (e.g., BE PD location). Additionally, flushing and destaging the entry from the log can include updating the corresponding MD pages which map the logical address to its corresponding BE PD location including the content stored at the logical address. In at least one existing system, the mapping information including MD pages as described herein can thus be updated. For example, such updating of the mapping information can include updating any of the top, mid and leaf MD pages used in connection with mapping the logical address to the BE PD location including the content stored at the logical address. In at least one existing implementation, updating the corresponding mapping information and MD pages can include loading all the MD pages into the cache if any such MD pages are not already in cache. The MD pages of the mapping information can be characterized as a chain forming an access sequence of top MD page, mid MD page, and leaf MD page.

Figure 6B:
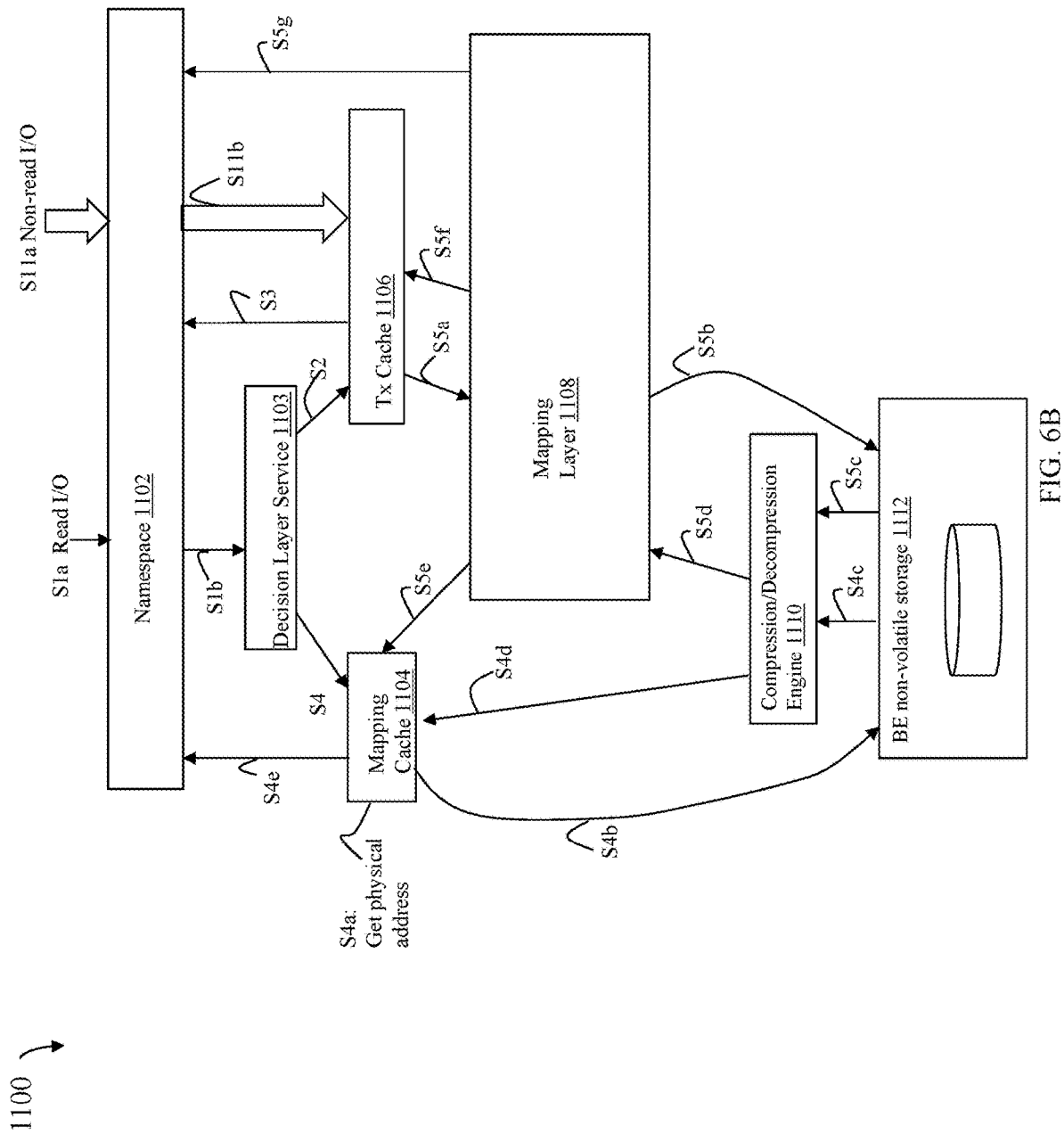
FIGS. 6B and 6C are examples of components and associated data flow in at least one embodiment in accordance with the techniques of the present disclosure.

Referring to FIG. 6B, shown is an example 1100 of components and associated data flow in at least one embodiment in accordance with the techniques of the present disclosure.

Figure 6C:
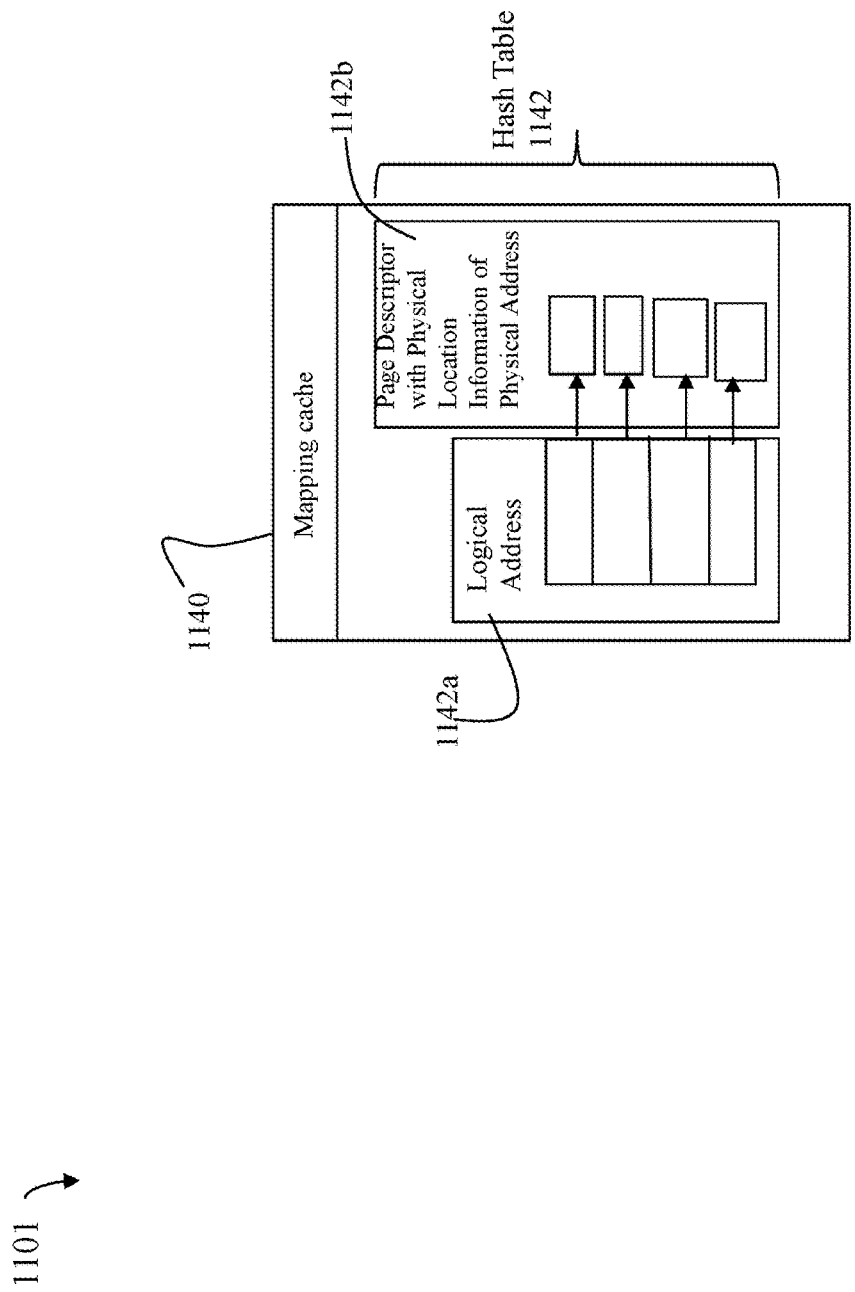

The example 1100 illustrates various layers and components in connection with data flow when servicing I/Os in at least one embodiment in accordance with the techniques of the present disclosure. The example 1100 includes a namespace 1102 denoting a user data logical address space of storage clients, a mapping cache 1104, a transaction (Tx) cache 1106, a mapping layer 1108, a compression/decompression engine or layer 1110, and non-volatile BE storage 1112. The Tx cache 1106 and the mapping cache 1108 denote caching layers. Element 1140 of FIG. 6C provides further details regarding the mapping cache 1104 in at least one embodiment.

The namespace 1102 can include, for example, logical addresses of volumes or LUNs storing client content such as, for example, content or data used by one or more external hosts. Consistent with other discussion herein in at least one embodiment, the logical addresses can be expressed using a volume or LUN identifier and LBA or offset. A logical address of the namespace 1102 can be included, for example, in read I/O operations and write I/O operations issued by storage clients to a data storage system. In at least one embodiment, the storage clients can include external storage clients which are external with respect to the data storage system. In at least one embodiment, the storage clients can include one or more hosts such as described elsewhere herein (e.g., FIG. 1).

The mapping layer 1108 can denote the mapping information including a hierarchy of metadata include MD pages and VLB pages described elsewhere herein, (e.g., FIGS. 2D-E, 3, 4, 5 and 6A). Consistent with other discussion herein, the mapping information of the mapping layer 1108 can include mapping information of chains of MD pages which map logical addresses to corresponding physical storage addresses or locations on the non-volatile BE storage 1112, where such physical storage addresses or locations contain data or content stored at corresponding mapped logical addresses. In at least one embodiment, the various pages of the mapping layer 1108 can be persistently stored on non-volatile storage with frequently accessed pages also maintained in the in-memory or volatile memory of Tx cache 1106. The Tx cache 1106 can also be used to store other information such as, for example, an in-memory copy of portions of a metadata log of changes or updates to metadata of the mapping layer 1108. In at least one embodiment Tx cache 1106 can also be used to store frequently accessed user data or content stored at corresponding logical addresses. Thus in at least one embodiment, the Tx cache 1106 can generally include a data cache used to cache user data or content.

The compression/decompression engine 1110 can be used to compress and decompress content, respectively, written to and from non-volatile BE storage 1112.

The mapping cache 1104 is a layer which can be used in embodiments in accordance with the techniques of the present disclosure to by-pass the mapping layer 1108 of the illustrated data flow in connection with I/O flows for read and write I/Os. In at least one embodiment, the mapping cache 1104 includes entries such as cached page descriptors (sometimes referred to as descriptors) which in at least one embodiment are stored in a form of volatile fast memory, such as a form of RAM memory. The descriptors of the mapping cache 1104 can be indexed, accessed and organized using keys which are logical addresses (e.g., volume or LUN identifier (ID) and LBA or offset) and where the cached content or values are the cached page descriptors for corresponding logical addresses. Processing can map a logical address to a corresponding descriptor, if such descriptor is stored in the mapping cache 1104.

With reference to FIG. 6C, shown is an example 1101 of the mapping cache 1140 in at least one embodiment where the mapping cache 1140 can be implemented using a hash table HT 1142 with entries or indices. A logical address 1142a can be mapped, such as using a hash function F, to an entry or index j of the hash table 1142, denoted as HT(j), where HT(j) is associated with or includes one or more page descriptors 1142b each with a corresponding logical address mapped by F to HT(j). Each of the cached page descriptors 1142b can include multiple fields of information related to the mapped logical address. One of the fields of information of each cached page descriptor 1142b is physical location information of a physical address or storage location on the non-volatile BE storage 1112 containing content stored at a corresponding logical address 1142a. Thus the mapping cache 1140 (and also represented as element 1104 of FIG. 6B) does not store the actual content or data of a corresponding logical address 1142a but rather stores a descriptor 1142b which further includes the physical address or location of content stored at the corresponding logical address. In this manner in at least one embodiment, the descriptor 1142b can be used to directly access the actual content or data of a corresponding logical address 1142a bypassing one or more other layers, such as bypassing the mapping layer 1108.

What will now be described in connection with FIG. 6B is workflow processing for requests or operations in at least one embodiment in accordance with the techniques of the present disclosure.

In a step S1a, a read I/O operation or request from a host can be received at the storage system by namespace 1102. The read I/O can be a request to read the current data or content of a logical address. The read I/O can then be forwarded (S1b) from namespace 1102 to the decision layer service 1103. The read I/O can be a request to read the current content C1 of the logical address LA1. The decision layer service 1103 can issue a query (S2) to the TxCache 1106 to determine whether the current content C1 for LA1 is stored in the TxCache 1106, where TxCache 1106 includes the data cache used for caching user data such as C1 of LA1. Consistent with other discussion herein, the TxCache 1106 can include a data cache used to cache user data or content which is accessed or indexed by a corresponding logical address. In at least one embodiment, the step S2 can be performed using an API to issue a request or query from the service 1103 to the TxCache 1106. In response to the API sent from the service 1103 to the TxCache 1106, the TxCache 1106 can determine whether content for the logical address LA1 is currently cached in the TxCache 1106.

If TxCache 1106 is currently caching the content C1 of LA1, the TxCache 1106 can return an indicator to the service 1103 indicating a TxCache hit denoting that the content C1 for LA1 is currently in TxCache. If there is a TxCache hit denoting that the content C1 of LA1 is stored in the TxCache 1106, the service 1103 can transfer control to the TxCache. The TxCache can return (S3) the requested read data, the content C1 of LA1, to namespace 1102 where C1 is then returned to the host. C1 as returned in the step S3 is retrieved from the TxCache 1106 and used to service the read I/O.

If TxCache 1106 is not currently caching the content C1 of LA1, the TxCache 1106 can return an indicator to the service 1103 indicating a TxCache miss denoting that the content C1 for LA1 is not currently in TxCache. In response to the service 1103 receiving the indicator regarding the TxCache miss, the service 1103 can transfer control (S4) to the mapping cache 1104. In the step S4, the mapping cache 1104 can be queried to determine whether the mapping cache 1104 includes an entry mapping LA1 to a physical address or location PA1 storing the current content C1 of LA1, where the mapping cache 1104 is currently caching PA1.

If the mapping cache 1104 is currently caching PA1 denoting the physical address or location of the content C1 of LA1, a mapping cache hit is determined and the steps S4a-S4e are performed. In the step S4a, the physical address or location PA1 of the mapping cache entry for LA1 is read from the mapping cache. Following the step S4a, the step S4b is performed where a request is sent to the BE non-volatile storage to read the content C1 as stored at PA1. The content C1 is read from the BE storage 1112 and sent to the compression/decompression engine 1110 to be decompressed. The decompressed or uncompressed form of C1 is then returned (S4d) to the mapping cache 1104, and then returned (S4e) to namespace 1102, where C1 can then be returned to the host. In this manner, responsive to a mapping cache hit for LA1, the corresponding cached physical address PA1 can be read from the mapping cache and used to directly retrieve or read C1 from BE non-volatile storage, where the read I/O is then serviced using C1 as read from BE non-volatile storage.

In at least one embodiment for a mapping cache hit, content that is read from BE non-volatile storage using a corresponding mapping cache entry can selectively be promoted to the data cache (e.g., Txcache). In at least one embodiment, processing can be performed to selectively promote, to the data cache, frequently accessed content where such content is accessed using a corresponding mapping cache entry of the mapping cache as part of the processing flow of the steps S4a-S4e. In at least one embodiment, processing can be performed to selectively promote, to the data cache, content that is associated with a corresponding logical address that is accessed at least a minimum number of times within a specified time period, and where such content is obtained each of the at least minimum number of times using a corresponding mapping cache entry.

If the mapping cache is currently not caching PA1 corresponding to the physical address of the content C1 of LA1, a mapping cache miss is determined. Consistent with other discussion herein, Txcache 1106 can cache content or data stored at a corresponding logical address such as LA1 where the cached content can be indexed and accessed by logical address. Also consistent with other discussion herein, the mapping cache 1104 can cache physical locations or addresses on BE non-volatile storage of content stored at corresponding logical addresses, where a cached physical location can be indexed and accessed by logical address. If there is a TxCache miss with respect to LA1 and also a mapping cache miss with respect to LA1, control can be transferred through the TxCache 1106 to use the mapping layer 1108 so that the steps S5a-S5g are performed to read the requested content C1 of LA1 from BE non-volatile storage 1112. In the step S5a, a read request is sent from TxCache 1106 to the mapping layer 1108 to read the current content for LA1 from BE non-volatile storage. The mapping layer 1108 determines and uses the mapping information including the chain of metadata pages to map LA1 to the corresponding BE non-volatile storage location, PA1, containing C1, where C1 is the current content of LA1. Following the step 5A is the step S5b where a request is issued to the BE-non-volatile storage to read C1 from PA1. From the step S5b, processing proceeds to the step S5c where C1 is decompressed by the engine 1110, and where the decompressed or uncompressed form of C1 is returned (S5d) to the mapping layer 1108. The physical address PA1 of the content C1 can be sent (S5e) to the mapping cache where the step S5e includes promoting the mapping of LA1 to PA1 into the mapping cache. In particular, the step S5e can include updating the mapping cache to cache PA1 and include an entry that maps LA1 to the cached content PA1. Additionally, the content C1 can be returned (S5f) to TxCache 1106 where C1 as stored at LA1 can be promoted to the data cache as included in the TxCache 1106. The step S5f can include updating TxCache 1106 to cache C1 and include an entry that maps LA1 to the cached content C1 of Txcache. Additionally, the content C1, as read from BE non-volatile storage, can be returned (S5g) from the mapping layer 1108 to namespace 1102, where C1 can then be further returned to the host to service the read I/O.

Also illustrated in FIG. 6B is a general workflow for ingesting non-read I/O operations or commands in at least one embodiment in accordance with the techniques of the present disclosure. In at least one embodiment, non-read I/Os can include operations, commands or requests that modify mapping information of a logical address and/or other operations that do not modify mapping information of a logical address. In at least one embodiment, such non-read I/O operations or commands can be recorded in the log.

In at least one embodiment, such non-read I/O that modify existing mapping information of one or more logical addresses can include any one or more of: write I/Os or commands that modify or update content stored at logical addresses, XCOPY (extended copy) commands, volume delete commands, and/or UNMAP commands. The XCOPY command can more generally denote an offload copy operation performed internally within the storage system where the source and destination of the copy are within the same storage system or appliance. At least initially after performing the XCOPY operation, the source and target or destination of the XCOPY operation include the same content or data, where content is copied from the source to the target or destination. Volume delete commands can be commands to delete or remove a storage volume or logical device.

An UNMAP command can be issued, such as by a host application or operating system, where the UNMAP command specifies that a particular range or region of storage, such as for a particular LUN or logical device and associated LBA range, is no longer in use by the host application or operating system and can be reclaimed. As a result, the specified storage range or region of the UNMAP command is reclaimed by the storage system and thus increases the free or available storage capacity of the storage system. The UNMAP command can be issued, for example, by a host operating system when the host or application deletes one or more files from a file system, and/or deletes one or more tables from a database. Files can be mapped to underlying storage regions of block storage on one or more LUNs. Thus, the deleted files can be mapped to a storage region that can now be unmapped and deallocated or reclaimed. More generally, the UNMAP command can be used to specify a storage region that is no longer in use, whereby the storage region can be reclaimed for reuse and added to the free or available storage capacity in the storage system.

In at least one embodiment, a non-read I/O operation or command from a host can be received (S11a) by namespace 1102. The non-read I/O operation or command can then be forwarded (S11b) from namespace 1102 to TxCache 1106. In at least one embodiment, TxCache 1106 can generally be a layer or other service that can perform processing including persistently recording the non-read I/O operations or commands in the log as part of ingest processing of the non-read I/O operations or commands. In at least one embodiment, the ingest processing flow for non-read I/Os, such as write I/Os, may not impact the mapping cache 1104. For example in at least one embodiment, ingest processing for a write I/O that modifies existing mapping information for a target logical address does not remove or evict any existing stale mapping cache entry corresponding to the target logical address.

Additional detail regarding the data cache as included in the Txcache 1106 and also the mapping cache 1104, 1140 and its use in connection with the techniques of the present disclosure are described in more detail in the following paragraphs.

What will now be described are ways in which the cached page descriptors of the mapping cache can be implemented and managed in embodiments in accordance with the techniques of the present disclosure.

In at least one embodiment, the page descriptors can be logically partitioned into two groups or sets: in use descriptors and free descriptors. One or more suitable policies can be used in connection with management of the page descriptors of the two groups or sets. Additionally, the descriptors of each of the two groups or sets can be implemented using any suitable data structures. The in use descriptors and the free descriptors can each be managed independently using different policies and/or structures.

In at least one embodiment, descriptors included in the in use group or set can be those descriptors which are currently stored in the mapping cache and associated with entries of the hash table of the mapping cache. Each descriptor stored in the mapping cache can be associated with only a single hash table entry or index. In at least one embodiment, each hash table entry or index j, HT(j), can generally be associated with one or more descriptors each having a corresponding logical address LA which is mapped to the entry or index j by a hash function or algorithm F, where F(LA)=j. In at least one embodiment, each hash table entry or index HT(j) can be associated with a linked list of descriptors which are mapped to HT(j). In at least one embodiment, the linked list associated with each HT(j) can be implemented as a singly linked list using next pointers, where each linked list entry can include a next pointer to its immediately next linked list entry, if any. Thus, the HT(j) linked list can be characterized in one aspect as a bucket of one or more descriptors mapped to HT(j) by F. In at least one embodiment, a head pointer can be maintained for each HT(j) bucket or linked list where a descriptor added to the entry HT(j) can be added to the head of the descriptor list associated with HT(j).

In at least one embodiment, all the in use descriptors stored in the mapping cache can collectively be organized as an LRU (least recently used) list or queue of descriptors. Thus each in use descriptor can be included in two lists or queues: a first list or queue associated with a single hash table entry HT(j) as noted above, and a second list or queue which is the LRU list or queue denoting a collective list of all descriptors across all hash table entries for all hash table index values of j. The LRU queue can be used in connection with overall management, including an eviction policy, for all descriptors cached in the mapping cache. In at least one embodiment, the eviction policy can be an LRU-based policy. In at least one embodiment, the LRU queue can be implemented as doubly linked list using forward and backward pointers, where each linked list entry can include a forward pointer to its immediately next linked list entry, if any; and each linked list entry can include a back pointer to its immediately prior linked list entry, if any.

In at least one embodiment, a head pointer of the LRU queue can point to the least recently used descriptor of the LRU queue, and a tail pointer can point to the most recently used descriptor of the LRU queue. A new descriptor stored in the mapping cache can be added to the tail of the LRU queue. When a cached descriptor of the LRU queue is referenced and used (e.g., such as in connection with read I/O processing and a hit occurs with respect to the hash table of the mapping cache), in at least one embodiment the referenced descriptor can be moved to the tail of the queue. As may be needed, such as when there are no free descriptors and a new descriptor is needed where the new descriptor is to be added to the hash table for a corresponding logical address, the new descriptor can be obtained by evicting an existing in use descriptor currently stored in the mapping cache. In at least one embodiment using the LRU queue, the in use descriptor which is the LRU entry of the LRU queue at the head of the list can be evicted. The evicted descriptor can be reinitialized or updated and thereby used as the new descriptor for the corresponding logical address. Additionally, the descriptor evicted from the in use LRU queue can also be evicted or removed from the hash table.

Descriptors included in the free group or set can be those descriptors which are currently not in use and not stored in the mapping cache. In at least one embodiment, free descriptors of the free group or set can be included in a singly linked list.

Consistent with other discussion herein, a new or free page descriptor can be obtained and used in connection with I/O processing flows for an I/O operation which reads data from, or writes data to, a target logical address LA. In particular, a new or free page descriptor can be: obtained, and then updated or initialized to include information for the target logical address LA; stored in the mapping cache; and associated with a hash table entry HT(j). The logical address LA can be provided as an input to a hash function or algorithm F and a hash value determined where the hash value denotes the index j mapped to the page descriptor for LA, where F(LA)=j. In at least one embodiment, the new page descriptor needed can be obtained from the free list or group of descriptors, if there are any such free or available descriptors in the free group. If the free group is empty, or more generally where a free descriptor cannot be obtained from the free group, the new page descriptor can be obtained by evicting a page descriptor from the mapping cache. As noted above in at least one embodiment, the page descriptor evicted from the mapping cache can be the LRU entry of the LRU queue (e.g., the descriptor at the head of the LRU queue). The evicted page descriptor can be designated as now free or available for reuse. The evicted page descriptor can be used as the new page descriptor for the logical address LA, where the evicted page descriptor can be reinitialized or updated to include information corresponding to the logical address LA, added to the mapping cache and associated with HT(j). The new page descriptor can also be added to the LRU queue and placed at the tail of the LRU queue. Additionally, in response to a subsequent reference or hit to a page descriptor in the LRU queue, the referenced page descriptor can be relocated or moved to the tail of the LRU queue.

In at least one embodiment, when an in use descriptor is evicted from an in use LRU queue, the descriptor can also be evicted from the mapping cache and hash table thereof. In this case, the logical address of the evicted descriptor can be mapped to a corresponding hash table index HT(j), where the descriptor can be further removed from the bucket or linked list of descriptors of HT(j).

To further illustrate the foregoing in at least one embodiment, reference is made to FIGS. 7A-E discussed below.

Figure 7A:
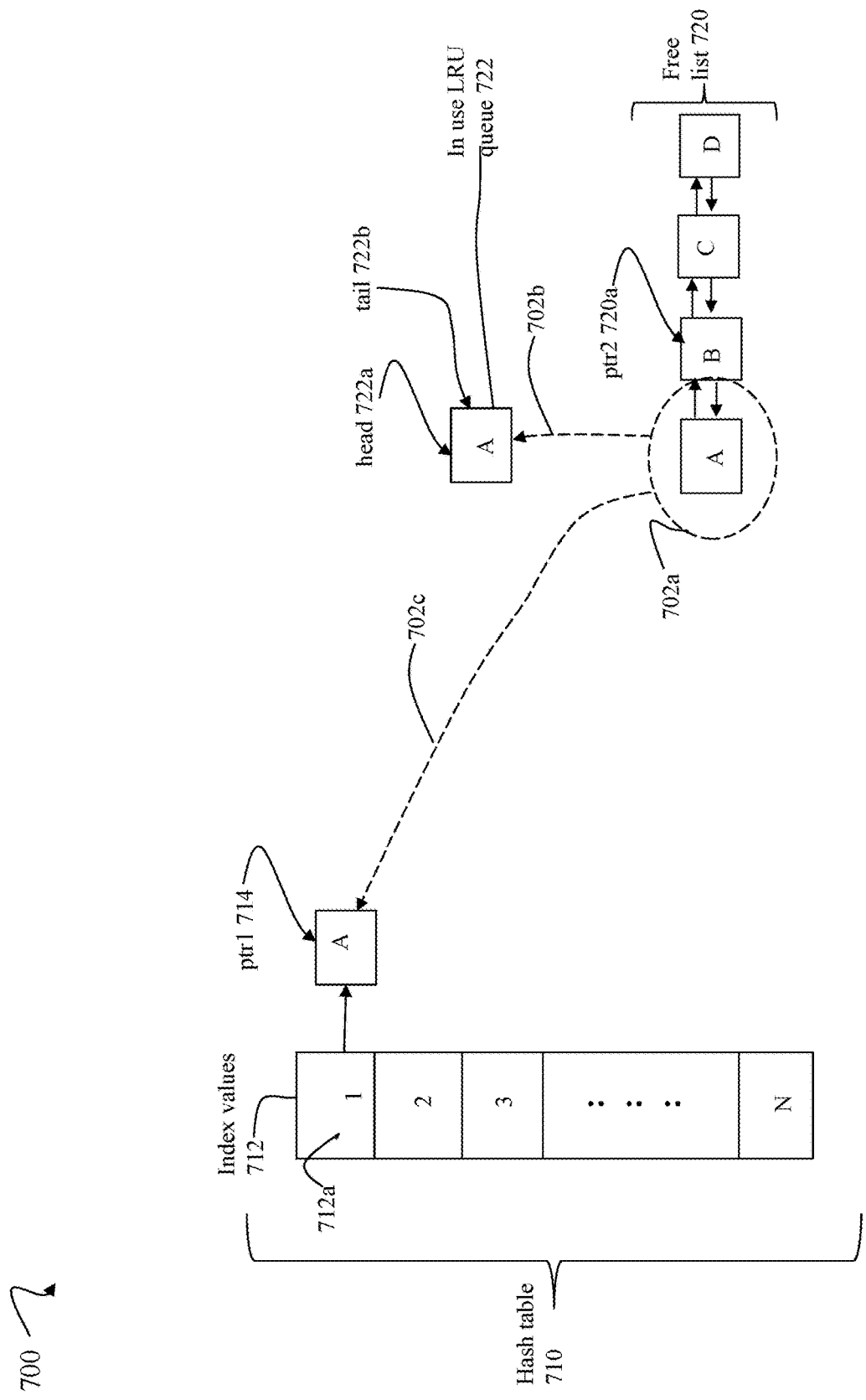

Referring to FIG. 7A, shown is an example 700 illustrating the state of the hash table 710, in use LRU queue 722 and free list 720 at a first point in time T1. The free list 720 can include descriptors A, B C and D. At the first point in time, processing can be performed to obtain a new or free descriptor in connection with other processing as discussed elsewhere herein. Responsive to the request for a new or free descriptor, descriptor A can be allocated for use from the free list 720. Element 702*a* illustrates the removal of descriptor A from the free list 720, where A is added 702*b* to the in use LRU queue 722, and A is also added 702*c* to the hash table index or entry 1 712*a*.

Element 712 denotes the index values for the hash table 710, where the index values range from 1 to N. Ptr1 714 is a pointer to the head of the linked list or bucket of descriptors associated with index 1 712*a*.

Element 722*a* denotes the head pointer 722*a* of the in use LRU queue 722, and element 722*b* denotes the tail pointer 722*b* of the in use LRU queue 722. Element 720*a* denotes the pointer to the head of the free list 720.

Generally, the example 700 shows the state of the structures at the first point in time T1 after descriptor A has been removed from the free list 720 and placed in both the in use LRU queue 722 and also the linked list or bucket of descriptors associated with hash table index 1 712*a*.

It should be noted that although not explicitly discussed in connection with FIGS. 7A-E, each newly obtained descriptor for use with a corresponding logical address can also be updated to include information discussed elsewhere herein for the corresponding logical address.

At a second point in time T2 subsequent to T1, a second page descriptor is needed for use as a new page descriptor. At the second point in time T2, the descriptor B can be allocated for use and removed from the free list 720, and added to both the in use LRU queue 722 and hash table 710. In particular in this example, B can be added to the linked list associated with hash table entry 1 712*a*.

Figure 7B:
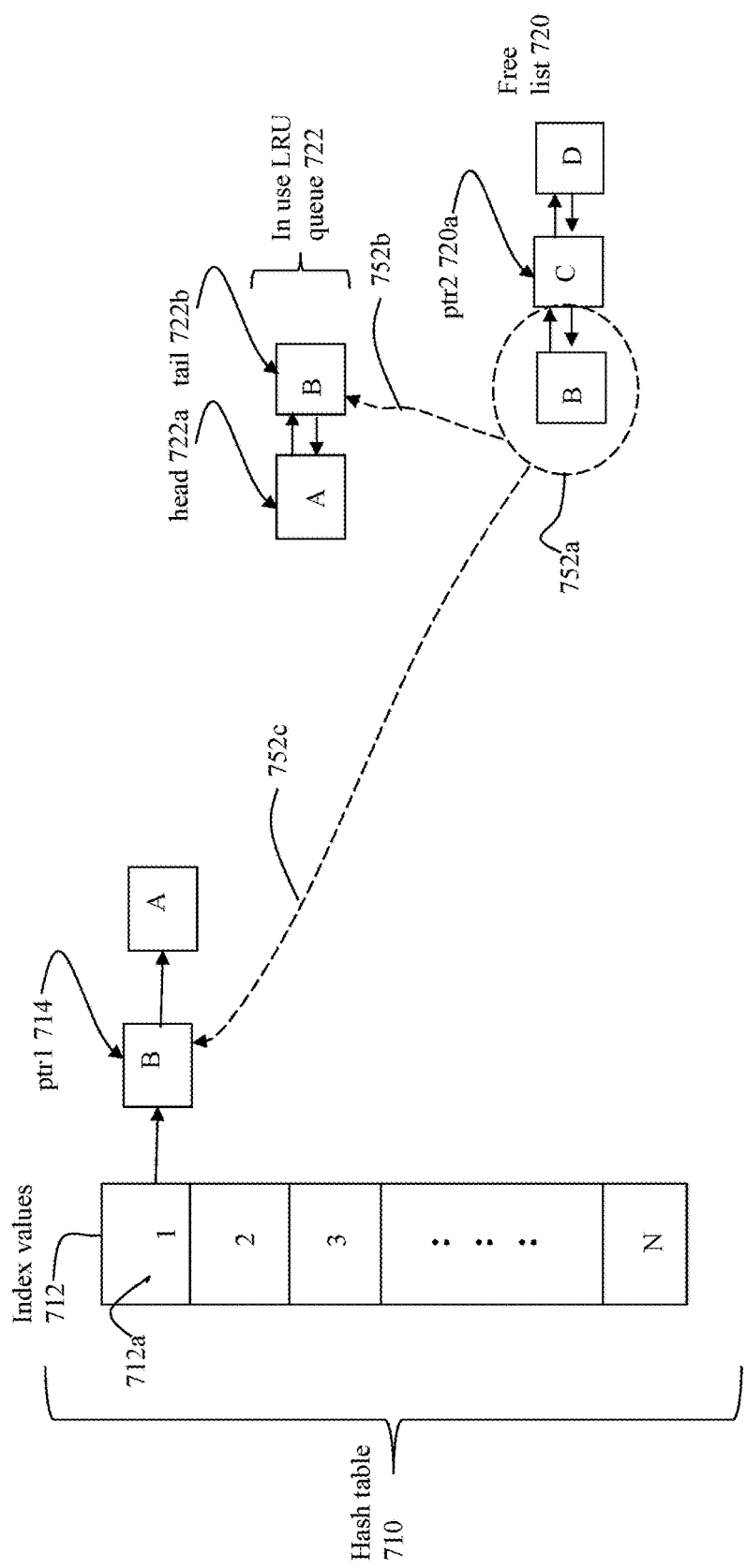

Referring to FIG. 7B, shown is an example 750 illustrating the state of the hash table 710, in use LRU queue 722 and free list 720 at time T2 after B has been removed from the free list 720, and added to both the in use LRU queue 722 and hash table 710.

Element 752*a* illustrates the removal of descriptor B from the free list, where B is then added 752*b* to the tail 722*b* of the in use LRU queue 722. Additionally, B is added 752*c* to the head of the linked list or bucket of descriptors associated with hash table index 1 712*a*.

At a third point in time T3 subsequent to T2, a two more page descriptors are needed for use as new page descriptors. At the third point in time T3, the descriptors C and D can be allocated for use and removed from the free list 720, and added to both the in use LRU queue 722 and hash table 710. In particular in this example, C and D can be added to the bucket or linked list associated with hash table entry 3 712*b*.

Figure 7C:
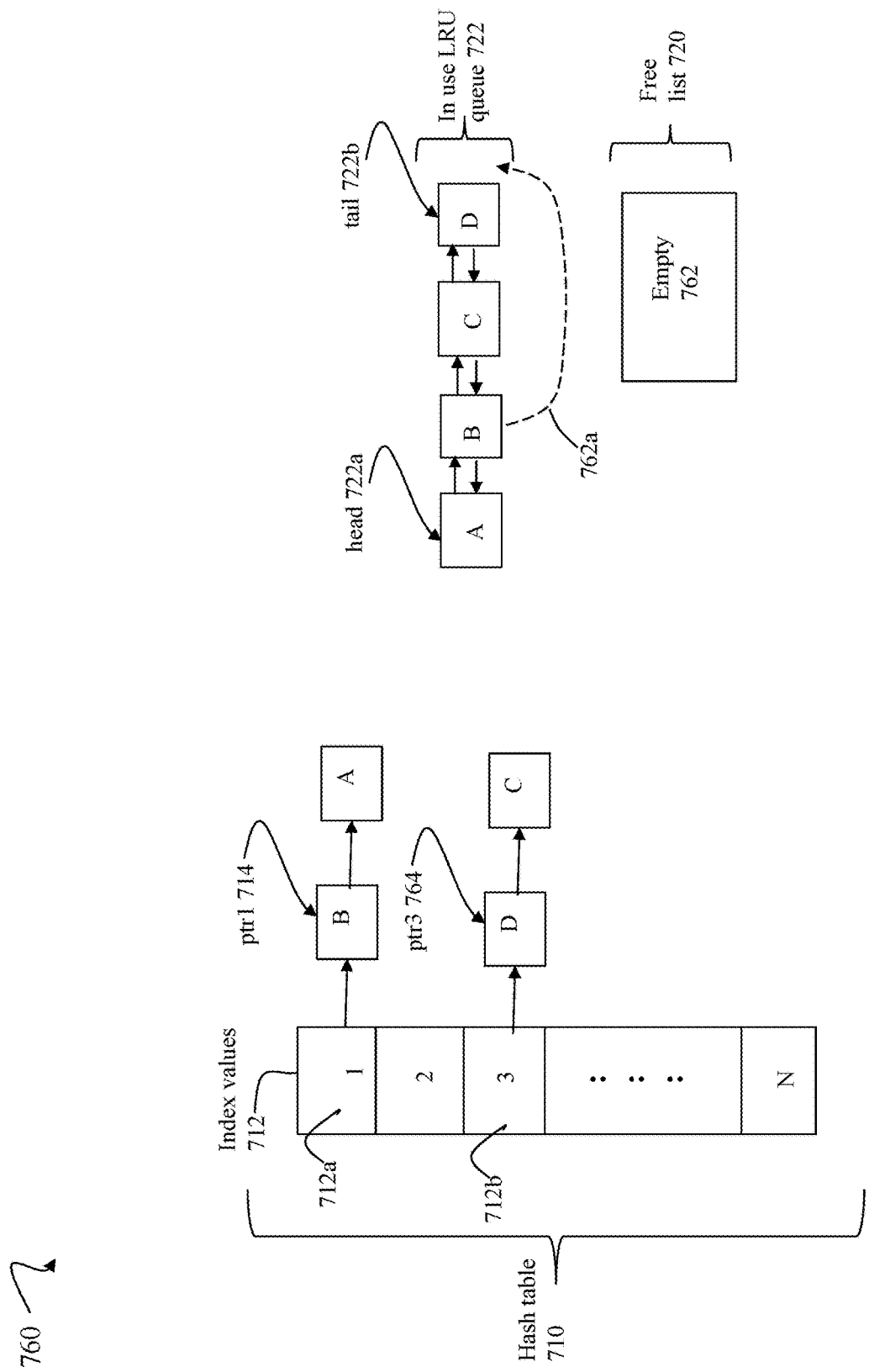

Referring to FIG. 7C, shown is an example 760 illustrating the state of the hash table 710, in use LRU queue 722 and free list 720 at time T3 after C and D are removed from the free list 720, and added to both the in use LRU queue 722 and hash table 710.

Element 764 denotes ptr3 which points to the head of the bucket of descriptors associated with hash table index 3 712*b*. Element 762 indicates that the free list 722 is now empty after removal of C and D therefrom.

Subsequent to T3 at a fourth point in time T4, there can be a hit or reference to descriptor B included in the bucket or linked list of descriptors associated with hash table index 712*a*. Consistent with other discussion herein, the hit can occur for example as a result of a read I/O operation or other read request to read content stored at a logical address denoted by a field of descriptor B. In response to the hit or reference to descriptor B at T4, B can be moved 762*a* to the tail of the in use LRU queue 722.

Figure 7D:
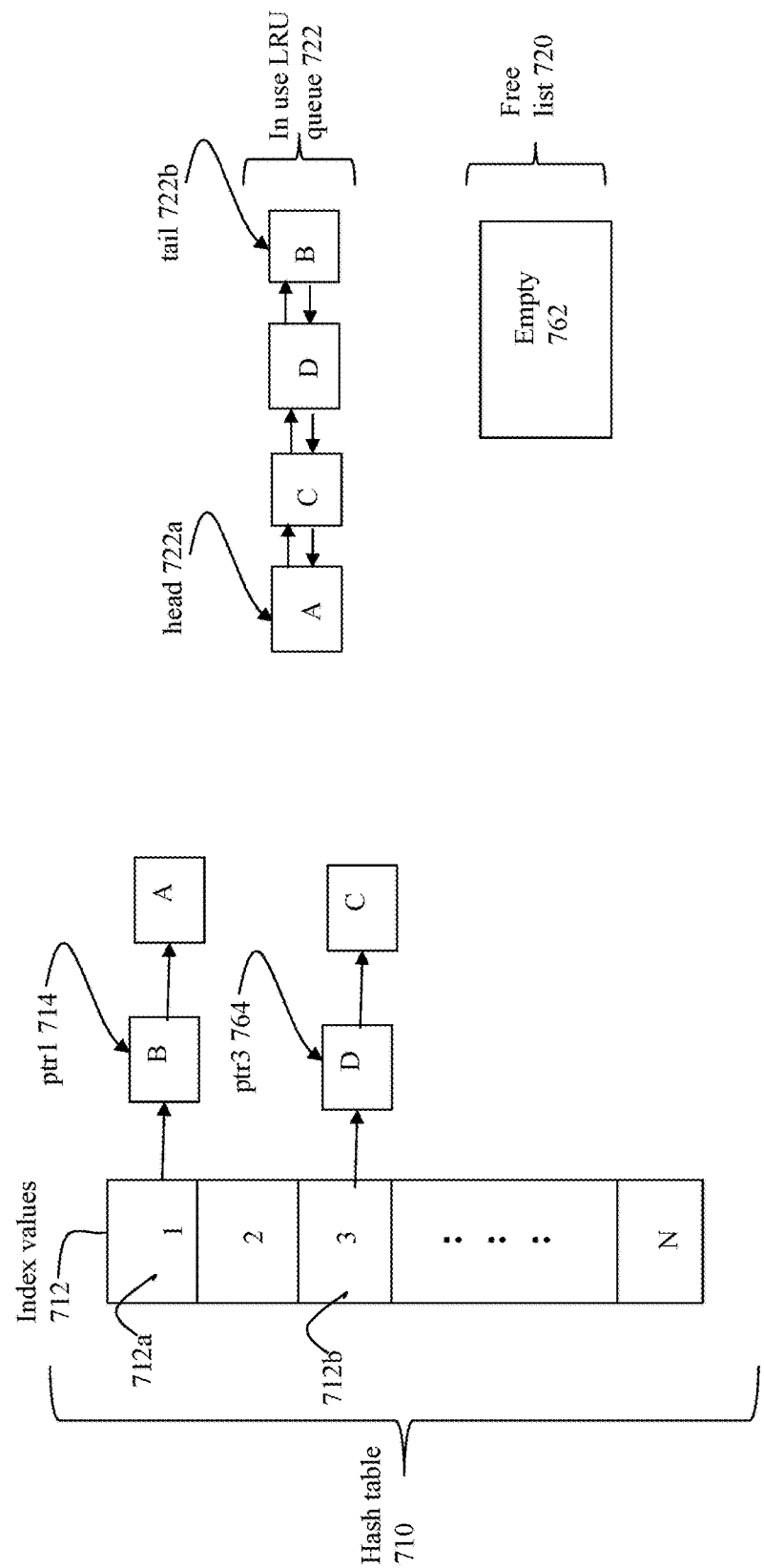

Referring to FIG. 7D, shown is an example 700 illustrating the state of the hash table 710, in use LRU queue 722 and free list 720 at time T4 after B is moved to the tail 722*b* of the in use LRU queue 722.

Subsequent to T4 at a fifth point in time T5, there is another request for a new descriptor. As denoted in FIG. 7D, the free list 720 is empty 762. As a result, a descriptor can be evicted from the mapping cache, and evicted from the hash table thereof, where the evicted descriptor can then be used or reused as the new descriptor needed at T5. In this example, a cached descriptor of the in use LRU queue 722 can be selected for eviction in accordance with an eviction policy. In this example, the eviction policy can be LRU based where the LRU cached descriptor of 722 can be evicted. Thus, the LRU or least recently used descriptor is pointed to by the head pointer 722a of the in use LRU queue 722. In the example 770, descriptor A is the LRU descriptor located at the head 722a of the in use LRU queue 722. As a result A can be evicted from the cache and reused as a new descriptor at time T5. Reuse of A can include updating descriptor A and generating the updated or new descriptor A". Thus, in at least one embodiment, A and A" can both denote the same allocated structure or descriptor instance which has been updated at T5 with new information to be A".

The new descriptor A" can be added to the tail of the in use LRU queue 722 and also added to the hash table 710. In particular in this example, A can be mapped to hash table index 3 712b.

Figure 7E:
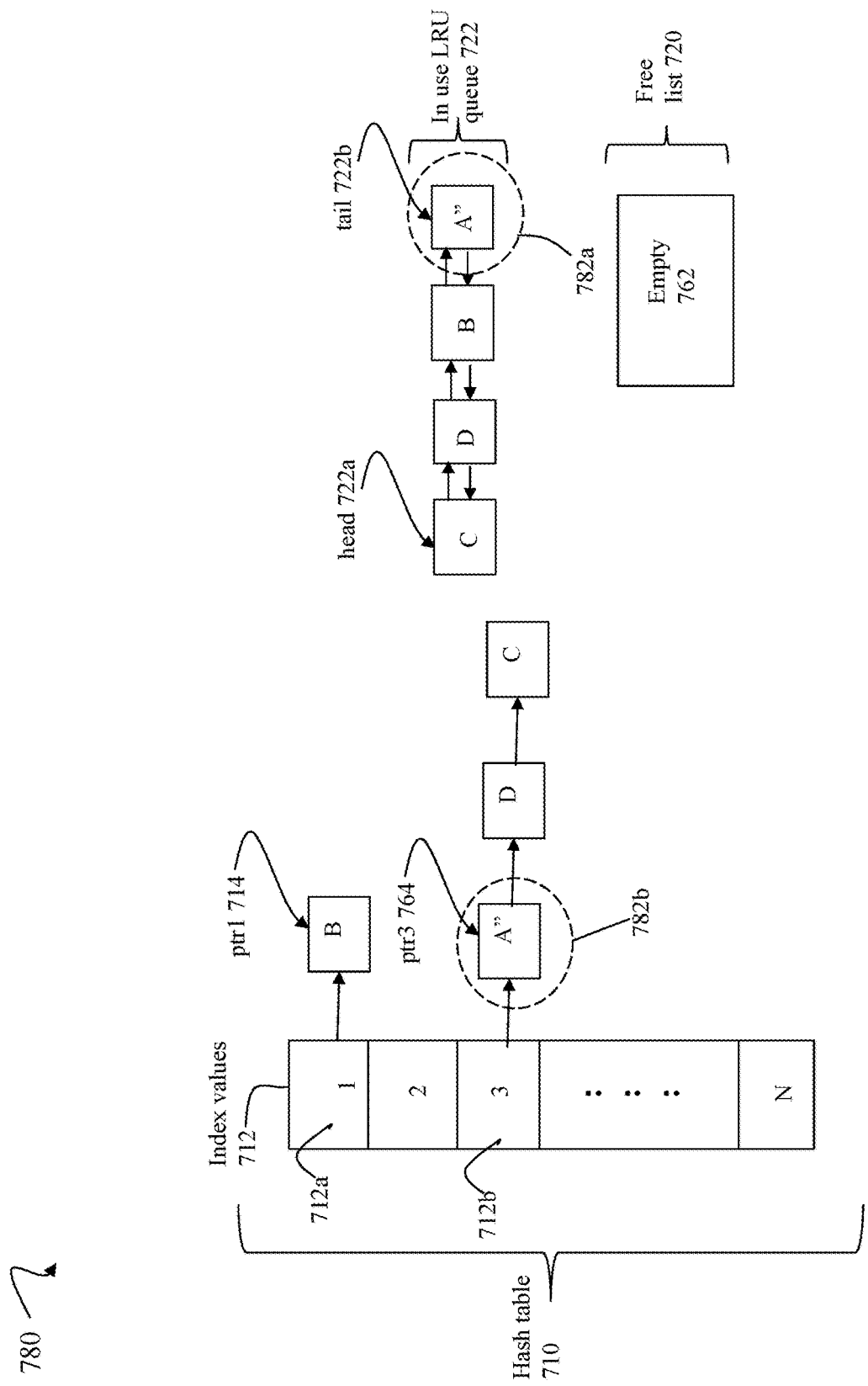

Referring to FIG. 7E, shown is an example 780 illustrating the state of the hash table 710, in use LRU queue 722 and free list 720 at time T5: after A is evicted from the LRU queue 722, after A is evicted from the hash table 710, after the new descriptor A" is added (782a) to the tail 722b of the in use LRU queue 722, and also after A" is added (782b) as a new entry in the bucket or linked list associated with hash table index 3 712b.

In at least one embodiment, a node with a hash table can have multiple processing cores used in connection with performing processing described herein. In this case, multiple processes, threads or other code entities can execute on different cores in parallel where more than one such code entity may attempt to write or modify the same bucket or linked list of cached descriptors associated with one of the hash table indices or entries. Generally, an embodiment can use any suitable mechanism or technique to synchronize access to the same hash table index and its associated bucket of cached descriptors among multiple code entities. In at least one embodiment, each hash table index or entry can have an associated lock, such as a bit lock, which can be used to provide a writer exclusive access to the particular hash table index and its associated bucket of cached descriptors. The writer can be a code entity, for example, which modifies the head pointer of the bucket or linked list and/or other pointers associated with a hash table index or entry in connection with management of the hash table to perform processing as described herein (e.g., add and/or remove descriptors from the hash table).

The foregoing in connection with FIGS. 7A-E illustrate an embodiment in which there is a single in use LRU queue 722. In at least one embodiment of a dual node data storage system in accordance with the techniques of the present disclosure, each node can independently implement and maintain a set of structures as described in connection with FIGS. 7A-7E.

Referring to FIG. 8, shown is an example 850 identifying information that can be included in each page descriptor in at least one embodiment in accordance with the techniques of the present disclosure.

The example 850 indicates that each page descriptor 852 of the mapping cache can include the following fields of information:

Forward pointer 852a and Backward pointer 852b: These pointers are used in connection with linking the descriptor 852 into the doubly linked list of an in use LRU queue.

Physical location information of content 852c: The field 852c identifies a reference, address or pointer to physical location containing content stored at a corresponding logical address denoted by 852e of the same descriptor. In at least one embodiment, the field 852c can identify a PLB address as well as an offset and length. The offset and length can denote the physical location of the content within the PLB having the PLB address. The physical location of the content can have a starting location denoted by the "offset" within the PLB (pointed to by the PLB address) and a size or length denoted by the "length" of 852c. Thus the content can have a starting offset denoted by "offset" and an ending offset denoted by "offset+length".

Logical address 852e: This is the logical address corresponding to the descriptor 852. The physical location information 852c of the descriptor 852 includes the reference, pointer or address of the physical location containing content stored at the logical address 852e. In at least one embodiment, the logical address 852e can be expressed using a LUN or volume and an LBA or logical offset within the LUN or volume's logical address space.

Hash table pointer 852f: This pointer is used to link the descriptor 852 into a bucket or linked list of descriptors associated with one of the hash table entries or indices, j, where LA1 is mapped to j in accordance with a hash function or algorithm F (e.g., F(LA1)=j). The pointer 852f can point to the next descriptor, if any, in the bucket or linked list of descriptors selected for storing this particular descriptor 852. The descriptor 852 can be added to the head of the bucket or linked list associated with hash table index j.

Cryptographic hash value 852g: The cryptographic hash value 852g is computed using a cryptographic hash function or algorithm for the content or user data stored at the physical location represented by the physical location information 852c of the descriptor 852. Consistent with other discussion herein, the cryptographic hash value 852g, along with other information of 852, can be determined and stored in the new descriptor as part of initializing or updating the descriptor to include information associated with the I/O operation triggering the new descriptor request. Thus, the cryptographic hash value 852g, along with other information of 852, can be determined and stored in the descriptor 852 when adding the descriptor 852 to the mapping cache, hash table and an in use LRU queue. As discussed elsewhere herein, the cryptographic hash value 852g can be used in connection with validation processing for content obtained using the physical location information 852c in a subsequent hit or reference to the descriptor 852. The subsequent hit or reference can be, for example, in connection with a subsequent read I/O resulting in a hit of the hash table of the mapping cache, where the hit references the descriptor 852.

In at least one embodiment, the content or data stored at the physical location 852c can be compressed and stored in its compressed form in the physical location 852c. In such an embodiment, the cryptographic hash value 852g can be computed or determined using a cryptographic hash function or algorithm applied to the uncompressed or original form of the content.

Figure 9:
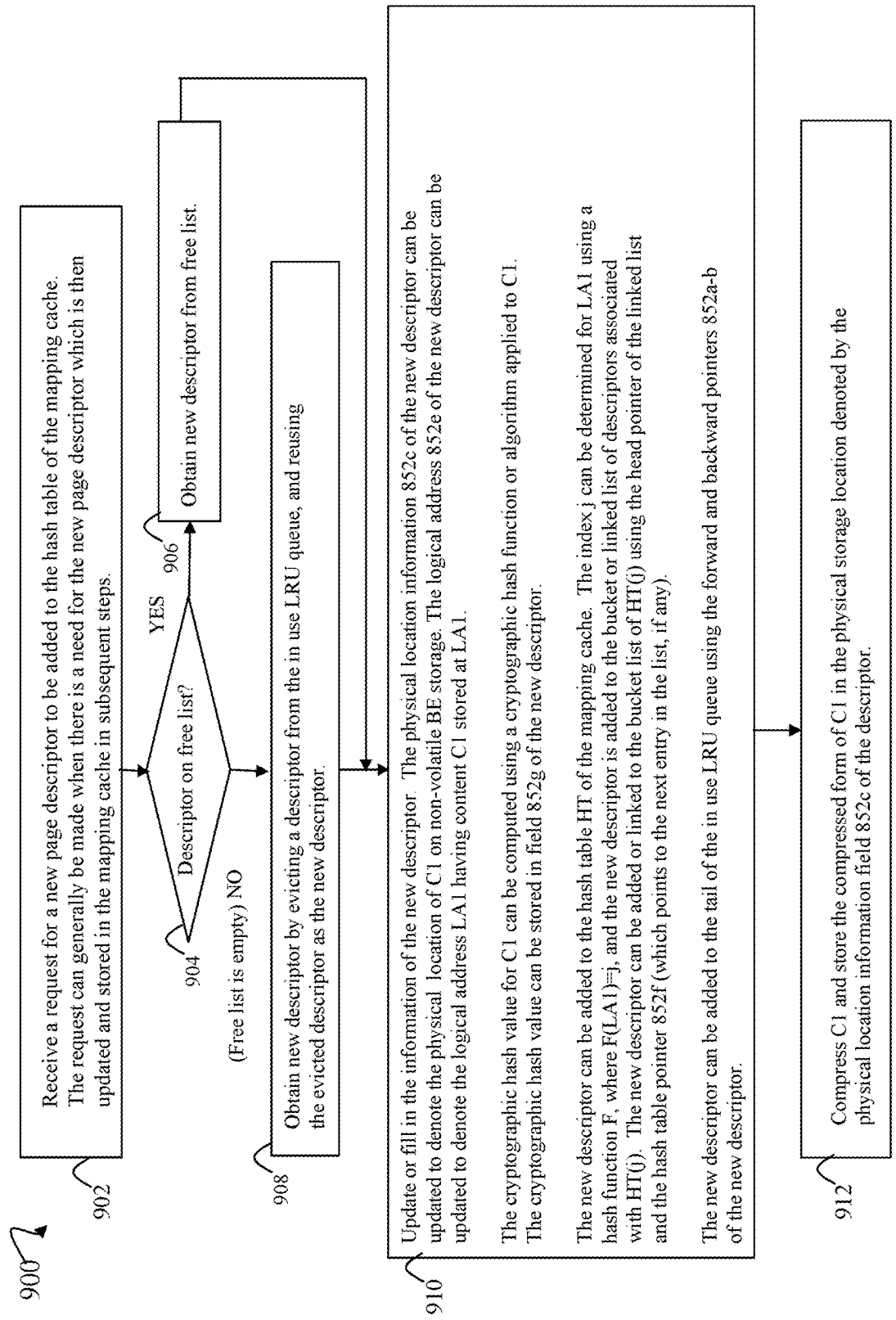
FIGS. 9, 10A, 10B, 10C and 11 are flowcharts of processing steps that can be performed in at least one embodiment in accordance with the techniques of the present disclosure.

Referring to FIG. 9, shown is a flowchart 900 of processing that can be performed in at least one embodiment in accordance with the techniques of the present disclosure in connection with a request to obtain a new page descriptor and add the new page descriptor to the mapping cache. The new descriptor can be added to the hash table used in connection with accessing descriptors in the mapping cache and can be added to an in use LRU queue used in management of the descriptors in the mapping cache.

At the step 902, a request can be received for a new page descriptor to be added to the hash table of the mapping cache. The page descriptor request can be triggered by one of multiple defined operations which results in promoting or adding a descriptor to the mapping cache, the associated hash table and an in use LRU queue.

The triggering operation can be flushing a logged write I/O operation from the log, where the write I/O writes content C1 to a target logical address LA1. Flushing includes storing C1 to a new physical storage location on BE non-volatile storage.

The triggering operation can be read miss processing where requested read data is read from BE non-volatile storage using corresponding mapping information of a chain of metadata pages, such as performed by the mapping layer 1108. A read I/O operation can be a request to read content C1 from LA1, where the read operation results in both a Txcache miss and also a mapping cache miss (e.g., miss with respect to the hash table of the mapping cache). As a result, C1 is read from a physical storage location on non-volatile BE storage using the mapping information of the chain of MD pages mapping LA1 to the physical storage location. Reading C1 from the non-volatile BE storage can trigger the request to add the new page descriptor, as used to access C1, to the mapping cache.

The triggering operation can be a failure of validation processing due to garbage collection. A read I/O operation can request to read content for LA1, where the read initially results in a mapping cache hit (e.g., read hit processing) and the hash table includes a corresponding cached descriptor for LA1. The descriptor can identify a physical location P1 where content is stored. However, garbage collection processing may have relocated the content from P1 to another physical storage location on non-volatile BE storage, and P1 may have been reclaimed and reused for storing other data. In this case, validation processing performed using the cryptographic hash as discussed elsewhere herein fails since P1 no longer contains the same content as when D1 was previously added to the hash table and mapping cache. In response to validation processing failing, read miss processing can be performed to read current content C1 for LA1 from non-volatile BE storage using the chain of mapping information. Reading the current content C1 from the non-volatile BE storage can trigger the request to add the new page descriptor, as used to access C1, to the mapping cache.

The request can generally be made when there is a need for the new page descriptor which is then updated and stored in the mapping cache in subsequent steps. From the step 902, control proceeds to the step 904.

At the step 904, a determination is made as to whether there is a free descriptor on the free list or queue. Responsive to the determining step of 904 evaluating to yes where there is a free descriptor, control proceeds to the step 906 where the free descriptor is allocated from the list as the new descriptor. From the step 906, control proceeds to the step 910.

If the step 904 evaluates to no thereby indicating there is no free descriptor on the free list, control proceeds to the step 908. At the step 908, processing can be performed to obtain a new descriptor by evicting a descriptor from an in use LRU queue, and reusing the evicted descriptor as the new descriptor. The evicted descriptor can be performed in accordance with an eviction policy as described in more detail elsewhere herein depending on the particular structure and policies used in management the cached descriptors of the mapping cache. From the step 908, control proceeds to the step 910.

At the step 910, processing can be performed to update or fill in the information of the new descriptor. With reference back to FIG. 8, the physical location information 852c of the new descriptor can be updated to denote the physical location of C1 on non-volatile BE storage. The logical address 852e of the new descriptor can be updated to denote the logical address LA1 having content C1 stored at LA1. The cryptographic hash value for C1 can be computed using a cryptographic hash function or algorithm applied to C1. The cryptographic hash value can be stored in field 852g of the new descriptor.

In the step 910, the new descriptor can be added to the hash table HT of the mapping cache. The index j can be determined for LA1 using a hash function F, where F(LA1)=j, and the new descriptor is added to the bucket or linked list of descriptors associated with HT(j). The new descriptor can be added or linked to the bucket list of HT(j) using the head pointer of the linked list and the hash table pointer 852f (which points to the next entry in the list, if any).

In the step 910, the new descriptor can be added to the tail of an in use LRU queue using the forward and backward pointers 852a-b of the new descriptor. From the step 910, control proceeds to the step 912.

At the step 912, processing can be performed to compress C1 and store the compressed form of C1 in the physical storage location denoted by the physical location information field 852c of the descriptor.

Figure 10A:
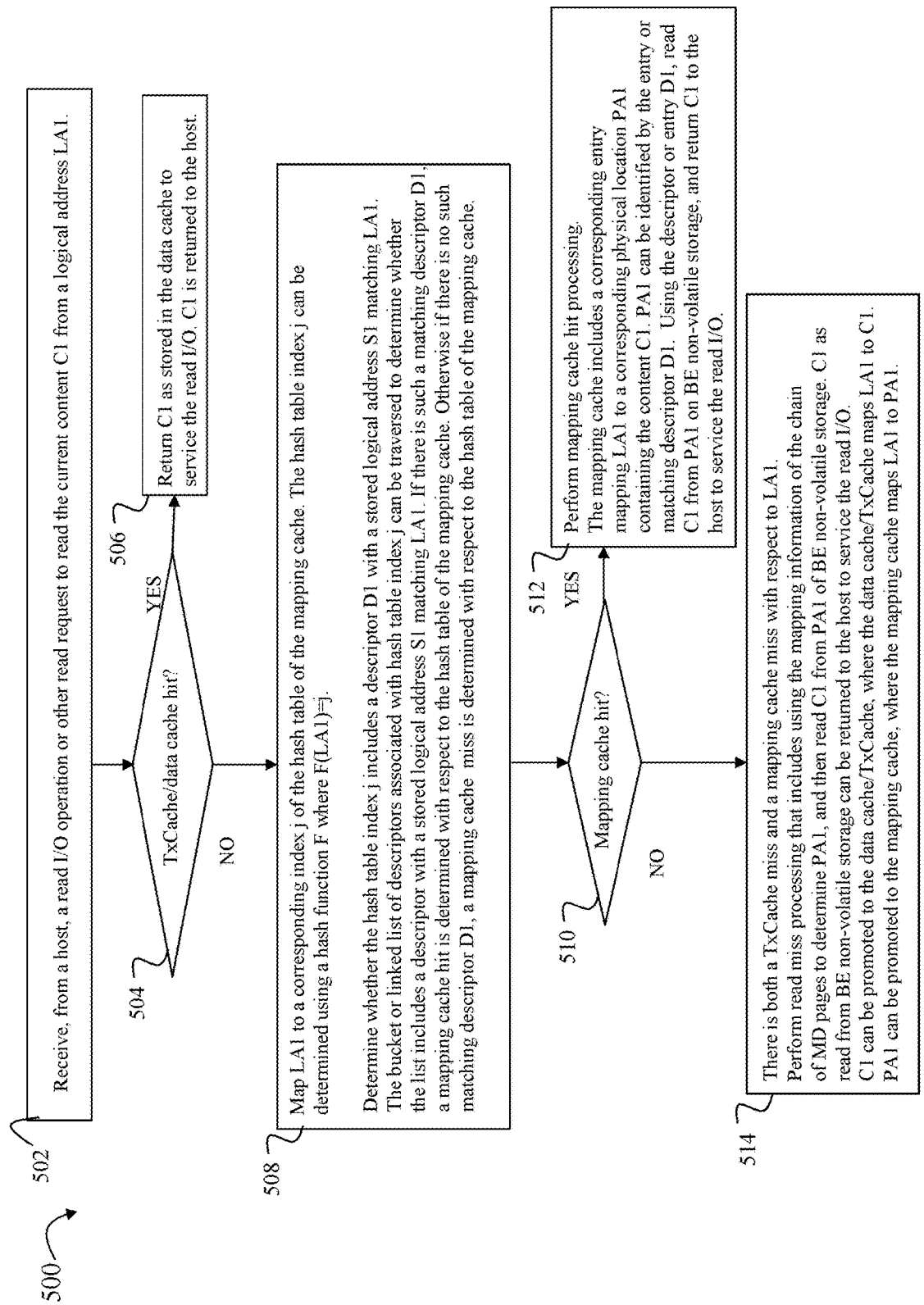

Referring to FIG. 10A, shown is a flowchart 500 of processing that can be performed in connection with servicing a read I/O in at least one embodiment in accordance with the techniques of the present disclosure.

At the step 502, a read I/O or other read request to read content from a logical address LA1 can be received. From the step 502, control proceeds to the step 504.

At the step 504, processing can be performed to determine whether there is a Txcache (e.g., data cache) hit. If there is a Txcache hit with respect to LA1, Txcache includes an entry that maps LA1 to the current cached content C1 of LA1. If there is a Txcache miss with respect to LA1, there is no such entry in the Txcache.

If the step 504 evaluates to yes denoting a Txcache hit for C1 of LA1, control proceeds to the step 506 where C1 as stored in the data cache or Txcache is used to service the read I/O. C1 of the Txcache can be returned to the host that issued the read I/O.

If the step 504 evaluates to no denoting a Txcache miss for C1 of LA1, control proceeds to the step 508.

At the step 508, processing can be performed to map LA1 to a corresponding index j of the hash table of the mapping cache. The hash table index j can be determined using a hash function F where F(LA1)=j.

Also in the step 508, processing can be performed to determine whether the hash table index j includes a descriptor D1 with a stored logical address S1 matching LA1. The bucket or linked list of descriptors associated with hash table index j can be traversed to determine whether the list includes a descriptor with a stored logical address S1 matching A1. If there is such a matching descriptor D1, a hit is determined with respect to the hash table of the mapping cache. Otherwise if there is no such matching descriptor D1, a miss is determined with respect to the hash table of the mapping cache. From the step 508, control proceeds to the step 510.

Figure 10B:
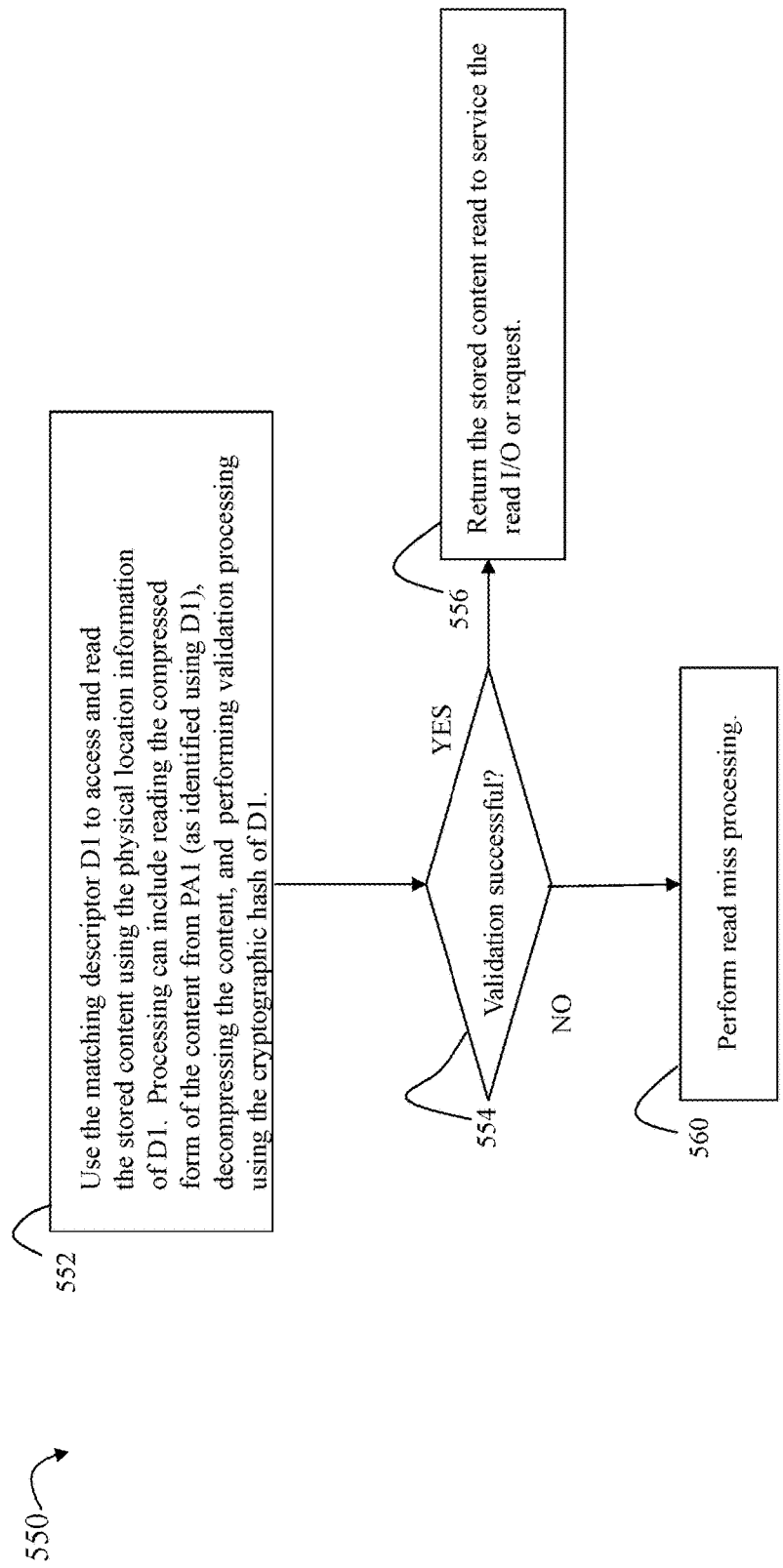

At the step 510, a determination is made as to whether there is a mapping cache hit. A mapping cache hit can be determined if the step 508 locates a matching descriptor D1 in the hash table thereby resulting in the step 510 evaluating to yes. Otherwise, a mapping cache miss is determined thereby resulting in the step 510 evaluating to no. If the step 510 evaluates to yes, control proceeds to the step 512 where mapping cache hit processing is performed. In the step 512, the mapping cache includes a corresponding entry mapping LA1 to a corresponding physical location PA1 containing the content C1. PA1 can be identified by the mapping cache entry or matching descriptor D1. Using the descriptor or entry D1, processing of the step 512 can include reading C1 from PA1 on BE non-volatile storage, and returning C1 to the host to service the read I/O. FIG. 10B provides further detail regarding mapping cache hit processing in at least one embodiment in accordance with the techniques of the present disclosure.

Figure 10C:
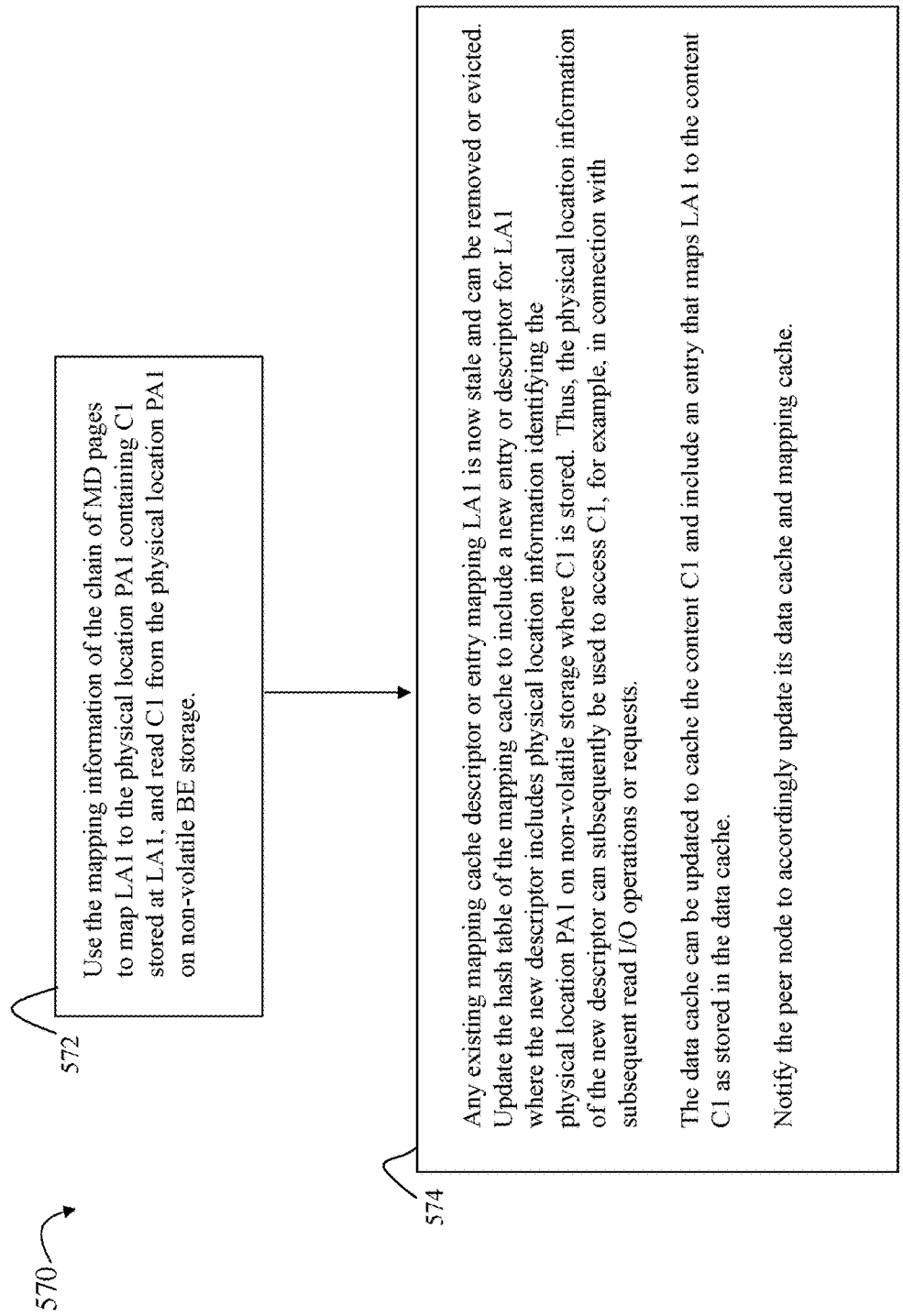

If the step 510 evaluates to no, control proceeds to the step 514 where read miss processing is performed. At the step 514, there has been both a TxCache miss and a mapping cache miss with respect to LA1. The step 514 includes performing read miss processing that includes using the mapping information of the chain of MD pages to determine PA1, and then read C1 from PA1 of BE non-volatile storage. C1 as read from BE non-volatile storage can be returned to the host to service the read I/O. C1 can be promoted to the data cache/TxCache, where the data cache/TxCache maps LA1 to C1. PA1 can be promoted to the mapping cache, where the mapping cache maps LA1 to PA1. FIG. 10C provides further detail regarding read miss processing in at least one embodiment in accordance with the techniques of the present disclosure.

Referring to FIG. 10B, shown is a flowchart 550 of steps that can be performed in connection with read hit processing. Generally, the FIG. 10B provides further detail regarding the mapping cache hit processing of the step 512 of FIG. 10A.

At the step 552, the matching descriptor D1 (as located in the step 508 of FIG. 10A) can be used to access and read stored content of a physical location identified by the physical location information of D1. Processing of the step 552 can include reading the compressed form of the stored content, decompressing the content, and performing validation processing using the cryptographic hash of D1. Validation processing is described in more detail elsewhere herein. From the step 552, control proceeds to the step 554.

At the step 554, a determination is made as to whether validation processing of step 552 is successful. If the step 554 evaluates to yes whereby validation processing is successful, control proceeds to the step 556. At the step 556, processing can be performed to return the stored content read to service the read I/O or request.

If the step 554 evaluates to no, control proceeds to the step 558. At the step 558, D1 can be determined as invalid or stale. From the step 558, control proceeds to the step 560.

At the step 560, read miss processing can be performed. FIG. 10C provides further detail regarding read miss processing of the step 560 in at least one embodiment in accordance with the techniques of the present disclosure. In at least one embodiment using an LSS, it should be noted that the failure of validation processing resulting in the step 554 evaluating to no means that the physical location information of the cached descriptor D1 is stale or invalid where the content stored at the logical address of D1 may have been moved or relocated such as by garbage collection processing from a first physical address or storage location (denoted by physical location information of D1) to a second different physical address or storage location. Read miss processing of the step 560 results in reading the current content stored at the logical address of D1 from the second physical address or storage location. Consistent with other discussion herein (e.g., FIG. 10C), the mapping information of a chain of MD pages is used to map the logical address of D1 to the second physical address or storage location including the current content.

Referring to FIG. 10C, shown is a flowchart 570 of steps that can be performed in connection with read miss processing. Generally, the FIG. 10C provides further detail regarding the step 514 of FIG. 10A and also step 560 of FIG. 10B.

At the step 572, processing can be performed to use the mapping information of the chain of MD pages to map LA1 to the physical location containing C1 stored at LA1, and read C1 from the physical location on non-volatile BE storage. From the step 572, control proceeds to the step 574.

At the step 574, any existing mapping cache descriptor or entry mapping LA1 is now stale and can be removed or evicted from the mapping cache. The step 574 can include updating the hash table of the mapping cache to include a new entry or descriptor for LA1, where the new descriptor includes physical location information identifying the physical location PA1 on non-volatile storage where C1 is stored. Thus, the physical location information of the new descriptor can subsequently be used to access C1, for example, in connection with subsequent read I/O operations or requests. The step 574 can include updating the data cache/Tx cache to cache the content C1 and include an entry that maps LA1 to the content C1 as stored in the data cache/Tx cache.

In at least one embodiment of a dual node storage system, processing of FIG. 10C can be performed by one of the two nodes, where the step 574 can also include notifying the peer node to accordingly update its mapping cache and Txcache/data cache.

Additional detail regarding processing that can be performed in the step 574 in connection with adding a descriptor or entry to the mapping cache is illustrated in FIG. 9.

Figure 11:
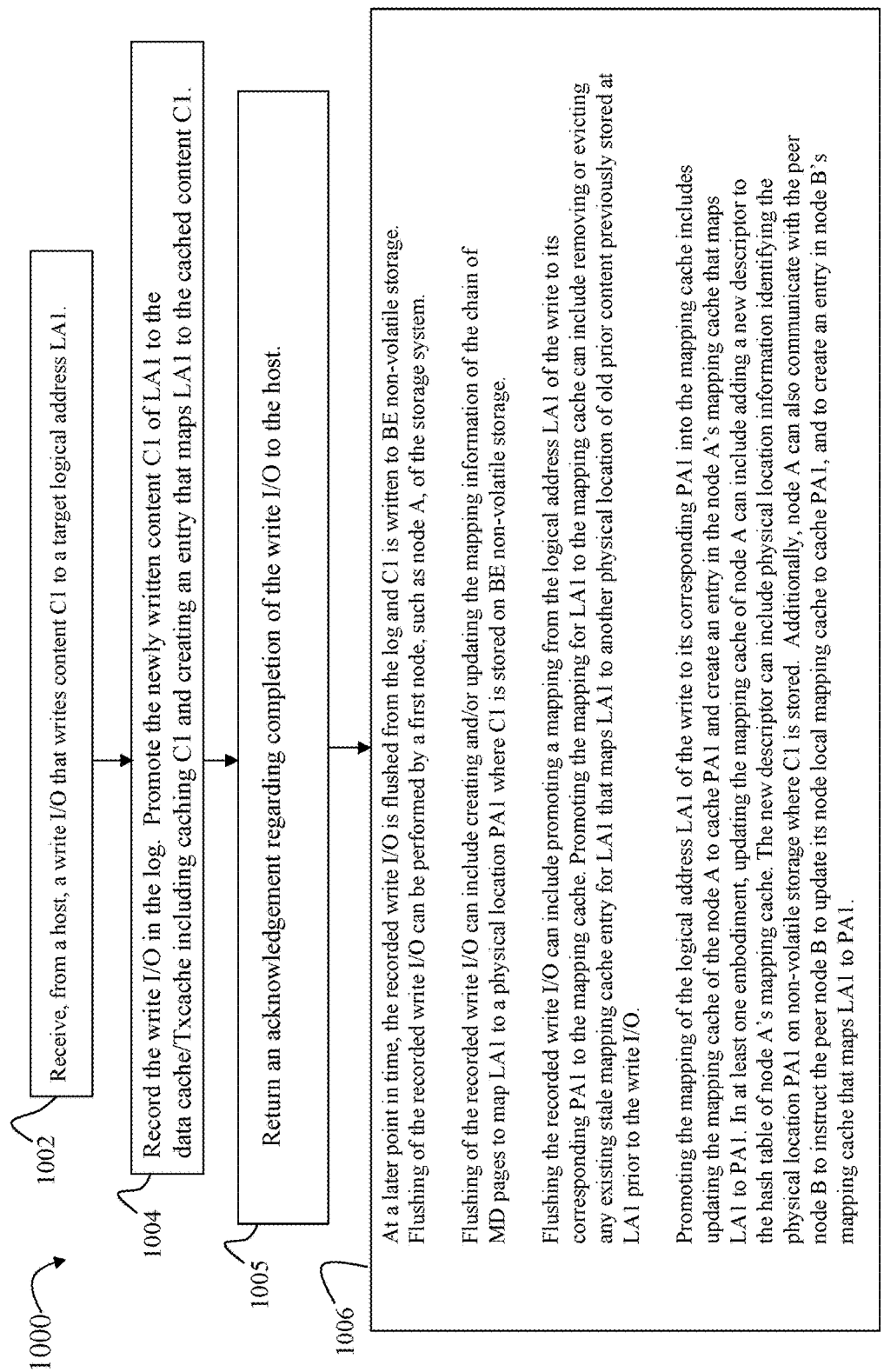

Referring to FIG. 11, shown is a flowchart 1000 of processing steps that can be performed in connection with write I/O processing in at least one embodiment in accordance with the techniques of the presented disclosure.

At the step 1002, a write I/O can be received that writes content C1 to a target logical address LA1. The write I/O can be received from a host or other storage client of the storage system. From the step 1002, control proceeds to the step 1004.

At the step 1004, processing can be performed to record the write I/O in the log. The step 1104 can also include performing processing that promotes the newly written content C1 of LA1 to the data cache/Txcache including caching C1 and creating an entry that maps LA1 to the content C1 as cached in the data cache/Txcache. Promoting the content C1 of LA1 to the data cache can include updating the data cache of node A to cache the content C1 and create an entry that maps the logical address LA1 to the cached content C1. Node A can also communicate with peer node B to instruct the peer node B to similarly update its node local data cache to cache the content C1 and create an entry that maps the logical address LA1 to the cached content C1.

In at least one embodiment after performing the step 1004, the content C1 of LA1 stored in the data cache is now "dirty" in the sense that it has not yet been flushed to BE non-volatile storage such that the data cache includes the most current up to date content of LA1, and the BE non-volatile storage rather includes a prior stale version of the content of LA1. In at least one embodiment in the step 1004, the content C1 of LA1 can be cached in the volatile memory data cache and marked as dirty. In at least one embodiment, data cache entries that are dirty can remain in the cache as long as such entries are marked as dirty. Once the corresponding log entry for the write is flushed from the log such that the content C1 of LA1 is persisted to BE non-volatile storage (e.g., such that the data cached content C1 of LA1 and the persisted current content of LA1 match and denote the current up to date content of LA1), the content C1 of LA1 as cached in the data cache can be marked as clean and can be a candidate for eviction from the data cache. In at least one embodiment, entries of the data cache corresponding to dirty data or content can remain in the data cache and not be evicted from the data cache until such entries are marked as clean. In at least one embodiment, clean data cache entries can be candidates for eviction but not dirty data cache entries. From the step 1004, control proceeds to the step 1005.

At the step 1005, an acknowledgement can be returned to the host. From the step 1005, control proceeds to the step 1006.

At the step 1006, at a later point in time, the recorded write I/O is flushed from the log and C1 is written to non-volatile BE storage. Flushing of the recorded write I/O can include creating and/or updating the mapping information of the chain of MD pages to map LA1 to a physical location PA1 where C1 is stored on BE non-volatile storage. Flushing the recorded write I/O can include promoting a mapping from the logical address LA1 of the write to its corresponding PA1 to the mapping cache. Promoting the mapping for LA1 to the mapping cache can include removing or evicting any existing stale mapping cache entry for LA1 that maps LA1 to another physical location of old prior content previously stored at LA1 prior to the write I/O.

In the step 1006, promoting the mapping of the logical address LA1 of the write to its corresponding PA1 into the mapping cache can include updating the mapping cache of the node A to cache PA1 and create an entry in the node A's mapping cache that maps LA1 to PA1. In at least one embodiment, updating the mapping cache of node A can include adding a new descriptor to the hash table of node A's mapping cache. The new descriptor can include physical location information identifying the physical location PA1 on non-volatile storage where C1 is stored. Additionally, node A can also communicate with the peer node B to instruct the peer node B to update its node local mapping cache to cache PA1, and to create an entry in node B's mapping cache that maps LA1 to PA1.

In the step 1006, the flushing of the recorded write I/O can trigger a request to add a new descriptor to the hash table of the mapping cache of a node. The new descriptor includes physical location information identifying the physical location on non-volatile storage where C1 is stored. Thus, the physical location information of the new descriptor can subsequently be used to access C1, for example, in connection with subsequent read I/O operations or requests. Flushing can include creating and/or updating the mapping information of the chain of MD pages to map LA1 to the physical location. Additional detail regarding processing that can be performed in the step 1006 in connection with updating the mapping cache is illustrated in FIG. 9 where the step 1006 generates a request to trigger or add a new descriptor to the mapping cache.

In at least one embodiment in accordance with the techniques of the present disclosure, the steps 1002, 1004 and 1005 of FIG. 11 can be included in ingest processing of the write I/O. Consistent with other discussion herein in at least one embodiment, such ingest processing can omit evicting or removing any corresponding mapping cache entries for LA1 from the mapping cache in connection with maintaining mapping cache consistency. More generally, the write I/O can be one of multiple operations or commands that are non-read commands or operations that can modify the mapping information of the chain of metadata pages mapping LA1 to the physical location on BE non-volatile storage containing the current content C1 of LA1. As such, the processing of FIG. 11 can be generalized to apply to any such non-read I/Os or operations that can modify the mapping information for LA1 where ingest processing of such commands can include: receiving the command from a host, recording the command in the log, and returning an acknowledgement to the host that sent the command. Such ingest processing of non-read commands that modify the mapping information for LA1 can omit evicting or removing any corresponding mapping cache entries for LA1 from the mapping cache in connection with maintaining mapping cache consistency.

In at least one embodiment in accordance with the techniques of the present disclosure as discussed above, processing a read I/O to read the current content of a logical address LA1 can include first querying the data cache for the requested read of LA1. If there is a data cache miss, then the mapping cache can be queried to determine whether the mapping cache includes a corresponding mapping cache entry with a physical address or location of the current content of LA1. Further in at least one embodiment, dirty content written to a logical address can remain in the data cache. As such in at least one embodiment at various points in time, information of the mapping cache and data cache can be different or disparate, where the mapping cache can include stale or invalid entries that are not removed or evicted as part of write I/O ingest processing, and where the data cache can include the current valid content of a logical address. In a scenario where there is a read I/O that reads content from a logical address LA1 and the mapping cache includes a stale mapping cache entry for LA1, read I/O processing can thus obtain the content of LA1 from the data cache since the data cache is checked prior to the mapping cache. In at least one embodiment using the techniques herein, there can be stale or invalid entries in the mapping cache that are not removed or evicted as part of write ingest processing in order to maintain cache coherency between the data cache and the mapping cache, where a subsequent read I/O is serviced using a corresponding data cache entry rather than a stale or invalid mapping cache entry.

The techniques herein can be performed by any suitable hardware and/or software. For example, techniques herein can be performed by executing code which is stored on any one or more different forms of computer-readable media, where the code can be executed by one or more processors, for example, such as processors of a computer or other system, an ASIC (application specific integrated circuit), and the like. Computer-readable media can include different forms of volatile (e.g., RAM) and non-volatile (e.g., ROM, flash memory, magnetic or optical disks, or tape) storage which can be removable or non-removable.

While the techniques of the present disclosure have been presented in connection with embodiments shown and described in detail herein, their modifications and improvements thereon will become readily apparent to those skilled in the art. Accordingly, the spirit and scope of the techniques of the present disclosure should be limited only by the following claims.

What is claimed is:

1. A computer-implemented method comprising:
   receiving, from a host, a read I/O operation requesting to read current content of a first logical address;
   determining whether a data cache includes a first data cache entry corresponding to the first logical address;
   responsive to determining the data cache includes the first data cache entry corresponding to the first logical address, performing data cache hit processing to service the read I/O operation using the first data cache entry;

responsive to determining the data cache does not include the first data cache entry corresponding to the first logical address, performing data cache miss processing including:

determining whether a mapping cache includes a first descriptor corresponding to the first logical address; and responsive to determining the mapping cache includes the first descriptor corresponding to the first logical address, performing mapping cache hit processing to service the read I/O operation using the first descriptor of the mapping cache;

wherein the mapping cache includes a hash table of entries or indices, wherein the first logical address maps to a first entry or first index of the hash table associated with the first descriptor, wherein the hash table uses the first logical address as a key which is associated with the first descriptor stored in the mapping cache, and wherein each of the entries or indices of the hash table is associated with a corresponding linked list of one or more descriptors each including a stored logical address that maps to said each entry or index of the hash table.

2. The computer-implemented method of claim 1 where said data cache miss processing includes:

responsive to determining the mapping cache does not include the first descriptor corresponding to the first logical address, performing read miss processing to service the read I/O operation using mapping information including a chain of metadata pages that maps the first logical address to a first physical location on non-volatile storage including the first content stored at the first logical address.

3. The computer-implemented method of claim 2, wherein said read miss processing includes:

using the mapping information including the chain of metadata pages to map the first logical address to the physical location including the first content;

reading the first content from the first physical location;

promoting the first content to the data cache, including adding the first data cache entry to the data cache, wherein the first data cache entry maps the first logical address to the first content of the data cache;

promoting the first physical location to the mapping cache, including adding the first descriptor corresponding to the first logical address to the mapping cache, wherein the first descriptor includes information describing the first physical location and wherein the first descriptor denotes a mapping cache entry that maps the first logical address to the first physical location; and returning the first content to the host.

4. The computer-implemented method of claim 1, wherein said data cache hit processing includes:

obtaining, using the first data cache entry, the first content associated with the first logical address from the data cache; and returning the first content, as obtained from the data cache, to the host.

5. The computer-implemented method of claim 1, wherein said mapping cache hit processing includes:

obtaining first physical location information from the first descriptor, wherein the first physical location information identifies a first physical location on non-volatile storage including first content stored at the first logical address;

reading, using the first physical location information, the first content from the first physical location;

performing validation processing to validate the first content using a first hash value included in the first descriptor; and responsive to said validation processing successfully validating the first content, returning the first content to the host in response to said read I/O operation.

6. The computer-implemented method of claim 5, wherein said validation processing to validate the first content includes:

computing, using a hash function, a second hash value for the first content read in said reading;

determining whether the first hash value matches the second hash value;

responsive to determining that the first hash value and the second hash value match, successfully validating the first content; and responsive to determining that the first hash value and the second hash value do not match, invalidating the first content and failing validation processing.

7. The computer-implemented method of claim 6, wherein the hash function is a cryptographic hash function, and wherein the first hash value and the second hash value are cryptographic hash values computed using the cryptographic hash function.

8. The computer-implemented method of claim 7, further comprising:

responsive to said validation processing of the mapping cache hit processing invalidating the first content and failing said validation processing of the first content, performing read miss processing.

9. The computer-implemented method of claim 8, wherein said read miss processing includes:

using the mapping information including the chain of metadata (MD) pages to map the first logical address to a second physical location including the first content, wherein said second physical location is different from the first physical location;

reading the first content from the second physical location which is different from the first physical location;

promoting the first content to the data cache, including adding a corresponding data cache entry to the data cache, wherein the corresponding data cache entry maps the first logical address to the first content of the data cache; and returning the first content to the host.

10. The computer-implemented method of claim 9, wherein said read miss processing includes:

evicting the first descriptor from the mapping cache; and subsequent to said reading the first content from the second physical location which is different from the first physical location, storing, in the mapping cache, a second descriptor corresponding to the first logical address, wherein the second descriptor includes second physical location information identifying the second physical location and the first logical address, wherein the second descriptor denotes a mapping cache entry that maps the first logical address to the second physical location.

11. The computer-implemented method of claim 10, wherein the first content is relocated from the first physical location to the second physical location as a result of garbage collection processing performed on non-volatile backend storage including the first physical location and the second physical location.

12. The computer-implemented method of claim 1, wherein the computer-implemented method is performed in a data storage system which implements a log structured system where write I/O operations received are recorded in a log and subsequently flushed from the log.

13. The computer implemented method of claim 12, further comprising:
receiving a first write I/O operation at the data storage system, wherein the first write I/O writes the first content to the first logical address; and
responsive to said receiving the first write I/O operation, performing first processing including:
recording a first record in the log for the first write I/O operation;
storing in the data cache the first data cache entry corresponding to the first logical address, wherein the first data cache entry maps the first logical address to the first content that is cached in the data cache;
flushing the first record denoting the first write I/O operation from the log; and
storing the first content to the first physical location.

14. The computer-implemented method of claim 13, further comprising:
responsive to said flushing the first record, performing processing including:
evicting any existing mapping cache entry of the mapping cache corresponding to the first logical address; and
storing in the mapping cache the first descriptor for the first logical address.

15. The computer-implemented method of claim 1, wherein the mapping cache includes a plurality of descriptors including the first descriptor, wherein each of the plurality of descriptors is included in one of the corresponding linked lists associated with one of the hash table indices or entries, and wherein said each descriptor is also included in an use queue used in connection with managing descriptors of the mapping cache in accordance with a least recently used policy.

16. The computer-implemented method of claim 1, further comprising:
responsive to determining there is no free descriptor of the mapping cache, evicting another descriptor from the mapping cache; and
using the evicted another descriptor as the first descriptor.

17. The computer-implemented method of claim 1, wherein said determining whether the mapping cache includes the first descriptor corresponding to the first logical address further comprises:
comparing the first logical address to a stored logical address included in the first descriptor;
determining, in accordance with said comparing, whether the stored logical address matches the first logical address; and
responsive to the stored logical address matching the first logical address, determining that the mapping cache includes the first descriptor corresponding to the first logical address, and
wherein said data cache miss processing comprises:
responsive to determining that the mapping cache includes no descriptor corresponding to the first logical address, performing read miss processing that includes:
reading the first content of the first logical address from a first physical location of back-end non-volatile storage, wherein said reading uses mapping information including a chain of metadata pages that maps the first logical address to the first physical location on non-volatile storage including the first content stored at the first logical address;
promoting the first content associated with the first logical address to the data cache; and
promoting the first physical location associated with the first logical address to the mapping cache.

18. A system comprising:
one or more processors; and
a memory comprising code stored thereon that, when executed, performs a method comprising:
receiving, from a host, a read I/O operation requesting to read current content of a first logical address;
determining whether a data cache includes a first data cache entry corresponding to the first logical address;
responsive to determining the data cache includes the first data cache entry corresponding to the first logical address,
performing data cache hit processing to service the read I/O operation using the first data cache entry;
responsive to determining the data cache does not include the first data cache entry corresponding to the first logical address, performing data cache miss processing including:
determining whether a mapping cache includes a first descriptor corresponding to the first logical address; and
responsive to determining the mapping cache includes the first descriptor corresponding to the first logical address, performing mapping cache hit processing to service the read I/O operation using the first descriptor of the mapping cache;
wherein the mapping cache includes a hash table of entries or indices, wherein the first logical address maps to a first entry or first index of the hash table associated with the first descriptor, wherein the hash table uses the first logical address as a key which is associated with the first descriptor stored in the mapping cache, and wherein each of the entries or indices of the hash table is associated with a corresponding linked list of one or more descriptors each including a stored logical address that maps to said each entry or index of the hash table.

19. A non-transitory computer readable medium comprising code stored thereon that, when executed, performs a method comprising:
receiving, from a host, a read I/O operation requesting to read current content of a first logical address;
determining whether a data cache includes a first data cache entry corresponding to the first logical address;
responsive to determining the data cache includes the first data cache entry corresponding to the first logical address, performing data cache hit processing to service the read I/O operation using the first data cache entry;
responsive to determining the data cache does not include the first data cache entry corresponding to the first logical address, performing data cache miss processing including:
determining whether a mapping cache includes a first descriptor corresponding to the first logical address; and responsive to determining the mapping cache includes the first descriptor corresponding to the first logical address, performing mapping cache hit processing to service the read I/O operation using the first descriptor of the mapping cache;

wherein the mapping cache includes a hash table of entries or indices, wherein the first logical address maps to a first entry or first index of the hash table associated with the first descriptor, wherein the hash table uses the first logical address as a key which is associated with the first descriptor stored in the mapping cache, and wherein each of the entries or indices of the hash table is associated with a corresponding linked list of one or more descriptors each including a stored logical address that maps to said each entry or index of the hash table.

20. The non-transitory computer readable medium of claim 19, wherein the mapping cache includes a plurality of descriptors including the first descriptor, wherein each of the plurality of descriptors is included in one of the corresponding linked lists associated with one of the hash table indices or entries, and wherein said each descriptor is also included in an use queue used in connection with managing descriptors of the mapping cache in accordance with a least recently used policy.

* * * * *